US008321214B2

(12) United States Patent
Chan et al.

(10) Patent No.: US 8,321,214 B2
(45) Date of Patent: Nov. 27, 2012

(54) SYSTEMS, METHODS, AND APPARATUS FOR MULTICHANNEL SIGNAL AMPLITUDE BALANCING

(75) Inventors: Kwokleung Chan, San Diego, CA (US); Hyun Jin Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 791 days.

(21) Appl. No.: 12/473,930

(22) Filed: May 28, 2009

(65) Prior Publication Data

US 2009/0299739 A1 Dec. 3, 2009

Related U.S. Application Data

(60) Provisional application No. 61/058,132, filed on Jun. 2, 2008.

(51) Int. Cl.
*G01L 19/14* (2006.01)

(52) U.S. Cl. ........................................................ 704/225

(58) Field of Classification Search ................... 704/225
See application file for complete search history.

(56) References Cited

U.S. PATENT DOCUMENTS

| | | | |
|---|---|---|---|
| 4,649,505 | A | 3/1987 | Zinser, Jr. et al. |
| 4,912,767 | A | 3/1990 | Chang |
| 5,208,786 | A | 5/1993 | Weinstein et al. |
| 5,251,263 | A | 10/1993 | Andrea et al. |
| 5,327,178 | A | 7/1994 | McManigal |
| 5,375,174 | A | 12/1994 | Denenberg |
| 5,383,164 | A | 1/1995 | Sejnowski et al. |
| 5,471,538 | A | 11/1995 | Sasaki |
| 5,675,659 | A | 10/1997 | Torkkola |
| 5,706,402 | A | 1/1998 | Bell |
| 5,742,735 | A | 4/1998 | Eberlein et al. |
| 5,770,841 | A | 6/1998 | Moed et al. |
| 5,999,567 | A | 12/1999 | Torkkola |
| 5,999,956 | A | 12/1999 | Deville |
| 6,002,776 | A | 12/1999 | Bhadkamkar et al. |
| 6,061,456 | A | 5/2000 | Andrea |
| 6,108,415 | A | 8/2000 | Andrea |
| 6,130,949 | A | 10/2000 | Aoki et al. |
| 6,167,417 | A | 12/2000 | Parra et al. |
| 6,381,570 | B2 | 4/2002 | Li et al. |
| 6,385,323 | B1 | 5/2002 | Zoels |
| 6,424,960 | B1 | 7/2002 | Lee et al. |
| 6,462,664 | B1 | 10/2002 | Cuijpers et al. |

(Continued)

FOREIGN PATENT DOCUMENTS

DE 19849739 C2 5/2001

(Continued)

OTHER PUBLICATIONS

Amari, S. et al. "A New Learning Algorithm for Blind Signal Separation." In: Advances in Neural Information Processing Systems 8 (pp. 757-763). Cambridge: MIT Press 1996.

(Continued)

*Primary Examiner* — Susan McFadden
(74) *Attorney, Agent, or Firm* — Espartaco Diaz Hidalgo

(57) ABSTRACT

A method for processing a multichannel audio signal may be configured to control the amplitude of one channel of the signal relative to another based on the levels of the two channels. One such example uses a bias factor, which is based on a standard orientation of an audio sensing device relative to a directional acoustic information source, for amplitude control of information segments of the signal.

38 Claims, 34 Drawing Sheets

U.S. PATENT DOCUMENTS

| | | | |
|---|---|---|---|
| 6,496,581 | B1 | 12/2002 | Finn et al. |
| 6,502,067 | B1 | 12/2002 | Hegger et al. |
| 6,526,148 | B1 | 2/2003 | Jourjine et al. |
| 6,549,630 | B1 | 4/2003 | Bobisuthi |
| 6,594,367 | B1 | 7/2003 | Marash et al. |
| 6,606,506 | B1 | 8/2003 | Jones |
| 6,654,719 | B1 | 11/2003 | Papadias |
| 7,027,607 | B2 | 4/2006 | Pedersen |
| 7,065,220 | B2 | 6/2006 | Warren |
| 7,076,069 | B2 | 7/2006 | Roeck |
| 7,099,821 | B2 | 8/2006 | Visser et al. |
| 7,113,604 | B2 | 9/2006 | Thompson |
| 7,123,727 | B2 | 10/2006 | Elko |
| 7,155,019 | B2 | 12/2006 | Hou |
| 7,203,323 | B2 | 4/2007 | Tashev |
| 7,295,972 | B2 | 11/2007 | Choi |
| 7,424,119 | B2 | 9/2008 | Reichel |
| 7,471,798 | B2 | 12/2008 | Warren |
| 7,474,755 | B2 | 1/2009 | Niederdrank |
| 7,603,401 | B2 | 10/2009 | Parra et al. |
| 7,711,553 | B2 | 5/2010 | Nam |
| 7,738,574 | B2 | 6/2010 | Jang et al. |
| 7,941,315 | B2 | 5/2011 | Matsuo |
| 8,160,273 | B2 | 4/2012 | Visser et al. |
| 2001/0037195 | A1 | 11/2001 | Acero et al. |
| 2001/0038699 | A1 | 11/2001 | Hou |
| 2002/0110256 | A1 | 8/2002 | Watson et al. |
| 2002/0136328 | A1 | 9/2002 | Shimizu |
| 2002/0193130 | A1 | 12/2002 | Yang et al. |
| 2003/0055735 | A1 | 3/2003 | Cameron et al. |
| 2003/0179888 | A1 | 9/2003 | Burnett et al. |
| 2004/0039464 | A1 | 2/2004 | Virolainen et al. |
| 2004/0120540 | A1 | 6/2004 | Mullenborn et al. |
| 2004/0136543 | A1 | 7/2004 | White et al. |
| 2004/0161121 | A1 | 8/2004 | Chol et al. |
| 2004/0165735 | A1 | 8/2004 | Opitz |
| 2005/0091042 | A1 | 4/2005 | Acero et al. |
| 2005/0175190 | A1 | 8/2005 | Tashev |
| 2005/0195988 | A1 | 9/2005 | Tashev |
| 2005/0203981 | A1 | 9/2005 | Sawada et al. |
| 2005/0249359 | A1 | 11/2005 | Roeck |
| 2005/0276423 | A1 | 12/2005 | Aubauer et al. |
| 2006/0032357 | A1 | 2/2006 | Roovers |
| 2006/0053002 | A1 | 3/2006 | Visser et al. |
| 2006/0058983 | A1 | 3/2006 | Araki et al. |
| 2006/0083389 | A1 | 4/2006 | Oxford |
| 2006/0222184 | A1 | 10/2006 | Buck |
| 2007/0021958 | A1 | 1/2007 | Visser et al. |
| 2007/0053455 | A1 | 3/2007 | Sugiyama |
| 2007/0076900 | A1 | 4/2007 | Kellermann |
| 2007/0088544 | A1 | 4/2007 | Acero |
| 2007/0165879 | A1 | 7/2007 | Deng et al. |
| 2007/0244698 | A1 | 10/2007 | Dugger et al. |
| 2008/0175407 | A1 | 7/2008 | Zhang |
| 2008/0201138 | A1 | 8/2008 | Visser |
| 2008/0208538 | A1 | 8/2008 | Visser et al. |
| 2008/0260175 | A1 | 10/2008 | Elko |
| 2009/0164212 | A1 | 6/2009 | Chan et al. |
| 2009/0254338 | A1 | 10/2009 | Chan et al. |

FOREIGN PATENT DOCUMENTS

| | | | |
|---|---|---|---|
| EP | 1006652 | A2 | 6/2000 |
| EP | 1796085 | | 6/2007 |
| JP | 07131886 | | 5/1995 |
| JP | 2002540696 | A | 11/2002 |
| JP | 2003526142 | A | 9/2003 |
| JP | 2008057926 | A | 3/2008 |
| WO | WO0127874 | | 4/2001 |
| WO | WO2004053839 | | 6/2004 |
| WO | WO2005083706 | | 9/2005 |
| WO | WO2006012578 | | 2/2006 |
| WO | WO2006028587 | | 3/2006 |
| WO | WO2006034499 | | 3/2006 |
| WO | WO2007100330 | | 9/2007 |
| WO | WO2007103037 | | 9/2007 |

OTHER PUBLICATIONS

Amari, S.et al. "Stability Analysis of Learning Algorithms for Blind Source Separation," Neural Networks Letter, 10(8):1345-1351. 1997.

Araki S et al: "A Robust and Precise Method for Solving the Permutation Problem of Frequency-Domain Blind Source Separation" IEEE Transactions on Speech and Audio Processing, IEEE Service Center, New York, NY, US, vol. 12, No. 5, Sep. 1, 2004, pp. 530-538, XP011116331, ISSN: 1063-6676, DOI: DO1 : 10.1109/TSA. 2004. 832994 * paragraph [II. B] * * paragraphs [ III. A ] , [ III. B ] * * figure 5 *.

Bell, A. et al.: "An Information-Maximization Approach to Blind Separation and Blind Deconvolution," Howard Hughes Medical Institute, Computational Neurobiology Laboratory, The Salk Institute, La Jolla, CA USA and Department of Biology, University of California, San Diego, La Jolla, CA USA., pp. 1129-1159.

Cardosa, J-F., "Fourth-Order Cumulant Structure Forcing. Application to Blind Array Processing." Proc. IEEE SP Workshop on SSAP-92, pp. 136-139. 1992.

Cohen, I., et al., "Real-Time TF-GSC in Nonstationary Noise Environments", Israel Institute of Technology, pp. 1-4, Sep. 2003.

Cohen. I., et al., "Speech Enhancement Based on a Microphone Array and Log-Spectral Amplitude Estimation", Israel Institute of Technology, pp. 1-3. 2002.

Comon, P.: "Independent Component Analysis, a New Concept?," Thomson-Sintra, Valbonne Cedex, France, Signal Processing 36 (1994) 287-314, (Aug. 24, 1992).

First Examination Report dated Oct. 23, 2006 from Indian Application No. 1571/CHENP/2005.

Griffiths, L. et al. "An Alternative Approach to Linearly Constrained Adaptive Beamforming." IEEE Transactions on Antennas and Propagation, vol. AP-30(1):27-34. Jan. 1982.

Herault, J. et al., "Space or time adaptive signal processing by neural network models" Neural Networks for Computing, in J. S. Denker (Ed.). Proc. of the AIP Conference (pp. 206-211) New York: American Institute of Physics. 1986.

Hoshuyama, O. et al., "A robust adaptive beamformer for microphone arrays with a blocking matrix using constrained adaptive filters." IEEE Transcations on Signal Processing, 47(10):2677-2684. 1999.

Hoshuyama, O., et al., "Robust Adaptive Beamformer with a Blocking Matrix Using Coefficient-Constrained Adaptive Filters", IEICE Trans, Fundamentals, vol E-82-A, No. 4, Apr. 1999, pp. 640-647.

Hyvarinen, A. et al. "A fast fixed-point algorithm for independent component analysis" Neural Computation, 9:1483-1492. 1997.

Hyvarinen, A.. "Fast and robust fixed-point algorithms for independent component analysis." IEEE Trans. on Neural Networks, 10(3):626-634. 1999.

International Search Report and Written Opinion—PCT/US2009/046021, International Search Authority—European Patent Office—Aug. 10, 2009.

Jutten, C. et al.: "Blind Separation of Sources, Part I: An Adaptive Algorithm based on Neuromimetic Architecture," Elsevier Science Publishers B.V., Signal Processing 24 (1991) 1-10.

Lambert, R. H. "Multichannel blind deconvolution: FIR matrix algebra and seperation of multipath mixtures." Doctoral Dissertation, University of Southern California. May 1996.

Lee, Te-Won et al., "A contextual blind separation of delayed and convolved sources" Proceedings of the 1997 IEEE International Conference on Acoutsics, Speech, and Signal Processing (ICASSP' 97), 2:1199-1202. 1997.

Lee, Te-Won., et al., "A Unifying Information-Theoretic Framework for Independent Component Analysis" Computers and Mathematics with Applications 39 (2000) pp. 1-21.

Lee, Te-Won et. al.: "Combining Time-Delayed Decorrelation and ICA: Towards Solving the Cocktail Party Problem," p. 1249-1252, (1998).

Lee. T.-W., et al., "Independent Component Analysis for Mixed Sub-Gaussian and Super-Gaussian Sources." 4th Joint Symposium Neural Computation Proceedings, 1997, pp. 132-139.

Molgedey, L. et al., "Separation of a mixture of independent signals using time delayed correlations," Physical Review Letters, The American Physical Society, 72(23):3634-3637. 1994.

Mukai, R., et al., "Blind Source Separation and DOA Estimation Using Small 3-D Microphone Array," in Proc. of HSCMA 2005, pp. d-9-10, Piscataway, Mar. 2005.
Mukai, R., et al., "Frequency Domain Blind Source Separation of Many Speech Signals Using Near-field and Far-field Models," EURASIP Journal on Applied Signal Processing, vol. 2006, Article ID 83683, 13 pages, 2006. doi:10.1155/ASP/2006/83683.
Murata, N. et. al.:"An On-line Algorithm for Blind Source Separation on Speech Signals." Proc. of 1998 International Symposium on Nonlinear Theory and its Application (NOLTA98), pp. 923-926, LeRegent, Crans-Montana, Switzerland 1998.
Office Action dated Mar. 23, 2007 from co-pending U.S. Appl. No. 11/463,376, filed Aug.9, 2006.
Office Action dated Jul. 23, 2007 from co-pending U.S. Appl. No. 11/187,504, filed Jul. 22, 2005.
Parra, L., et al.,. "An adaptive beamforming perspective on convolutive blind source separation" Chapter IV in Noise Reduction in Speech Applications, Ed. G. Davis, CRC Press: Princeton, NJ (2002).
Parra, L. et. al.: "Convolutive Blind Separation of Non-Stationary Sources," IEEE Transactions on Speech and Audio Processing, vol. 8(3), May 2000, p. 320-327.
Platt, et al., "Networks for the separation of sources that are superimposed and delayed." in J. Moody, S. Hanson, R. Lippmann (Eds.), Advances in Neural Information Processing 4 (pp. 730-737). San Francisco: Morgan-Kaufmann. 1992.
Serviere, Ch., et al., "Permutation Correction in the Frequency Domain in Blind Separation of Speech Mixtures." EURASIP Journal on Applied Signal Processing, vol. 2006. article ID 75206, pp. 1-16, DOI: 10.1155/ASP/75206.
Supplementary European Search Report—EP07751705—Search Authority—Munich—Mar. 16, 2011.
Taesu, K., et al., "Independent Vector Analysis: An Extension of ICA to Multivariate Components" Independent Component Analysis and Blind Signal Separation Lecture Notes in Computer Science; LNCS 3889, Springer-Verlag B erlin Heidelberg, Jan. 1, 2006, pp. 165-172, XP019028810.
Taesu K I M et al: "Independent Vector Analysis: An Extension of ICA to Multivariate Components", Mar. 5, 2006, Independent Component Analysis and Blind Signal Separation Lecture Notes in Computer Science;;LNCS, Springer, Berlin, DE, p. 165-172, XP019028810, ISBN: 978-3-540-32630-4 * paragraph C02.21 *.
Taesu Kim, et al., 'Independent Vector Analysis: Definition and Algorithms,' ACSSC'06, pp. 1393-1396, Oct. 2006.
Tatsuma, Junji et al., "A Study on Replacement Problem in Blind Signal Separation." Collection of Research Papers Reported in the General Meeting of the Institute of Electronics, Information and Communication Engineers, Japan, The Institute of Electronics, Information and Communication Engineers (IEICE), Mar. 8, 2004.
Tong, L. et al., "A Necessary and Sufficient Condition for the Blind Identification of Memoryless Systems." Circuits and Systems, IEEE International Symposium, 1:1-4. 1991.
Torkkola, K.: "Blind Separation of Convolved Sources Based on Information Maximization," Mortorola, Inc., Phoenix Corporate Research Laboratories, 2100 E. Elliot Rd. MD EL508, Tempe AZ 85284, USA, Proceedings of the International Joint Conference on Neura; p. 423-432.
Torkkola, Kari. "Blind deconvolution, information maximization and recursive filters." IEEE International Conference on Acoustics, Speech, and Signal Processing (ICASSP'97), 4:3301-3304. 1997.
Van Compernolle, D. et al., "Signal Separation in a Symmetric Adaptive Noise Canceler by Output Decorrelation." Acoustics, Speech and Signal Processing, 1992, ICASSP-92., 1992 IEEE International Conference, 4:221-224.
Visser, E., et al., "A Spatio-temporal speech enhancement for robust speech recognition in noisy environments." University of California, San Diego. Institute for Neural Computation. White Paper. pp. 1-4, doi:10.1016/S0167-6393(03)00010-4 (Oct. 2003).
Visser, E. et al. "Speech enhancement using blind source separation and two-channel energy based speaker detection" Acoustics, Speech, and Signal Processing, 2003. Proceedings ICASSP'03 2003 IEEE International Conference on, vol. 1, Apr. 6-10, 2003, pp. I.
Visser, E. et. al.: "Blind Source Separation in Mobile Environments Using a Priori Knowledge" Acoustics, Speech, and Signal Processing, 2004 Proceedings. (ICASSP '04).
Yellin, D. et al. "Multichannel signal separation: Methods and analysis." IEEE Transactions on Signal Processing. 44(1):106-118, Jan. 1996.
Yermeche, Z., et al., A Constrained Subband Beamforming Algorithm for Speech Enhancement. Blekinge Institute of Technology. Department of Signal Processing, Dissertaion ( 2004). pp. 1-135.
Yermeche. Zohra. "Subband Beamforming for Speech Enhancement in Hands-Free Communication." Blekinge Institute of Technology, Department of Signal Processing, Research Report (Dec. 2004). pp. 1-74.
Hua, T.P. et al. A new self-calibration technique for adaptive microphone arrays. 2005 International Workshop on Acoustic Echo and Noise Control, Eindhoven, NL. 4 pp. Last accessed Jan. 21, 2009 at iwaenc05.ele.tue.nl/proceedings/papers/S04-13.pdf.
English-language abstract for patent document DE 19849739 (A1). 1 p.
Buchner et al. "A Generalization of Blind Source Separation Algorithms for Convolutive Mixtures Based on Second-Order Statistics", IEEE Transactions on Speech and Audio Processing, Vol. 13, No. 1, January 2005.
Choi et al. "Blind Source Separation and Independent Component Anaysis: A Review", Neural Information processing—Letters and Reviews, vol. 6, No. 1, Jan. 2005.
Der, "Blind Signal Separation", Research Report, [Online] from Department of Electrical & Computer Engineering, McGill University, 2001.
Ikeda et al. "A Method of Blind Separation on Temporal Structure of Signals", Proc. 5th Int.Conf. Neural Inf. Process, Kitakyushu, Japan, Oct. 1998.
Visser et al. "A comparison of simultaneous 3-channel blind source separation to selective separation on channel pairs using 2-channel BSS", ICLSP'04, vol. IV, 2004, pp. 2869-2872.

SYSTEMS, METHODS, AND APPARATUS FOR MULTICHANNEL SIGNAL AMPLITUDE BALANCING

CLAIM OF PRIORITY UNDER 35 U.S.C. §119

The present application for patent claims priority to Provisional Application No. 61/058,132 entitled "SYSTEM AND METHOD FOR AUTOMATIC GAIN MATCHING OF A PAIR OF MICROPHONES," filed Jun. 2, 2008 and assigned to the assignee hereof.

Reference to Co-pending Applications for Patent

The present application for patent is related to the following co-pending U.S. patent applications:

U.S. patent application Ser. No. 12/197,924, entitled "SYSTEMS, METHODS, AND APPARATUS FOR SIGNAL SEPARATION," filed Aug. 25, 2008 and assigned to the assignee hereof, and U.S. patent application Ser. No. 12/334,246, entitled "SYSTEMS, METHODS, AND APPARATUS FOR MULTI-MICROPHONE BASED SPEECH ENHANCEMENT," filed Dec. 12, 2008 and assigned to the assignee hereof.

BACKGROUND

1. Field

This disclosure relates to balancing of an audio signal having two or more channels.

2. Background

Many activities that were previously performed in quiet office or home environments are being performed today in acoustically variable situations like a car, a street, or a café. Consequently, a substantial amount of voice communication is taking place using mobile devices (e.g., handsets and/or headsets) in environments where users are surrounded by other people, with the kind of noise content that is typically encountered where people tend to gather. Such noise tends to distract or annoy users in phone conversations. Moreover, many standard automated business transactions (e.g., account balance or stock quote checks) employ voice recognition based data inquiry, and the accuracy of these systems may be significantly impeded by interfering noise.

For applications in which communication occurs in noisy environments, it may be desirable to separate a desired speech signal from background noise. Noise may be defined as the combination of all signals interfering with or otherwise degrading the desired signal. Background noise may include numerous noise signals generated within the acoustic environment, such as background conversations of other people, as well as reflections and reverberation generated from each of the signals. Unless the desired speech signal is separated and isolated from the background noise, it may be difficult to make reliable and efficient use of it. In one particular example, a speech signal is generated in a noisy environment, and speech processing methods are used to separate the speech signal from the environmental noise. Such speech signal processing is important in many areas of everyday communication, since noise is almost always present in real-world conditions.

Noise encountered in a mobile environment may include a variety of different components, such as competing talkers, music, babble, street noise, and/or airport noise. As the signature of such noise is typically nonstationary and close to the user's own frequency signature, the noise may be hard to model using traditional single microphone or fixed beamforming type methods. Single microphone noise reduction techniques typically require significant parameter tuning to achieve optimal performance. For example, a suitable noise reference may not be directly available in such cases, and it may be necessary to derive a noise reference indirectly. Therefore multiple microphone based advanced signal processing may be desirable to support the use of mobile devices for voice communications in noisy environments.

SUMMARY

A method of processing a multichannel audio signal according to a general configuration includes calculating a series of values of a level of a first channel of the audio signal over time and calculating a series of values of a level of a second channel of the audio signal over time. This method includes calculating a series of values of a gain factor over time, based on the series of values of a level of the first channel and the series of values of a level of the second channel, and controlling the amplitude of the second channel relative to the amplitude of the first channel over time according to the series of values of the gain factor. This method includes indicating that a segment of the audio signal is an information segment. In this method, calculating a series of values of a gain factor over time includes, for at least one of the series of values of the gain factor and in response to said indicating, calculating the gain factor value based on a corresponding value of the level of the first channel, a corresponding value of the level of the second channel, and a bias factor. In this method, the bias factor is based on a standard orientation of an audio sensing device relative to a directional information source. Execution of such a method within an audio sensing device, such as a communications device, is also disclosed herein. Apparatus that include means for performing such a method, and computer-readable media having executable instructions for such a method, are also disclosed herein.

An apparatus for processing a multichannel audio signal according to a general configuration includes means for calculating a series of values of a level of a first channel of the audio signal over time, and means for calculating a series of values of a level of a second channel of the audio signal over time. This apparatus includes means for calculating a series of values of a gain factor over time, based on the series of values of a level of the first channel and the series of values of a level of the second channel; and means for controlling the amplitude of the second channel relative to the amplitude of the first channel over time according to the series of values of the gain factor. This apparatus includes means for indicating that a segment of the audio signal is an information segment. In this apparatus, the means for calculating a series of values of a gain factor over time is configured to calculate at least one of the series of values of the gain factor, in response to the indication, based on a corresponding value of the level of the first channel, a corresponding value of the level of the second channel, and a bias factor. In this apparatus, the bias factor is based on a standard orientation of an audio sensing device relative to a directional information source. Implementations of this apparatus in which the means for calculating a series of values of a level of a first channel is a first level calculator, the means for calculating a series of values of a level of a second channel is a second level calculator, the means for calculating a series of values of a gain factor is a gain factor calculator, the means for controlling the amplitude of the second channel is an amplitude control element, and the means for indicating is a information segment indicator are also disclosed herein.

Various implementations of an audio sensing device that includes a microphone array configured to produce the multichannel audio signal are also disclosed herein.

DETAILED DESCRIPTION

Figures 1A, 1B, 1C, 1D:
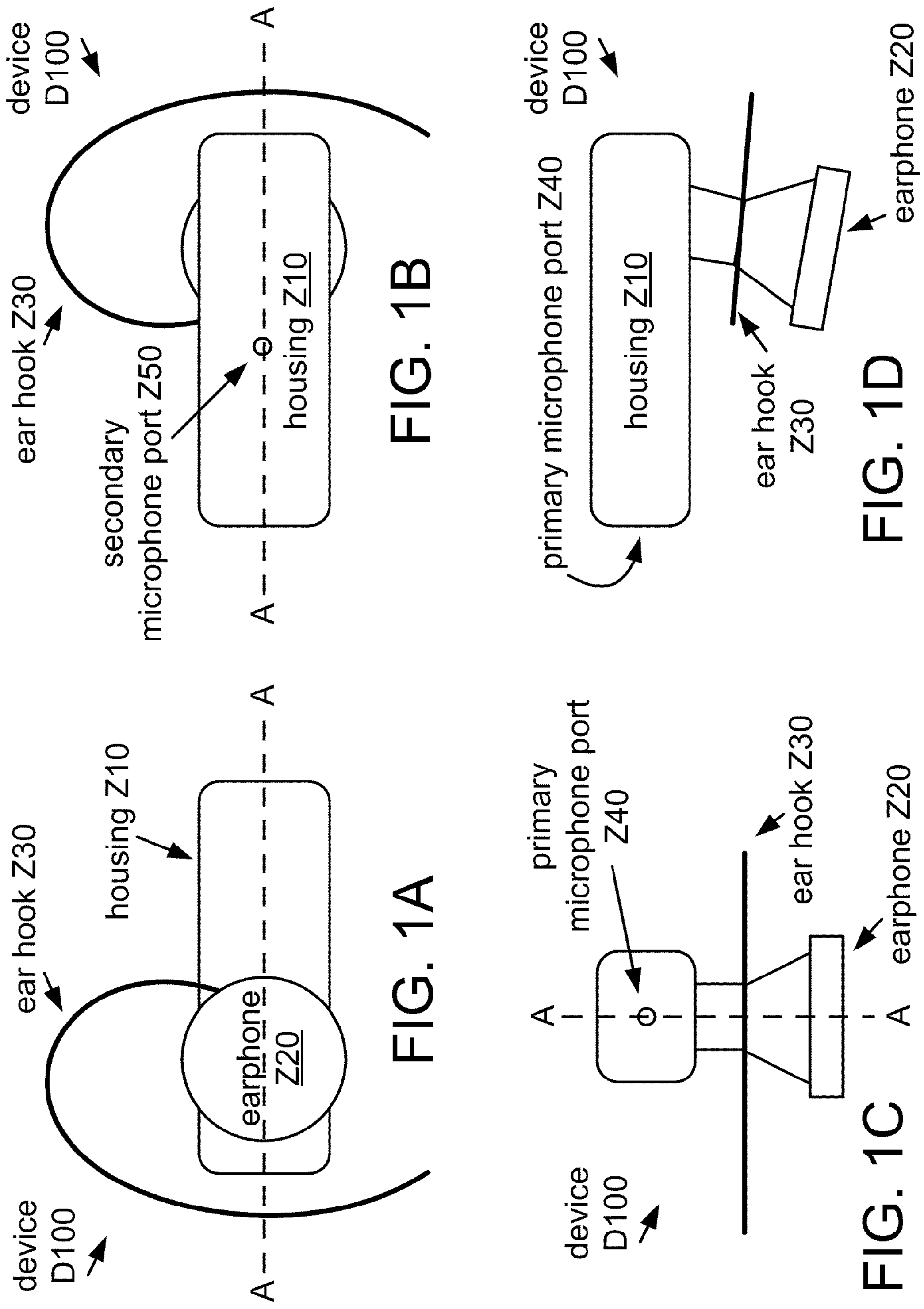
FIGS. 1A to 1D show various views of a multi-microphone wireless headset D100.
Figures 2A, 2B, 2C, 2D:
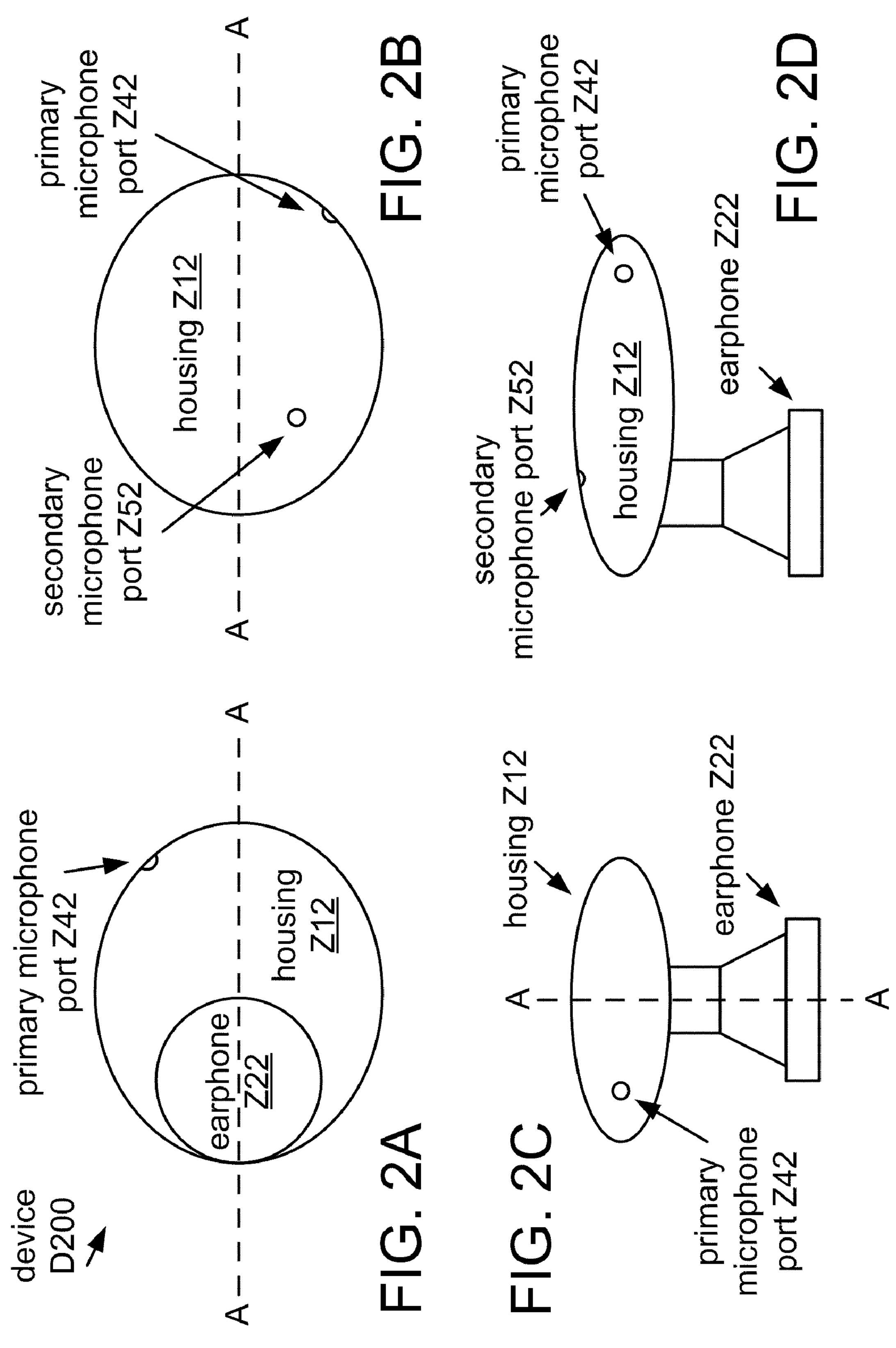
FIGS. 2A to 2D show various views of a multi-microphone wireless headset D200.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as creating, computing, or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). Similarly, the term "in response to" is used to indicate any of its ordinary meanings, including "in response to at least."

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure.

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

It may be desirable to produce a portable audio sensing device that has an array R100 of two or more microphones configured to receive acoustic signals. For example, a hearing aid may be implemented to include such an array. Other examples of a portable audio sensing device that may be implemented to include such an array and used for audio recording and/or voice communications applications include a telephone handset (e.g., a cellular telephone handset); a wired or wireless headset (e.g., a Bluetooth headset); a handheld audio and/or video recorder; a personal media player configured to record audio and/or video content; a personal digital assistant (PDA) or other handheld computing device; and a notebook computer, laptop computer, or other portable computing device.

Each microphone of array R100 may have a response that is omnidirectional, bidirectional, or unidirectional (e.g., cardioid). The various types of microphones that may be used in array R100 include (without limitation) piezoelectric microphones, dynamic microphones, and electret microphones. In a device for portable voice communications, such as a handset or headset, the center-to-center spacing between adjacent microphones of array R100 is typically in the range of from about 1.5 cm to about 4.5 cm, although a larger spacing (e.g., up to 10 or 15 cm) is also possible in a device such as a handset. In a hearing aid, the center-to-center spacing between adjacent microphones of array R100 may be as little as about 4 or 5 mm. The microphones of array R100 may be arranged along a line or, alternatively, such that their centers lie at the vertices of a two-dimensional (e.g., triangular) or three-dimensional shape.

FIGS. 1A to 1D show various views of a multi-microphone portable audio sensing device D100. Device D100 is a wireless headset that includes a housing Z10 which carries a two-microphone implementation of array R100 and an earphone Z20 that extends from the housing. Such a device may be configured to support half- or full-duplex telephony via communication with a telephone device such as a cellular telephone handset (e.g., using a version of the Bluetooth™ protocol as promulgated by the Bluetooth Special Interest Group, Inc., Bellevue, Wash.). In general, the housing of a headset may be rectangular or otherwise elongated as shown in FIGS. 1A, 1B, and 1D (e.g., shaped like a miniboom) or may be more rounded or even circular. The housing may also enclose a battery and a processor and/or other processing circuitry (e.g., a printed circuit board and components mounted thereon) and may include an electrical port (e.g., a mini-Universal Serial Bus (USB) or other port for battery charging) and user interface features such as one or more button switches and/or LEDs. Typically the length of the housing along its major axis is in the range of from one to three inches.

Typically each microphone of array R100 is mounted within the device behind one or more small holes in the housing that serve as an acoustic port. FIGS. 1B to 1D show the locations of the acoustic port Z40 for the primary microphone of the array of device D100 and the acoustic port Z50 for the secondary microphone of the array of device D100.

A headset may also include a securing device, such as ear hook Z30, which is typically detachable from the headset. An external ear hook may be reversible, for example, to allow the user to configure the headset for use on either ear. Alternatively, the earphone of a headset may be designed as an internal securing device (e.g., an earplug) which may include a removable earpiece to allow different users to use an earpiece of different size (e.g., diameter) for better fit to the outer portion of the particular user's ear canal.

FIGS. 2A to 2D show various views of a multi-microphone portable audio sensing device D200 that is another example of a wireless headset. Device D200 includes a rounded, elliptical housing Z12 and an earphone Z22 that may be configured as an earplug. FIGS. 2A to 2D also show the locations of the acoustic port Z42 for the primary microphone and the acoustic port Z52 for the secondary microphone of the array of device D200. It is possible that secondary microphone port Z52 may be at least partially occluded (e.g., by a user interface button).

Figure 3A:
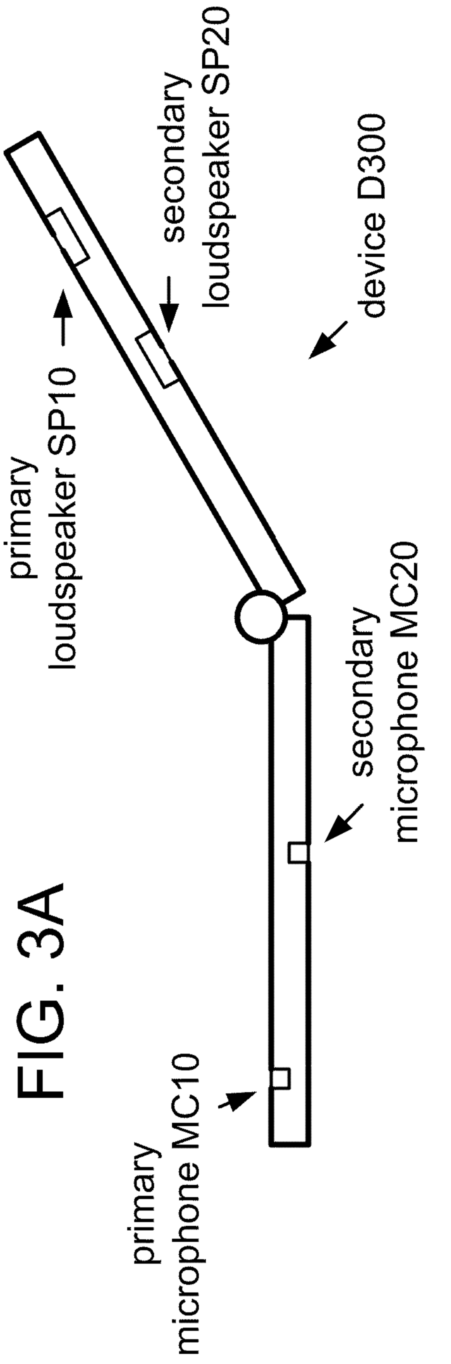
FIG. 3A shows a cross-sectional view (along a central axis) of a multi-microphone communications handset D300.
Figure 3B:
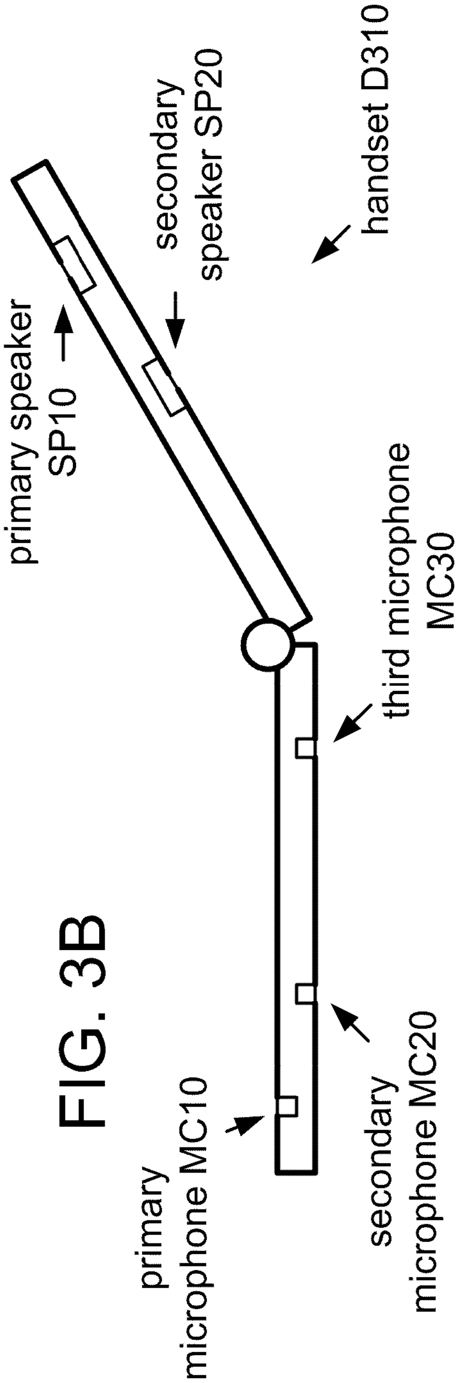
FIG. 3B shows a cross-sectional view of an implementation D310 of device D300.

FIG. 3A shows a cross-sectional view (along a central axis) of a multi-microphone portable audio sensing device D300 that is a communications handset. Device D300 includes an implementation of array R100 having a primary microphone MC10 and a secondary microphone MC20. In this example, device D300 also includes a primary loudspeaker SP10 and a secondary loudspeaker SP20. Such a device may be configured to transmit and receive voice communications data wirelessly via one or more encoding and decoding schemes (also called "codecs"). Examples of such codecs include the Enhanced Variable Rate Codec, as described in the Third Generation Partnership Project 2 (3GPP2) document C.S0014-C, v1.0, entitled "Enhanced Variable Rate Codec, Speech Service Options 3, 68, and 70 for Wideband Spread Spectrum Digital Systems," February 2007 (available online at www-dot-3gpp-dot-org); the Selectable Mode Vocoder speech codec, as described in the 3GPP2 document C.S0030-0, v3.0, entitled "Selectable Mode Vocoder (SMV) Service Option for Wideband Spread Spectrum Communication Systems," January 2004 (available online at www-dot-3gpp-dot-org); the Adaptive Multi Rate (AMR) speech codec, as described in the document ETSI TS 126 092 V6.0.0 (European Telecommunications Standards Institute (ETSI), Sophia Antipolis Cedex, FR, December 2004); and the AMR Wideband speech codec, as described in the document ETSI TS 126 192 V6.0.0 (ETSI, December 2004). In the example of FIG. 3A, handset D300 is a clamshell-type cellular telephone handset (also called a "flip" handset). Other configurations of such a multi-microphone communications handset include bar-type and slider-type telephone handsets. FIG. 3B shows a cross-sectional view of an implementation D310 of device D300 that includes a three-microphone implementation of array R100 that includes a third microphone MC30.

Figure 4C:
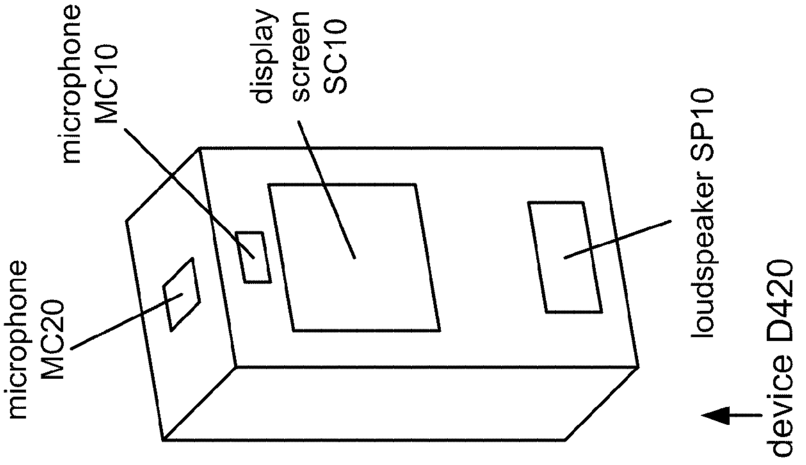
FIGS. 4B and 4C show diagrams of implementations D410 and D420, respectively, of device D400.
Figure 4B:
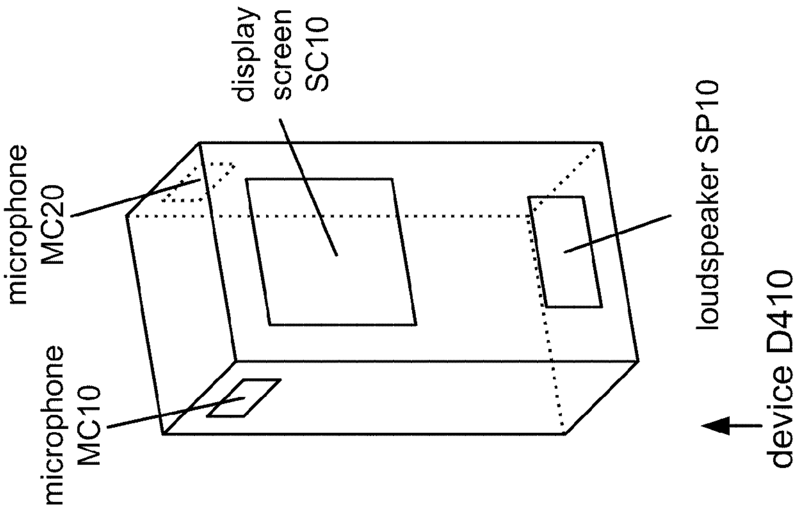
Figure 4A:
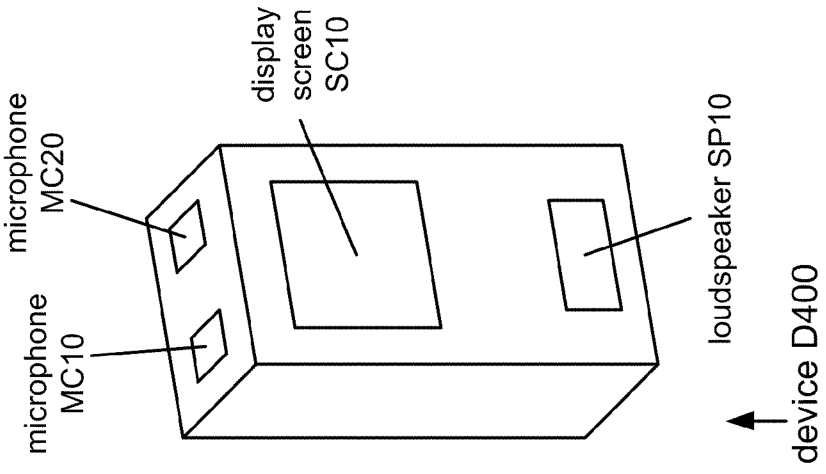
FIG. 4A shows a diagram of a multi-microphone media player D400.

FIG. 4A shows a diagram of a multi-microphone portable audio sensing device D400 that is a media player. Such a device may be configured for playback of compressed audio or audiovisual information, such as a file or stream encoded according to a standard compression format (e.g., Moving Pictures Experts Group (MPEG)-1 Audio Layer 3 (MP3), MPEG-4 Part 14 (MP4), a version of Windows Media Audio/Video (WMA/WMV) (Microsoft Corp., Redmond, Wash.), Advanced Audio Coding (AAC), International Telecommunication Union (ITU)-T H.264, or the like). Device D400 includes a display screen SC10 and a loudspeaker SP10 disposed at the front face of the device, and microphones MC10 and MC20 of array R100 are disposed at the same face of the device (e.g., on opposite sides of the top face as in this example, or on opposite sides of the front face). FIG. 4B shows another implementation D410 of device D400 in which microphones MC10 and MC20 are disposed at opposite faces of the device, and FIG. 4C shows a further implementation D420 of device D400 in which microphones MC10 and MC20 are disposed at adjacent faces of the device. A media player may also be designed such that the longer axis is horizontal during an intended use.

Figure 5B:
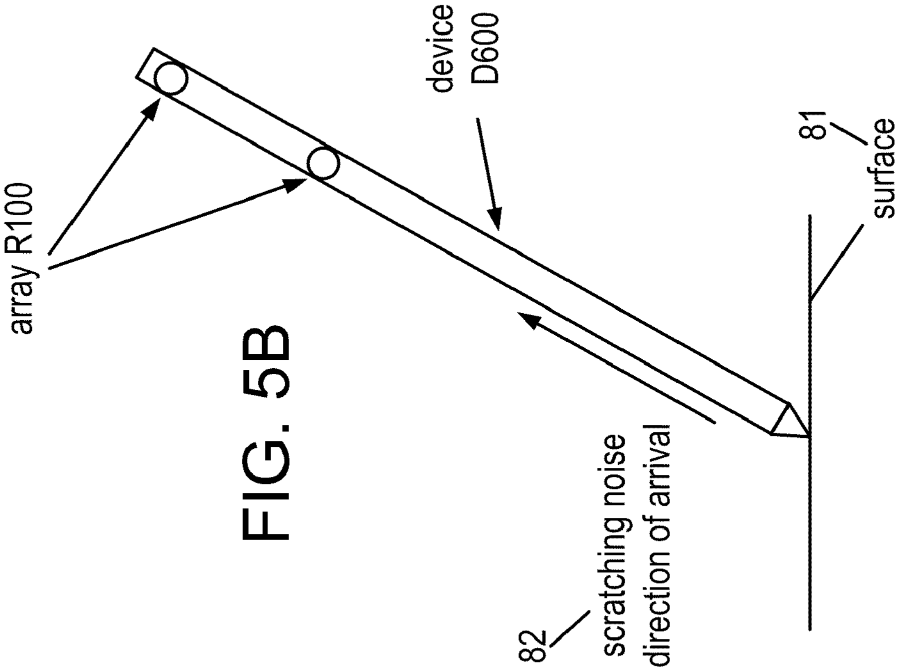
FIG. 5B shows a diagram of a multi-microphone writing device D600.
Figure 5A:
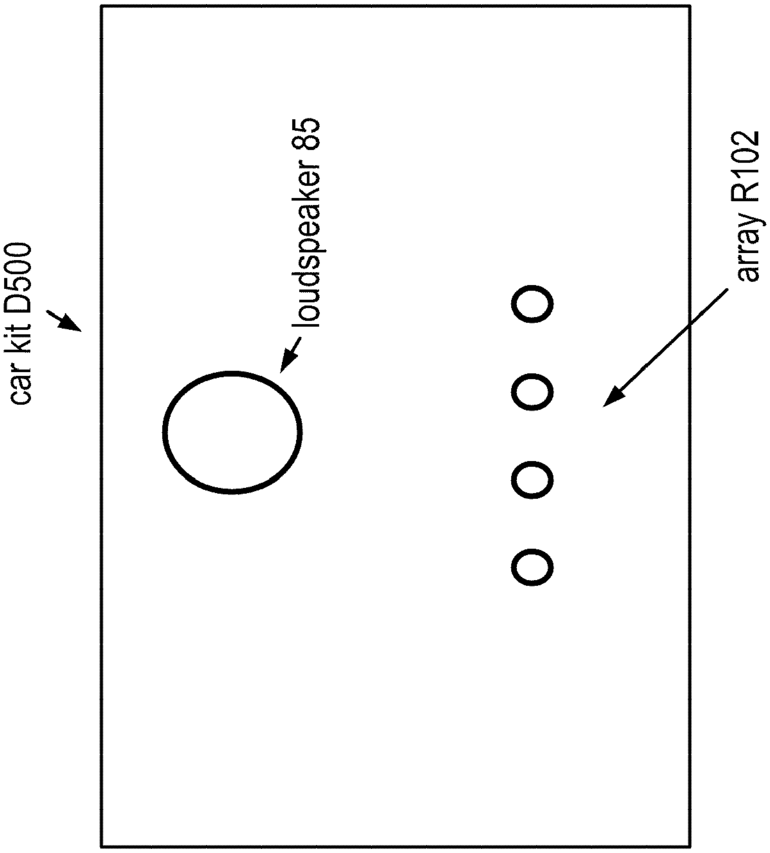
FIG. 5A shows a diagram of a multi-microphone hands-free car kit D500.

FIG. 5A shows a diagram of a multi-microphone portable audio sensing device D500 that is a hands-free car kit. Such a device may be configured to be installed in the dashboard of a vehicle or to be removably fixed to the windshield, a visor, or another interior surface. Device D500 includes a loudspeaker 85 and an implementation of array R100. In this particular example, device D500 includes a four-microphone implementation R102 of array R100. Such a device may be configured to transmit and receive voice communications data wirelessly via one or more codecs, such as the examples listed above. Alternatively or additionally, such a device may be configured to support half- or full-duplex telephony via communication with a telephone device such as a cellular telephone handset (e.g., using a version of the Bluetooth™ protocol as described above).

FIG. 5B shows a diagram of a multi-microphone portable audio sensing device D600 that is a writing device (e.g., a pen or pencil). Device D600 includes an implementation of array R100. Such a device may be configured to transmit and receive voice communications data wirelessly via one or more codecs, such as the examples listed above. Alternatively or additionally, such a device may be configured to support half- or full-duplex telephony via communication with a device such as a cellular telephone handset and/or a wireless headset (e.g., using a version of the Bluetooth™ protocol as described above). Device D600 may include one or more processors configured to perform a spatially selective processing operation to reduce the level of a scratching noise 82, which may result from a movement of the tip of device D600 across a drawing surface 81 (e.g., a sheet of paper), in a signal produced by array R100. It is expressly disclosed that applicability of systems, methods, and apparatus disclosed herein is not limited to the particular examples shown in FIGS. 1A to 5B. During the operation of a multi-microphone audio sensing device (e.g., device D100, D200, D300, D400, D500, or D600), array R100 produces a multichannel signal in which each channel is based on the response of a corresponding one of the microphones to the acoustic environment. One microphone may receive a particular sound more directly than another microphone, such that the corresponding channels differ from one another to provide collectively a more complete representation of the acoustic environment than can be captured using a single microphone.

Figure 6A:
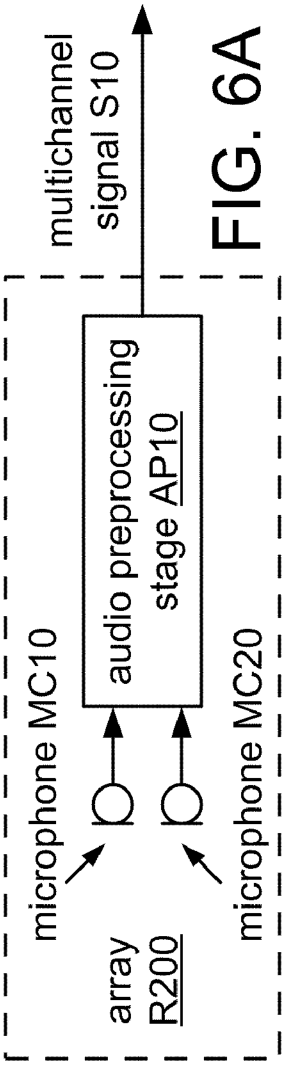
FIG. 6A shows a block diagram of an implementation R200 of array R100.

It may be desirable for array R100 to perform one or more processing operations on the signals produced by the microphones to produce multichannel signal S10. FIG. 6A shows a block diagram of an implementation R200 of array R100 that includes an audio preprocessing stage AP10 configured to perform one or more such operations, which may include (without limitation) impedance matching, analog-to-digital conversion, gain control, and/or filtering in the analog and/or digital domains.

Figure 6B:
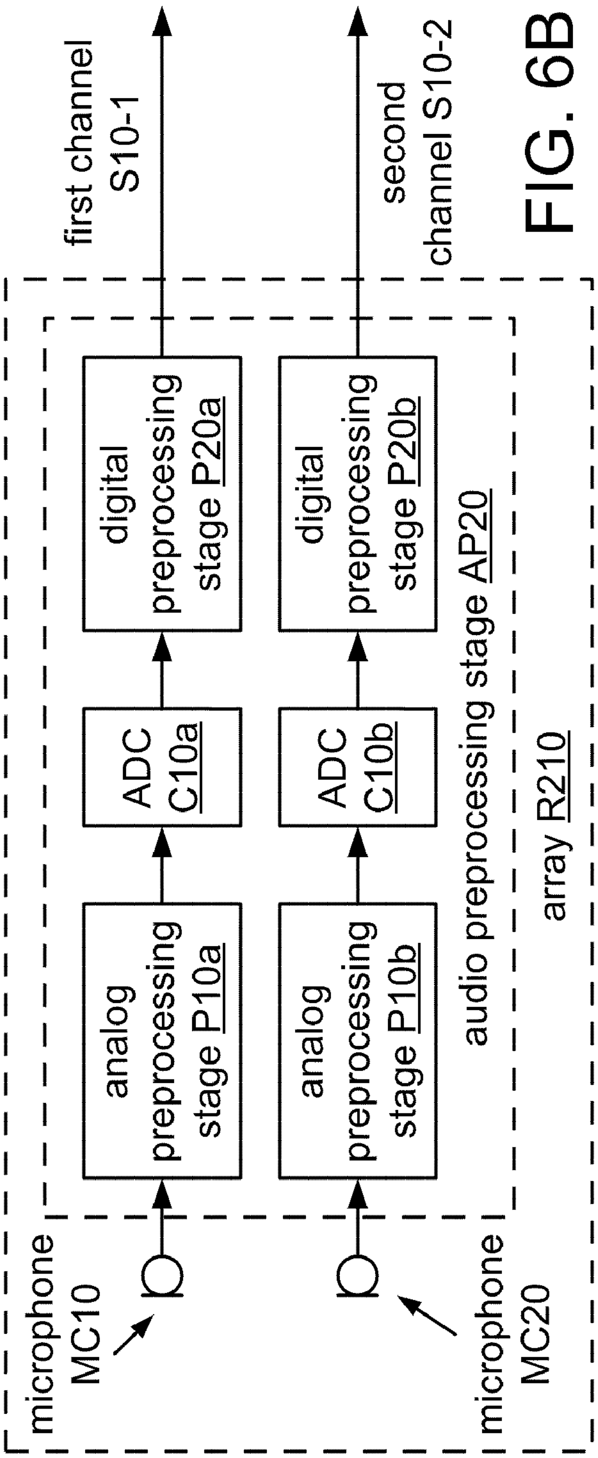
FIG. 6B shows a block diagram of an implementation R210 of array R200.

FIG. 6B shows a block diagram of an implementation R210 of array R200. Array R210 includes an implementation AP20 of audio preprocessing stage AP10 that includes analog preprocessing stages P10*a* and P10*b*. In one example, stages P10*a* and P10*b* are each configured to perform a highpass filtering operation (e.g., with a cutoff frequency of 50, 100, or 200 Hz) on the corresponding microphone signal.

It may be desirable for array R100 to produce the multichannel signal as a digital signal, that is to say, as a sequence of samples. Array R210, for example, includes analog-to-digital converters (ADCs) C10*a* and C10*b* that are each arranged to sample the corresponding analog channel. Typical sampling rates for acoustic applications include 8 kHz, 12 kHz, 16 kHz, and other frequencies in the range of from about 8 to about 16 kHz, although sampling rates as high as about 44 kHz may also be used. In this particular example, array R210 also includes digital preprocessing stages P20*a* and P20*b* that are each configured to perform one or more preprocessing operations (e.g., echo cancellation, noise reduction, and/or spectral shaping) on the corresponding digitized channel.

The multichannel signal produced by array R100 may be used to support spatial processing operations, such as operations that determine the distance between the audio sensing device and a particular sound source, reduce noise, enhance signal components that arrive from a particular direction, and/or separate one or more sound components from other environmental sounds. For example, a spatially selective processing operation may be performed to separate one or more desired sound components of the multichannel signal from one or more noise components of the multichannel signal. A typical desired sound component is the sound of the voice of the user of the audio sensing device, and examples of noise components include (without limitation) diffuse environmental noise, such as street noise, car noise, and/or babble noise; and directional noise, such as an interfering speaker and/or sound from another point source, such as a television, radio, or public address system. Examples of spatial processing operations, which may be performed within the audio sensing device and/or within another device, are described in U.S. patent application Ser. No. 12/197,924, filed Aug. 25, 2008, entitled "SYSTEMS, METHODS, AND APPARATUS FOR SIGNAL SEPARATION," and U.S. patent application Ser.

No. 12/277,283, filed Nov. 24, 2008, entitled "SYSTEMS, METHODS, APPARATUS, AND COMPUTER PROGRAM PRODUCTS FOR ENHANCED INTELLIGIBILITY" and include (without limitation) beamforming and blind source separation operations.

Variations may arise during manufacture of the microphones of array R100, such that even among a batch of mass-produced and apparently identical microphones, sensitivity may vary significantly from one microphone to another. Microphones for use in portable mass-market devices may be manufactured at a sensitivity tolerance of +/−three decibels, for example, such that the sensitivity of two such microphones in an implementation of array R100 may differ by as much as six decibels.

Figure 7A:
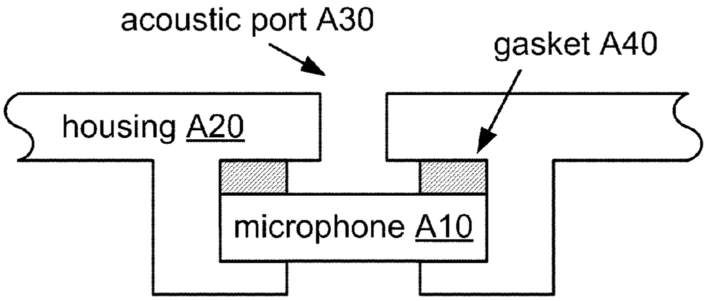
FIG. 7A shows a cross-section of an example in which a microphone of array R100 may be mounted within a device housing behind an acoustic port.

Moreover, changes may occur in the effective response characteristics of a microphone once it has been mounted into or onto the device. A microphone is typically mounted within a device housing behind an acoustic port and may be fixed in place by pressure and/or by friction or adhesion. FIG. 7A shows a cross-section of an example in which a microphone A10 is mounted within a device housing A20 behind an acoustic port A30. Housing A20 is typically made of molded plastic (e.g., polycarbonate (PC) and/or acrylonitrile-butadiene-styrene (ABS)), and acoustic port A30 is typically implemented as one or more small holes or slots in the housing. Tabs in the housing A20 apply pressure to microphone A10 against a compressible (e.g., elastomeric) gasket A40 to secure the microphone in position. Many factors may affect the effective response characteristics of a microphone mounted in such a manner, such as resonances and/or other acoustic characteristics of the cavity within which the microphone is mounted, the amount and/or uniformity of pressure against the gasket, the size and shape of the acoustic port, etc.

The performance of an operation on a multichannel signal produced by array R100, such as a spatial processing operation, may depend on how well the response characteristics of the array channels are matched to one another. For example, it is possible for the levels of the channels to differ due to a difference in the response characteristics of the respective microphones, a difference in the gain levels of respective preprocessing stages, and/or a difference in circuit noise levels. In such case, the resulting multichannel signal may not provide an accurate representation of the acoustic environment unless the difference between the microphone response characteristics may be compensated. Without such compensation, a spatial processing operation based on such a signal may provide an erroneous result. For example, amplitude response deviations between the channels as small as one or two decibels at low frequencies (i.e., approximately 100 Hz to 1 kHz) may significantly reduce low-frequency directionality. Effects of an imbalance among the channels of array R100 may be especially detrimental for applications processing a multichannel signal from an implementation of array R100 that has more than two microphones.

It may be desirable to perform a pre-delivery calibration operation on an assembled multi-microphone audio sensing device (that is to say, before delivery to the user) in order to quantify a difference between the effective response characteristics of the channels of the array. For example, it may be desirable to perform a pre-delivery calibration operation on an assembled multi-microphone audio sensing device in order to quantify a difference between the effective gain characteristics of the channels of the array.

Figure 7B:
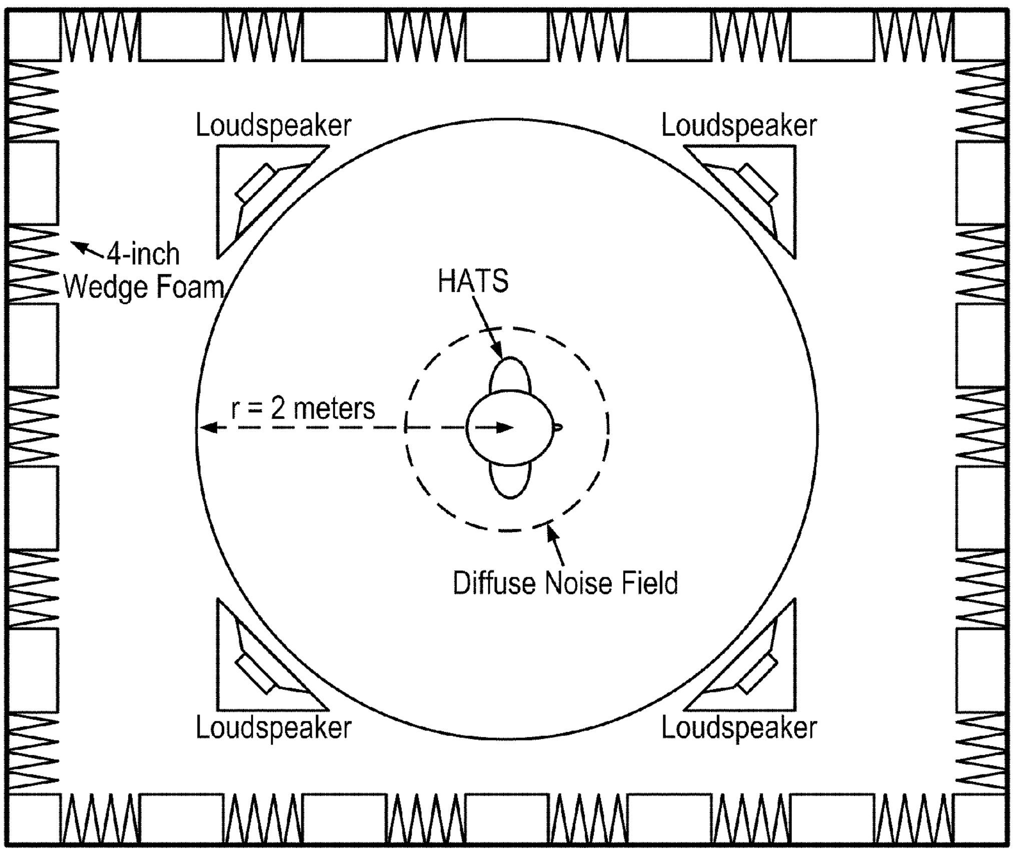
FIG. 7B shows a top view of an anechoic chamber arranged for a pre-delivery calibration operation.

A pre-delivery calibration operation may include calculating one or more compensation factors based on a response of an instance of array R100 to a sound field in which all of the microphones to be calibrated are exposed to the same sound pressure levels (SPLs). FIG. 7B shows a top view of an anechoic chamber arranged for one example of such an operation. In this example, a Head and Torso Simulator (HATS, as manufactured by Bruel & Kjaer, Naerum, Denmark) is positioned in the anechoic chamber within an inward-focused array of four loudspeakers. The loudspeakers are driven by a calibration signal to create a sound field that encloses the HATS as shown such that the sound pressure level (SPL) is substantially constant with respect to position within the field. In one example, the loudspeakers are driven by a calibration signal of white or pink noise to create a diffuse noise field. In another example, the calibration signal includes one or more tones at frequencies of interest (e.g., tones in the range of about 200 Hz to about 2 kHz, such as at 1 kHz). It may be desirable for the sound field to have an SPL of from 75 to 78 dB at the HATS ear reference point (ERP) or mouth reference point (MRP).

A multi-microphone audio sensing device having an instance of array R100 that is to be calibrated is placed appropriately within the sound field. For example, a headset D100 or D200 may be mounted at an ear of the HATS in a standard orientation relative to the mouth speaker, as in the example of FIG. 8, or a handset D300 may be positioned at the HATS in a standard orientation relative to the mouth speaker, as in the example of FIG. 9. The multichannel signal produced by the array in response to the sound field is then recorded. Based on a relation between the channels of the signal, one or more compensation factors are calculated (e.g., by one or more processors of the device and/or by one or more external processors) to match the gain and/or frequency response characteristics of the channels of the particular instance of the array. For example, a difference or ratio between the levels of the channels may be calculated to obtain a gain factor, which may henceforth be applied to one of the channels (e.g., as a gain factor) to compensate for the difference between the gain response characteristics of the channels of the array.

While a pre-delivery calibration procedure may be useful during research and design, such a procedure may be too time-consuming or otherwise impractical to perform for most manufactured devices. For example, it may be economically infeasible to perform such an operation for each instance of a mass-market device. Moreover, a pre-delivery operation alone may be insufficient to ensure good performance over the lifetime of the device. Microphone sensitivity may drift or otherwise change over time, due to factors that may include aging, temperature, radiation, and contamination. Without adequate compensation for an imbalance among the responses of the various channels of the array, however, a desired level of performance for a multichannel operation, such as a spatially selective processing operation, may be difficult or impossible to achieve.

Figure 10A:
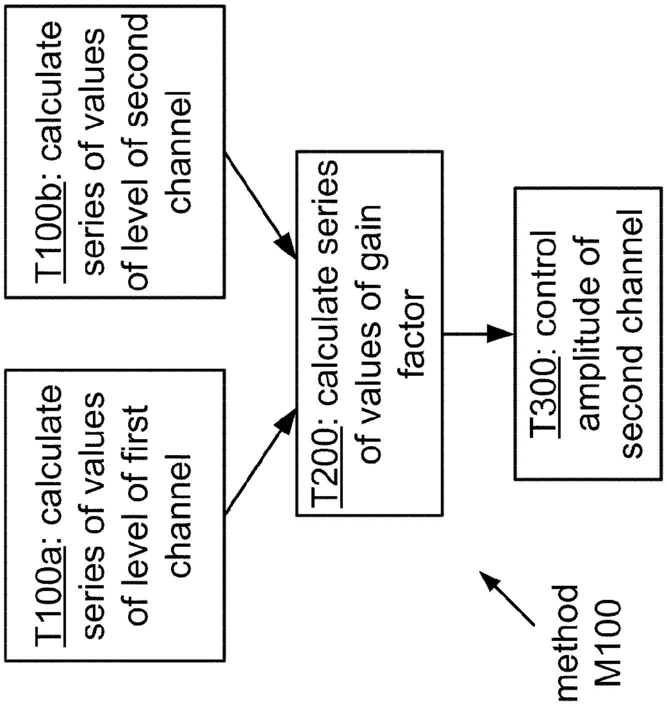
FIG. 10A shows a flowchart of a method M100 of processing a multichannel audio signal according to a general configuration.

FIG. 10A shows a flowchart of a method M100 of processing a multichannel audio signal (e.g., as produced by an implementation of array R100) according to a general configuration that includes tasks T100*a*, T100*b*, T200, and T300. Task T100*a* calculates a series of values of a level of a first channel of the audio signal over time, and task T100*b* calculates a series of values of a level of a second channel of the audio signal over time. Based on the series of values of the first and second channels, task T200 calculates a series of values of a gain factor over time. Task T300 controls the amplitude of the second channel relative to the amplitude of the first channel over time according to the series of gain factor values.

Tasks T100*a* and T100*b* may be configured to calculate each of the series of values of a level of the corresponding channel as a measure of the amplitude or magnitude (also called "absolute amplitude" or "rectified amplitude") of the channel over a corresponding period of time (also called a "segment" of the multichannel signal). Examples of measures of amplitude or magnitude include the total magnitude, the average magnitude, the root-mean-square (RMS) amplitude, the median magnitude, and the peak magnitude. In a digital domain, these measures may be calculated over a block of n sample values $x_i$, i=1, 2, . . . n, (also called a "frame") according to expressions such as the following:

$$\sum_{i=1}^{n} |x_i| \text{ (total magnitude);} \tag{1}$$

$$\frac{1}{n}\sum_{i=1}^{n} |x_i| \text{ (average magnitude);} \tag{2}$$

$$\sqrt{\frac{1}{n}\sum_{i=1}^{n} x_i^2} \text{ (RMS amplitude);} \tag{3}$$

$$\text{median}_{i=1,2,\ldots,n}|x_i| \text{ (median magnitude);} \tag{4}$$

$$\max_{i=1,2,\ldots,n}|x_i| \text{ (peak magnitude).} \tag{5}$$

Such expressions may also be used to calculate these measures in a transform domain (e.g., a Fourier or discrete cosine transform (DCT) domain). These measures may also be calculated in the analog domain according to similar expressions (e.g., using integration in place of summation).

Alternatively, tasks T100*a* and T100*b* may be configured to calculate each of the series of values of a level of the corresponding channel as a measure of the energy of the channel over a corresponding period of time. Examples of measures of energy include the total energy and the average energy. In a digital domain, these measures may be calculated over a block of n sample values $x_i$, i=1, 2, . . . , n, according to expressions such as the following:

$$\sum_{i=1}^{n} x_i^2 \text{ (total energy);} \tag{6}$$

$$\frac{1}{n}\sum_{i=1}^{n} x_i^2 \text{ (average energy).} \tag{7}$$

Such expressions may also be used to calculate these measures in a transform domain (e.g., a Fourier or discrete cosine transform (DCT) domain). These measures may also be calculated in the analog domain according to similar expressions (e.g., using integration in place of summation).

Typical segment lengths range from about five or ten milliseconds to about forty or fifty milliseconds, and the segments may be overlapping (e.g., with adjacent segments overlapping by 25% or 50%) or nonoverlapping. In one particular example, each channel of the audio signal is divided into a series of 10-millisecond nonoverlapping segments, task T100*a* is configured to calculate a value of a level for each segment of the first channel, and task T100*b* is configured to calculate a value of a level for each segment of the second channel. A segment as processed by tasks T100*a* and T100*b* may also be a segment (i.e., a "subframe") of a larger segment as processed by a different operation, or vice versa.

It may be desirable to configure tasks T100*a* and T100*b* to perform one or more spectral shaping operations on the audio signal channels before calculating the series of level values. Such operations may be performed in the analog and/or digital domains. For example, it may be desirable to configure each of tasks T100*a* and T100*b* to apply a lowpass filter (with a cutoff frequency of, e.g., 200, 500, or 1000 Hz) or a bandpass filter (with a passband of, e.g., 200 Hz to 1 kHz) to the signal from the respective channel before calculating the series of level values.

It may be desirable to configure task T100*a* and/or task T100*b* to include a temporal smoothing operation such that the corresponding series of level values is smoothed over time. Such an operation may be performed according to an expression such as:

$$L_{jn}=(\mu)L_{j\text{-}tmp}+(1-\mu)L_{j(n-1)}, \tag{8}$$

where $L_{jn}$ denotes the level value corresponding to segment n for channel j, $L_{j-tmp}$ denotes an unsmoothed level value calculated for channel j of segment n according to an expression such as one of expressions (1)-(7) above, $L_{j(n-1)}$ denotes the level value corresponding to the previous segment (n−1) for channel j, and μ denotes a temporal smoothing factor having a value in the range of from 0.1 (maximum smoothing) to one (no smoothing), such as 0.3, 0.5, or 0.7.

At some times during the operation of an audio sensing device, the acoustic information source and any directional noise sources are substantially inactive. At such times, the directional content of the multichannel signal may be insignificant relative to the background noise level. Corresponding segments of the audio signal that contain only silence or background noise are referred to herein as "background" segments. The sound environment at these times may be considered as a diffuse field, such that the sound pressure level at each microphone is typically equal, and it may be expected that the levels of the channels in the background segments should also be equal.

Figure 10B:
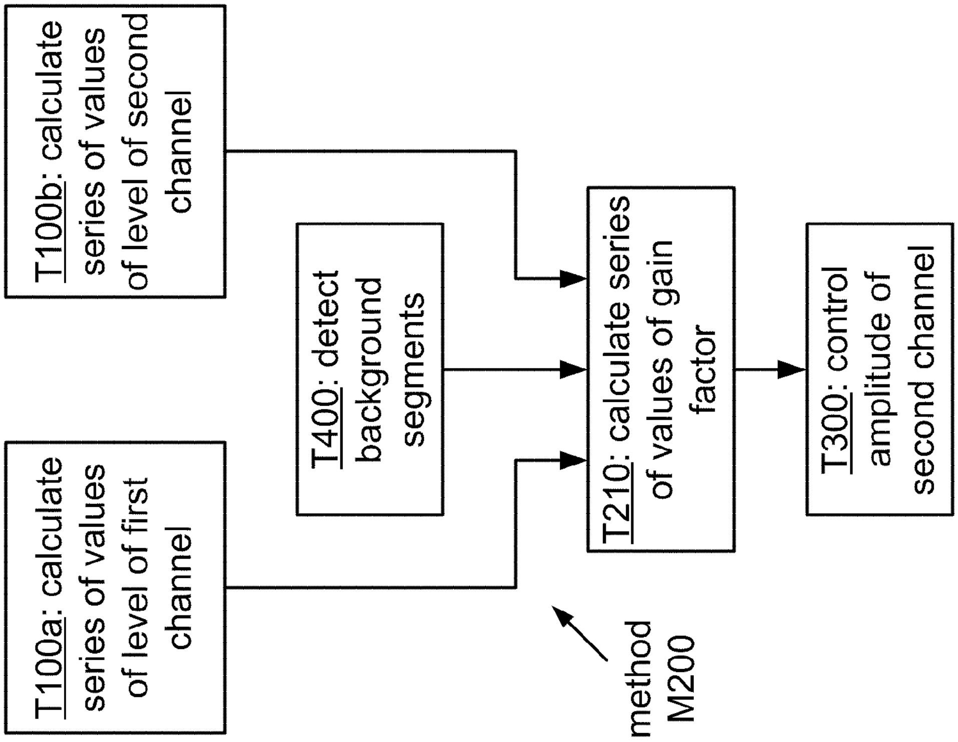
FIG. 10B shows a flowchart of an implementation M200 of method M100.

FIG. 10B shows a flowchart of an implementation M200 of method M100. Method M200 includes task T400, which is configured to indicate background segments. Task T400 may be configured to produce the indications as a series of states of a binary-valued signal (e.g., states of a binary-valued flag) over time, such that a state having one value indicates that the corresponding segment is a background segment and a state having the other value indicates that the corresponding segment is not a background segment. Alternatively, task T400 may be configured to produce the indications as a series of states of a signal having more than two possible values at a time, such that a state may indicate one of two or more different types of non-background segment.

Task T400 may be configured to indicate that a segment is a background segment based on one or more characteristics of the segment such as overall energy, low-band energy, high-band energy, spectral distribution (as evaluated using, for example, one or more line spectral frequencies, line spectral pairs, and/or reflection coefficients), signal-to-noise ratio, periodicity, and/or zero-crossing rate. Such an operation may include, for each of one or more of such characteristics, comparing a value or magnitude of such a characteristic to a fixed or adaptive threshold value. Alternatively or additionally, such an operation may include, for each of one or more of such characteristics, calculating and comparing the value or magnitude of a change in the value or magnitude of such a characteristic to a fixed or adaptive threshold value. It may be desirable to implement task T400 to indicate that a segment is a background segment based on multiple criteria (e.g., energy, zero-crossing rate, etc.) and/or a memory of recent background segment indications.

Alternatively or additionally, task T400 may include comparing a value or magnitude of such a characteristic (e.g., energy), or the value or magnitude of a change in such a characteristic, in one frequency band to a like value in another frequency band. For example, task T400 may be configured to evaluate the energy of the current segment in each of a low-frequency band (e.g., 300 Hz to 2 kHz) and a high-frequency band (e.g., 2 kHz to 4 kHz), and to indicate that the segment is a background segment if the energy in each band is less than (alternatively, not greater than) a respective threshold value, which may be fixed or adaptive. One example of such a voice activity detection operation that may be performed by task T400 includes comparing highband and lowband energies of reproduced audio signal S40 to respective threshold values as described, for example, in section 4.7 (pp. 4-49 to 4-57) of the 3GPP2 document C.S0014-C, v10, entitled "Enhanced Variable Rate Codec, Speech Service Options 3, 68, and 70 for Wideband Spread Spectrum Digital Systems," January 2007 (available online at www-dot-3gpp-dot-org). In this example, the threshold value for each band is based on an anchor operating point (as derived from a desired average data rate), an estimate of the background noise level in that band for the previous segment, and a signal-to-noise ratio in that band for the previous segment.

Alternatively, task T400 may be configured to indicate whether a segment is a background segment according to a relation between (A) a level value $sl_n$ that corresponds to the segment and (B) a background level value bg. Level value $sl_n$ may be a value of a level of only one of the channels of segment n (e.g., $L_{1n}$ as calculated by task T100*a*, or $L_{2n}$ as calculated by task T100*b*). In such case, level value $sl_n$ is typically a value of a level of the channel that corresponds to primary microphone MC10 (i.e., a microphone that is positioned to receive a desired information signal more directly). Alternatively, level value $sl_n$ may be a value of a level, as calculated according to an expression such as one of expressions (1)-(7) above, of a mixture (e.g., an average) of two or more channels of segment n. In a further alternative, segment level value $sl_n$ is an average of values of levels of each of two or more channels of segment n. It may be desirable for level value $sl_n$ to be a value that is not smoothed over time (e.g., as described above with reference to expression (8)), even for a case in which task T100*a* is configured to smooth $L_{1n}$ over time and task T100*b* is configured to smooth $L_{2n}$ over time.

Figure 11A:
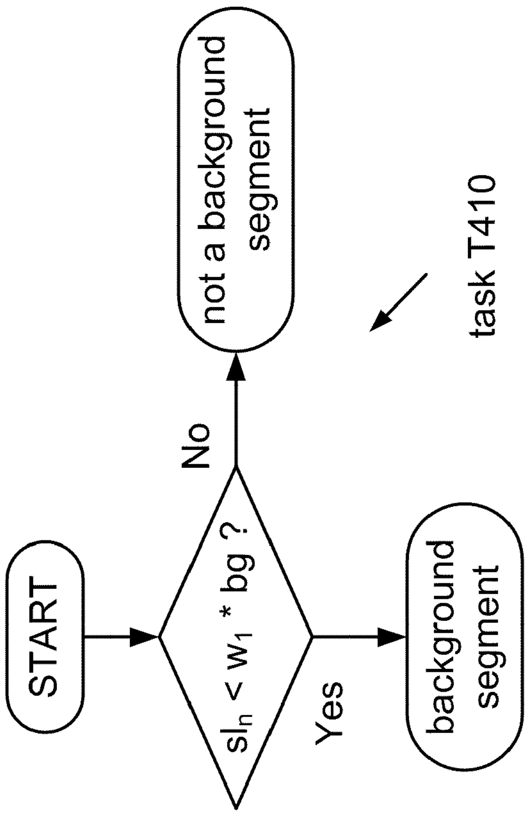
FIG. 11A shows a flowchart of an implementation T410 of task T400.

FIG. 11A shows a flowchart of such an implementation T410 of task T400, which compares level value $sl_n$ to the product of background level value bg and a weight $w_1$. In another example, weight $w_1$ is implemented as an offset to background level value bg rather than as a factor. The value of weight $w_1$ may be selected from a range such as from one to 1.5, two, or five and may be fixed or adaptable. In one particular example, the value of $w_1$ is equal to 1.2. Task T410 may be implemented to execute for each segment of the audio signal or less frequently (e.g., for each second or fourth segment).

Figure 11B:
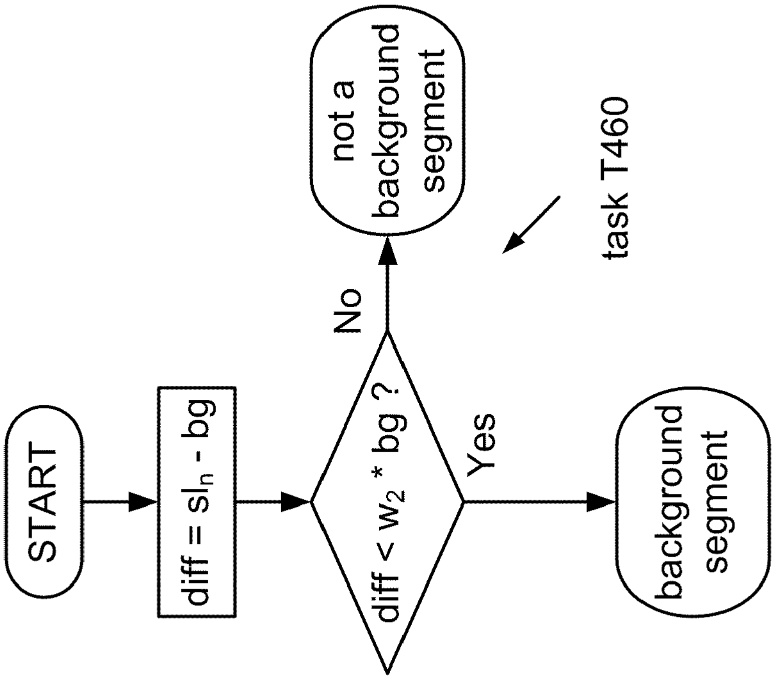
FIG. 11B shows a flowchart of an implementation T460 of task T400.

FIG. 11B shows a flowchart of a related implementation T460 of task T400, which compares a difference diff between the level value sl and the background level value bg to the product of background level value bg and a weight $w_2$. In another example, weight $w_2$ is implemented as an offset to background level value bg rather than as a factor. The value of weight $w_2$ may be selected from a range such as from zero to 0.4, one, or two and may be fixed or adaptable. In one particular example, the value of $w_2$ is equal to 0.2. Task T460 may be implemented to execute for each segment of the audio signal or less frequently (e.g., for each second or fourth segment).

Task T400 may be configured to indicate that a segment is a background segment only when the corresponding level value $sl_n$ is greater than (or not less than) a lower bound. Such a feature may be used, for example, to avoid calculating values of the gain factor that are based largely on non-acoustic noise (e.g., intrinsic or circuit noise). Alternatively, task T400 may be configured to execute without such a feature. For example, it may be desirable to permit task T210 to calculate values of the gain factor for non-acoustic components of the background noise environment as well as for acoustic components.

Task T400 may be configured to use a fixed value for background level value bg. More typically, however, task T400 is configured to update the value of the background level over time. For example, task T400 may be configured to replace or otherwise update background level value bg with information from a background segment (e.g., the corresponding segment level value $sl_n$). Such updating may be performed according to an expression such as $bg \leftarrow (1-\alpha)bg + (\alpha)sl_n$, where α0 is a temporal smoothing factor having a value in the range of from zero (no updating) to one (no smoothing) and $y \leftarrow x$ indicates an assignment of the value of x to y. Task T400 may be configured to update the value of the background level for every background segment or less frequently (e.g., for every other background segment, for every fourth background segment, etc.). Task T400 may also be configured to refrain from updating the value of the background level for one or several segments (also called a "hangover period") after a transition from non-background segments to background segments.

Figures 12A, 12B:
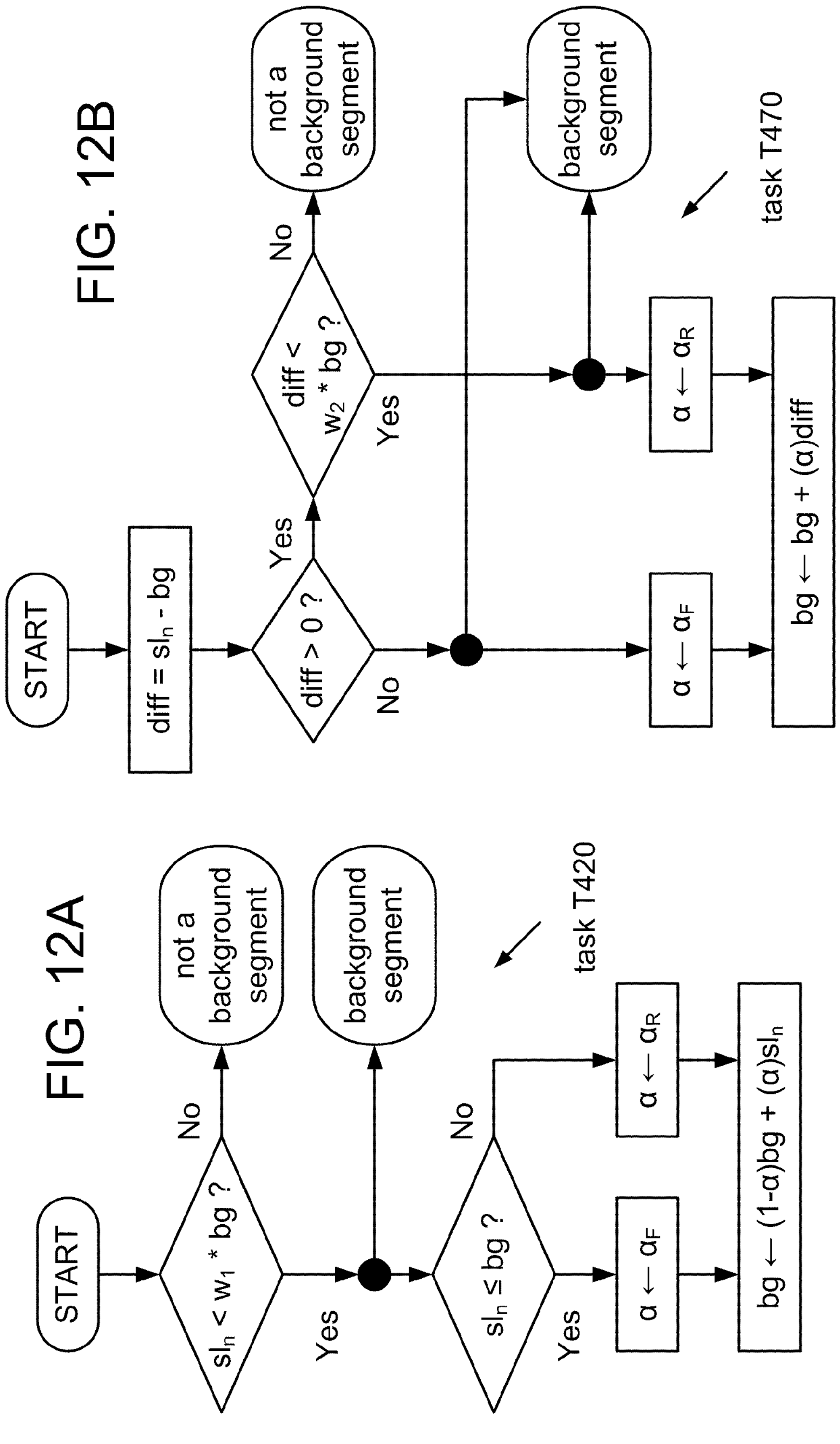
FIG. 12A shows a flowchart of an implementation T420 of task T410.
FIG. 12B shows a flowchart of an implementation T470 of task T460.

It may be desirable to configure task T400 to use different smoothing factor values according to a relation among values of the background level over time (e.g., a relation between the current and previous values of the background level). For example, it may be desirable to configure task T400 to perform more smoothing when the background level is rising (e.g., when the current value of the background level is greater than the previous value of the background level) than when the background level is falling (e.g., when the current value of the background level is less than the previous value of the background level). In one particular example, smoothing factor α is assigned the value $\alpha_R=0.01$ when the background level is rising and the value $\alpha_F=0.02$ (alternatively, $2*\alpha_R$) when the background level is falling. FIG. 12A shows a flowchart of such an implementation T420 of task T410, and FIG. 12B shows a flowchart of such an implementation T470 of task T460.

It may be desirable to configure task T400 to use different smoothing factor values according to how long method M200 has been executing. For example, it may be desirable to configure method M200 such that task T400 performs less smoothing (e.g., uses a higher value of α, such as $\alpha_F$) during the initial segments of an audio sensing session than during later segments (e.g., during the first fifty, one hundred, two hundred, four hundred, or eight hundred segments, or the first five, ten, twenty, or thirty seconds, of the session). Such a configuration may be used, for example, to support a quicker initial convergence of background level value bg during an audio sensing session (e.g., a communications session, such as a telephone call).

Figure 13B:
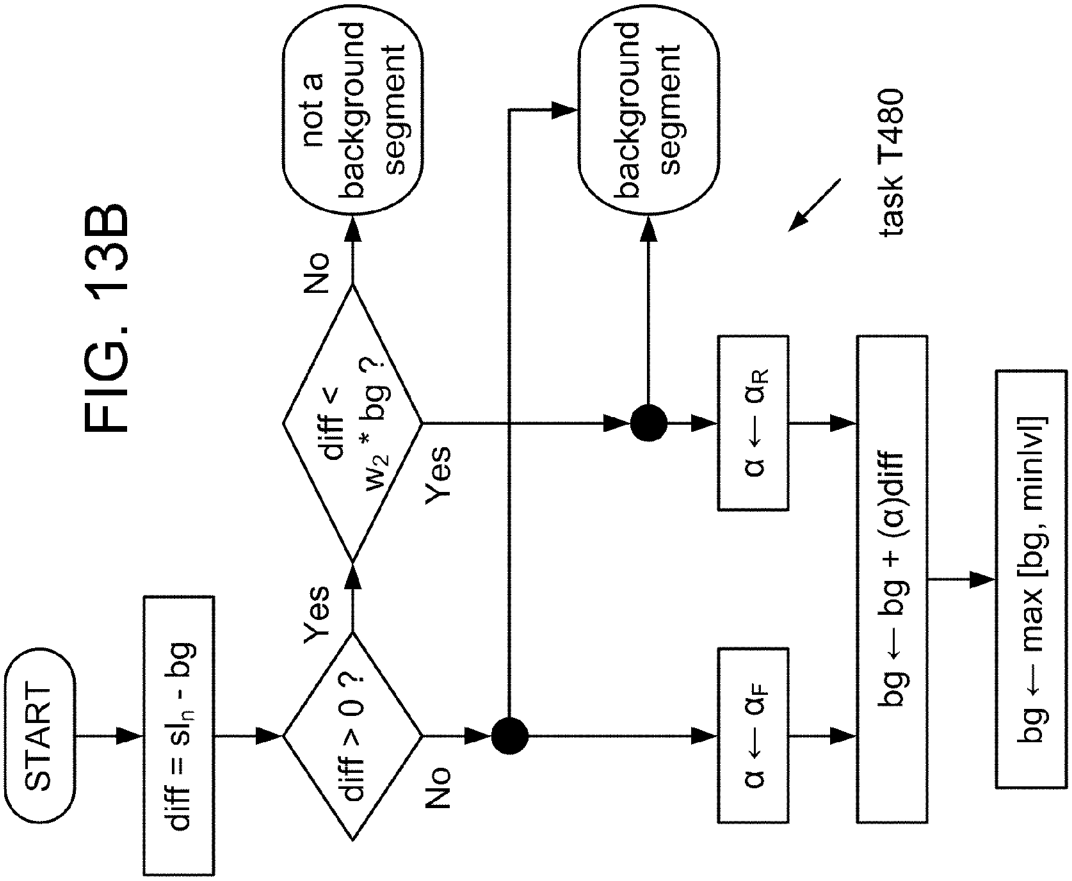
FIG. 13B shows a flowchart of an implementation T480 of task T470.
Figure 13A:
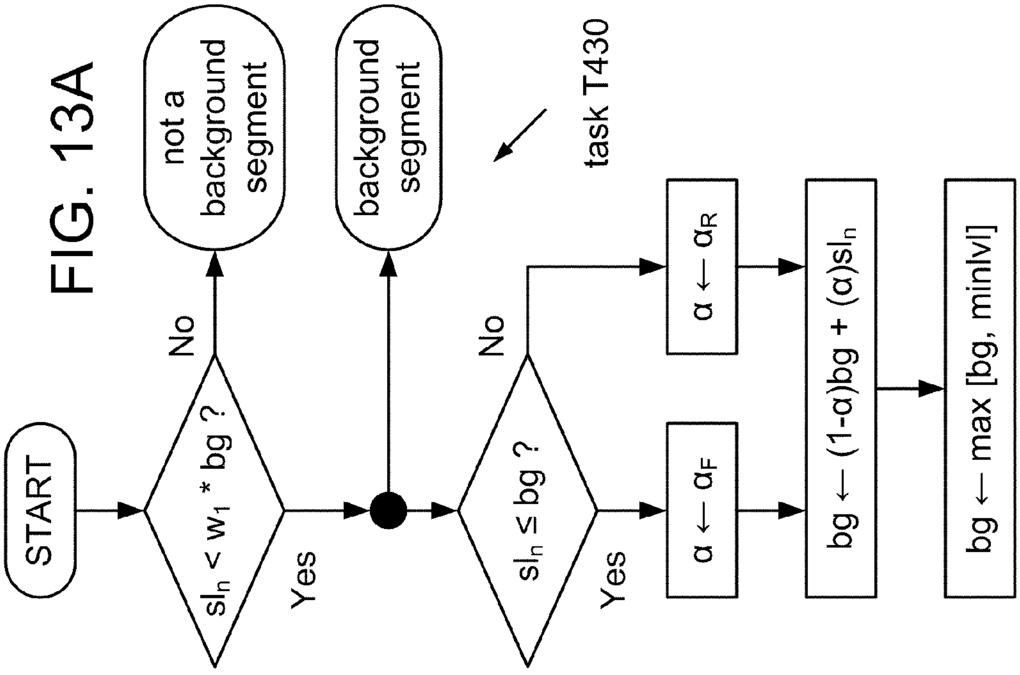
FIG. 13A shows a flowchart of an implementation T430 of task T420.

Task T400 may be configured to observe a lower bound on background level value bg. For example, task T400 may be configured to select a current value for background level value bg as the maximum of (A) a calculated value for background level value bg and (B) a minimum allowable background level value minlvl. The minimum allowable value minlvl may be a fixed value. Alternatively, the minimum allowable value minlvl may be an adaptive value, such as a lowest observed recent level (e.g., the lowest value of segment level value $sl_n$ in the most recent two hundred segments). FIG. 13A shows a flowchart of such an implementation T430 of task T420, and FIG. 13B shows a flowchart of such an implementation T480 of task T470.

It may be desirable to configure task T400 to store background level value bg and/or minimum allowable value minlvl in nonvolatile memory for use as an initial value for the respective parameter in a subsequent execution of method M200 (for example, in a subsequent audio sensing session and/or after a power cycle). Such an implementation of task T400 may be configured to perform such storage periodically (e.g., once every ten, twenty, thirty, or sixty seconds), at the end of an audio sensing session (e.g., a communications session, such as a telephone call), and/or during a power-down routine.

Method M200 also includes an implementation T210 of task T200 that is configured to calculate the series of values of the gain factor based on the indications of task T400. Typically it is desirable that, for background segments, the corresponding values of the levels of the first and second channels will be equal. Differences among the response characteristics of the channels of array R100, however, may cause these levels to differ in the multichannel audio signal. An imbalance between the channel levels in a background segment may be at least partially compensated by varying the amplitude of the second channel over the segment according to a relation between the levels. Method M200 may be configured to perform a particular example of such an compensation operation by multiplying the samples of the second channel of the segment by a factor of $L_{1n}/L_{2n}$, where $L_{1n}$ and $L_{2n}$ denote the values of the levels of the first and second channels, respectively, of the segment.

For background segments, task T210 may be configured to calculate values of the gain factor based on relations between values of the level of the first channel and values of the level of the second channel. For example, task T210 may be configured to calculate a value of the gain factor for a background segment based on a relation between a corresponding value of the level of the first channel and a corresponding value of the level of the second channel. Such an implementation of task T210 may be configured to calculate a value of the gain factor as a function of linear level values (e.g., according to an expression such as $G_n=L_{1n}/L_{2n}$, where $G_n$ denotes the current value of the gain factor). Alternatively, such an implementation of task T210 may be configured to calculate a value of the gain factor as a function of level values in a logarithmic domain (e.g., according to an expression such as $G_n=L_{1n}-L_{2n}$).

It may be desirable to configure task T210 to smooth the values of the gain factor over time. For example, task T210 may be configured to calculate a current value of the gain factor according to an expression such as:

$$G_n=(\beta)G_{tmp}+(1-\beta)G_{n-1}, \tag{9}$$

where $G_{tmp}$ is an unsmoothed value of the gain factor that is based on a relation between values of the levels of the first and second channels (e.g., a value that is calculated according to an expression such as $G_{tmp}=L_{1n}/L_{2n}$), $G_{n-1}$ denotes the most recent value of the gain factor (e.g., the value corresponding to the most recent background segment), and $\beta$ is a temporal smoothing factor having a value in the range of from zero (no updating) to one (no smoothing).

Differences among the response characteristics of the channels of the microphone array may cause the channel levels to differ for non-background segments as well as for background segments. For a non-background segment, however, the channel levels may also differ due to directionality of an acoustic information source. For non-background segments, it may be desirable to compensate for an array imbalance without removing an imbalance among the channel levels that is due to source directionality.

It may be desirable, for example, to configure task T210 to update the value of the gain factor only for background segments. Such an implementation of task T210 may be configured to calculate the current value of the gain factor $G_n$ according to an expression such as one of the following:

$$G_n=\begin{cases} L_{1n}/L_{2n}, & \text{segment } n \text{ is background} \\ G_{n-1} & \text{segment } n \text{ is not background;} \end{cases} \tag{10}$$

$$G_n=\begin{cases} (\beta)L_{1n}/L_{2n}+(1-\beta)G_{n-1}, & \text{segment } n \text{ is background} \\ G_{n-1}, & \text{segment } n \text{ is not background.} \end{cases} \tag{11}$$

Task T300 controls the amplitude of one channel of the audio signal relative to the amplitude of another channel over time, according to the series of values of the gain factor. For example, task T300 may be configured to amplify the signal from a less responsive channel. Alternatively, task T300 may be configured to control the amplitude of (e.g., to amplify or attenuate) a channel that corresponds to a secondary microphone.

Task T300 may be configured to perform amplitude control of the channel in a linear domain. For example, task T300 may be configured to control the amplitude of the second channel of a segment by multiplying each of the values of the samples of the segment in that channel by a value of the gain factor that corresponds to the segment. Alternatively, task T300 may be configured to control the amplitude in a logarithmic domain. For example, task T300 may be configured to control the amplitude of the second channel of a segment by adding a corresponding value of the gain factor to a logarithmic gain control value that is applied to that channel over the duration of the segment. In such case, task T300 may be configured to receive the series of values of the gain factor as logarithmic values (e.g., in decibels), or to convert linear gain factor values to logarithmic values (e.g., according to an expression such as $x_{log}=20\log x_{lin}$, where $x_{lin}$ is a linear gain factor value and $x_{log}$ is the corresponding logarithmic value). Task T300 may be combined with, or performed upstream or downstream of, other amplitude control of the channel or channels (e.g., an automatic gain control (AGC) or automatic volume control (AVC) module, a user-operated volume control, etc.).

It may be desirable to configure task T210 to use different smoothing factor values according to a relation among values of the gain factor over time (e.g., a relation between the current and previous values of the gain factor). For example, it may be desirable to configure task T210 to perform more smoothing when the value of the gain factor is rising (e.g., when the current value of the gain factor is greater than the previous value of the gain factor) than when the value of the gain factor is falling (e.g., when the current value of the gain factor is less than the previous value of the gain factor). An example of such a configuration of task T210 may be implemented by evaluating a parameter $\Delta G=G_{tmp}-G_{n-1}$, assigning a value of $\beta_R$ to smoothing factor $\beta$ when $\Delta G$ is greater than (alternatively, not less than) zero, and assigning a value of $\beta_F$ to $\Delta G$ otherwise. In one particular example, $\beta_R$ has a value of 0.2 and $\beta_F$ has a value of 0.3 (alternatively, $1.5*\beta_R$). It is noted that task T210 may be configured to implement expression (11) above in terms of $\Delta G$ as follows:

$$G_n = \begin{cases} G_{n-1} + (\beta)\Delta G, & \text{segment } n \text{ is background} \\ G_{n-1}, & \text{segment } n \text{ is not background} \end{cases}. \quad (12)$$

It may be desirable to configure task T210 to vary the degree of temporal smoothing of the gain factor value according to how long method M200 has been executing. For example, it may be desirable to configure method M200 such that task T210 performs less smoothing (e.g., uses a higher smoothing factor value, such as β*2 or β*3) during the initial segments of an audio sensing session than during later segments (e.g., during the first fifty, one hundred, two hundred, four hundred, or eight hundred segments, or the first five, ten, twenty, or thirty seconds, of the session). Such a configuration may be used, for example, to support a quicker initial convergence of the value during an audio sensing session (e.g., a telephone call). Alternatively or additionally, it may be desirable to configure method M200 such that task T210 performs more smoothing (e.g., uses a lower smoothing factor value, such as β/2, β/3, or β/4) during later segments of an audio sensing session than during initial segments (e.g., after the first fifty, one hundred, two hundred, four hundred, or eight hundred segments, or the first five, ten, twenty, or thirty seconds, of the session).

It may be desirable to inhibit task T200 from updating the value of the gain factor in some circumstances. For example, it may be desirable to configure task T200 to use a previous value of the gain factor when the corresponding segment level value $sl_n$ is less than (alternatively, not greater than) a minimum level value. In another example, it may be desirable to configure task T200 to use a previous value of the gain factor when an imbalance between the level values of the channels of the corresponding segment is too great (e.g., an absolute difference between the level values is greater than (alternatively, not less than) a maximum imbalance value, or a ratio between the level values is too large or too small). Such a condition, which may indicate that one or both channel level values are unreliable, may occur when one of the microphones is occluded (e.g., by the user's finger), broken, or contaminated (e.g., by dirt or water).

In a further example, it may be desirable to configure task T200 to use a previous value of the gain factor when uncorrelated noise (e.g., wind noise) is detected in the corresponding segment. Detection of uncorrelated noise in a multichannel audio signal is described, for example, in U.S. patent application Ser. No. 12/201,528, filed Aug. 29, 2008, entitled "SYSTEMS, METHODS, AND APPARATUS FOR DETECTION OF UNCORRELATED COMPONENT," which document is hereby incorporated by reference for purposes limited to disclosure of apparatus and procedures for detection of uncorrelated noise and/or indication of such detection. Such detection may include comparing the energy of a difference signal to a threshold value, where the difference signal is a difference between the channels of the segment. Such detection may include lowpass filtering the channels, and/or applying a previous value of the gain factor to the second channel, upstream of the calculation of the difference signal.

Figure 8:
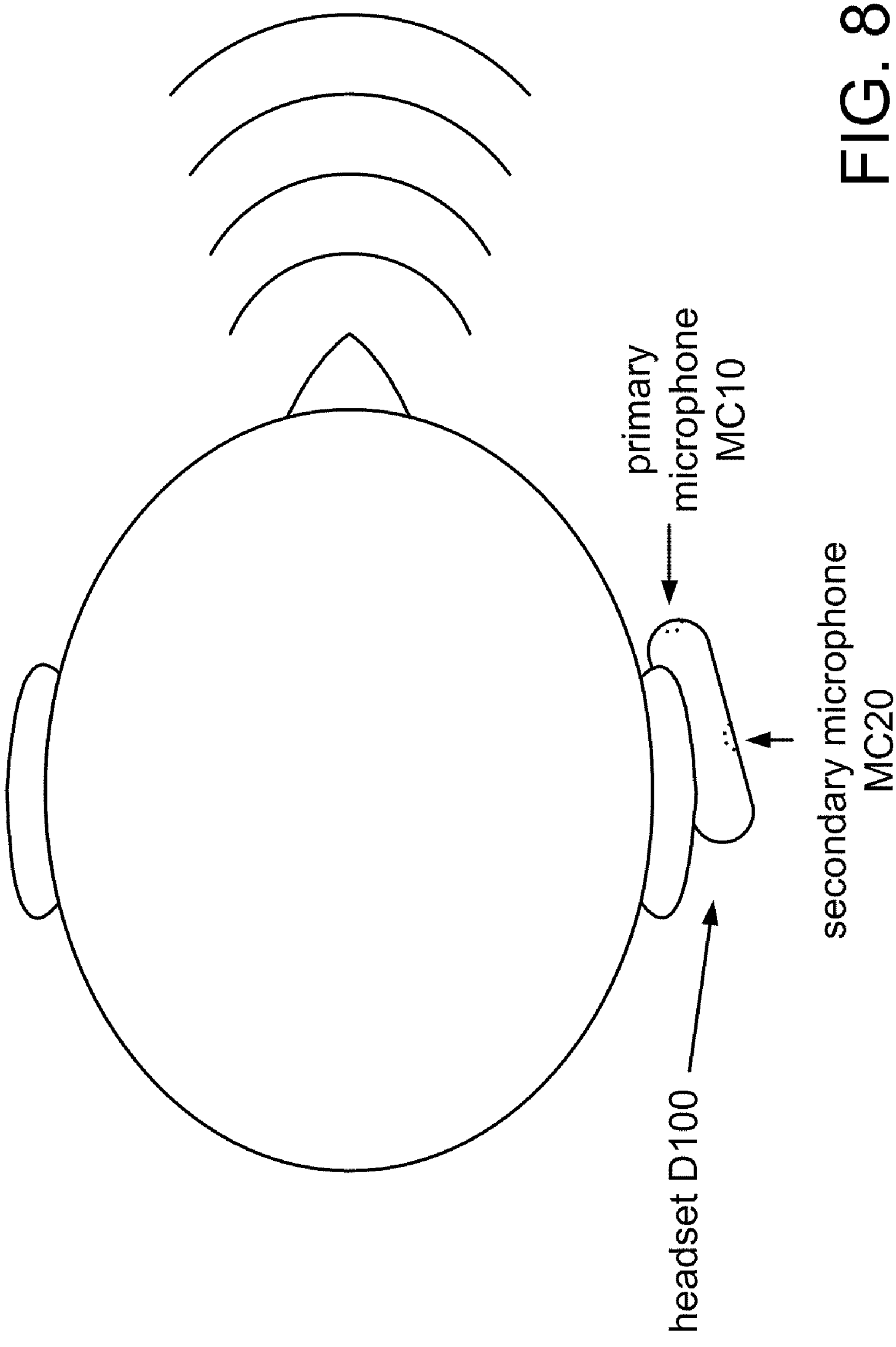
FIG. 8 shows a diagram of headset D100 mounted at a user's ear in a standard orientation relative to the user's mouth.
Figure 9:
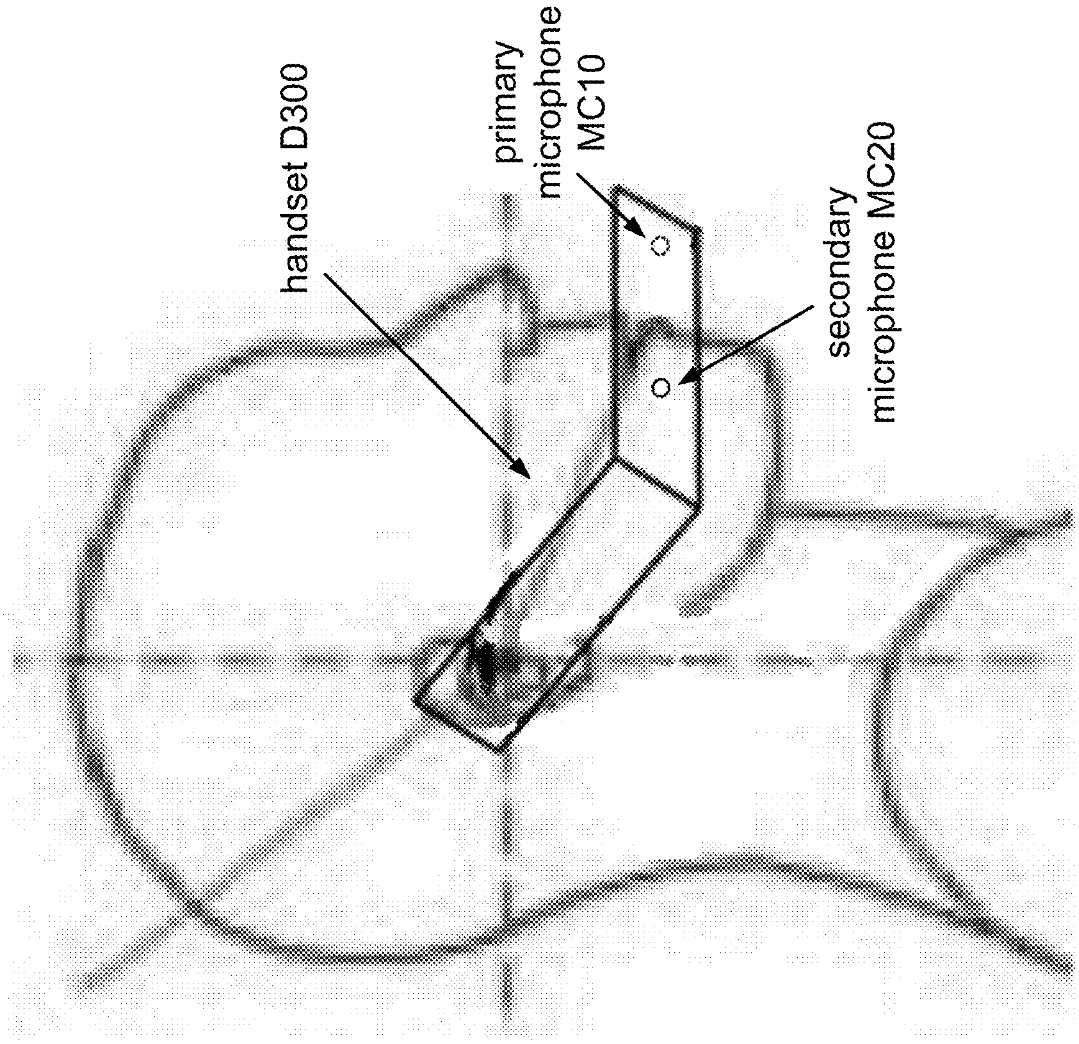
FIG. 9 shows a diagram of handset D300 positioned in a standard orientation relative to the user's mouth.

A multi-microphone audio sensing device may be designed to be worn, held, or otherwise oriented in a particular manner (also called a "standard orientation") relative to an acoustic information source. For a voice communications device such as a handset or headset, the information source is typically the user's mouth. FIG. 8 shows a top view of headset D100 in a standard orientation, such that primary microphone MC10 of array R100 is oriented more directly toward and is closer to the user's mouth than secondary microphone MC20. FIG. 9 shows a side view of handset D300 in a standard orientation, such that primary microphone MC10 is oriented more directly toward and may be closer to the user's mouth than secondary microphone MC20.

Figure 14:
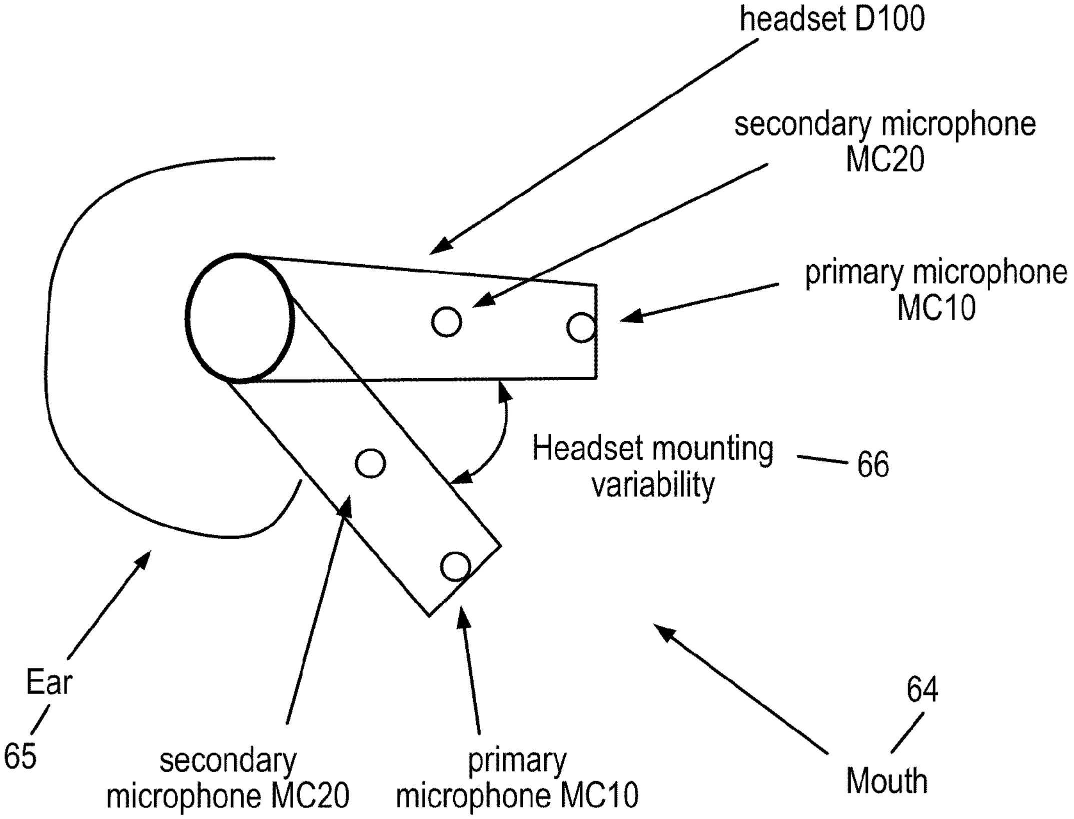
FIG. 14 shows an example of two bounds of a range of standard orientations relative to the user's mouth for headset D100.
Figure 15:
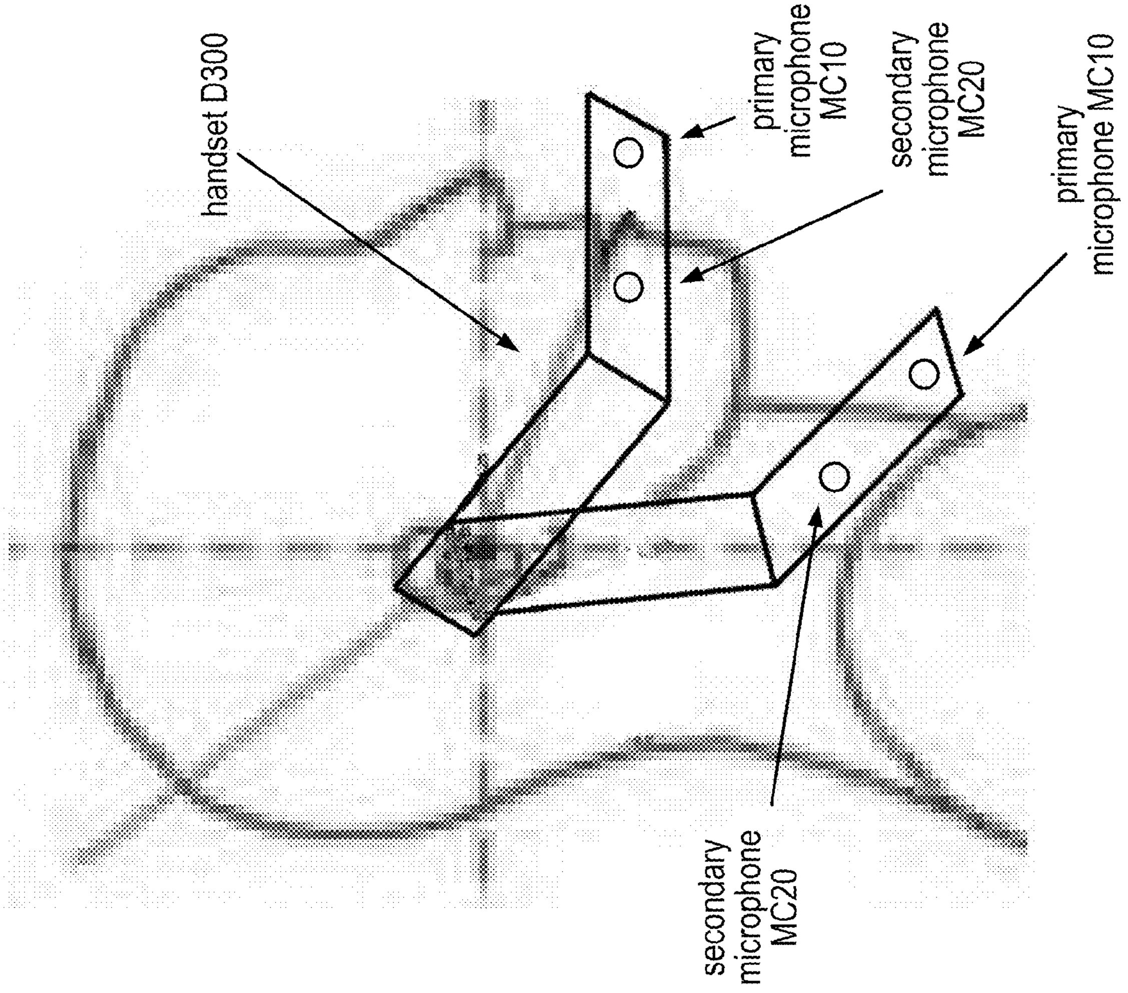
FIG. 15 shows an example of two bounds of a range of standard orientations relative to the user's mouth for handset D300.

During normal use, a portable audio sensing device may operate in any among a range of standard orientations relative to an information source. For example, different users may wear or hold a device differently, and the same user may wear or hold a device differently at different times, even within the same period of use (e.g., during a single telephone call). For headset D100 mounted on a user's ear 65, FIG. 14 shows an example of two bounds of a range 66 of standard orientations relative to the user's mouth 64. FIG. 15 shows an example of two bounds of a range of standard orientations for handset D300 relative to the user's mouth.

An "information" segment of the audio signal contains information from a directional acoustic information source (such as the user's mouth), with a first one of the microphones of the array being closer to and/or oriented more directly toward the source than a second one of the microphones of the array. In this case, the levels of the corresponding channels may be expected to differ even if the responses of the two microphones are perfectly matched.

As discussed above, it may be desirable to compensate for an imbalance between channel levels that is due to a difference among the response characteristics of the channels of the microphone array. For information segments, however, it may also be desirable to preserve an imbalance between the channel levels that is due to directionality of the information source. An imbalance due to source directionality may provide important information, for example, to a spatial processing operation.

Figure 16A:
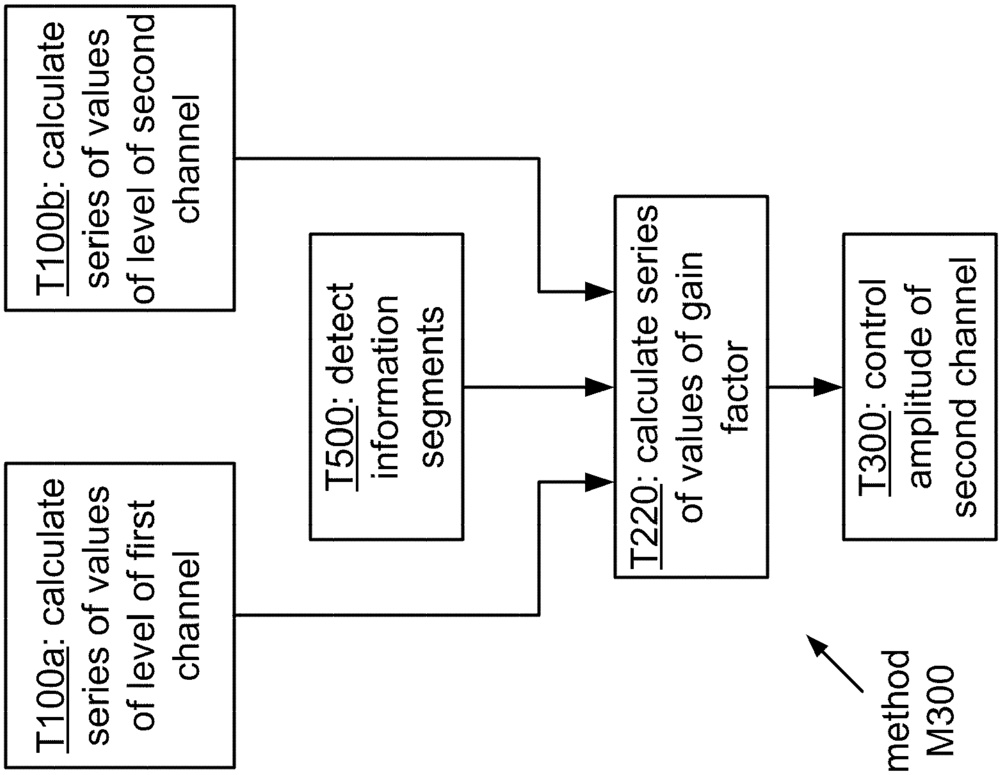
FIG. 16A shows a flowchart of an implementation M300 of method M100.

FIG. 16A shows a flowchart of an implementation M300 of method M100. Method M300 includes a task T500 that is configured to indicate information segments. Task T500 may be configured to indicate that a segment is an information segment based on, for example, a corresponding value of the level of the first channel and a corresponding value of the level of the second channel. Method M300 also includes an implementation T220 of task T200 that is configured to calculate the series of values of the gain factor based on the indications of task T500.

Figure 16B:
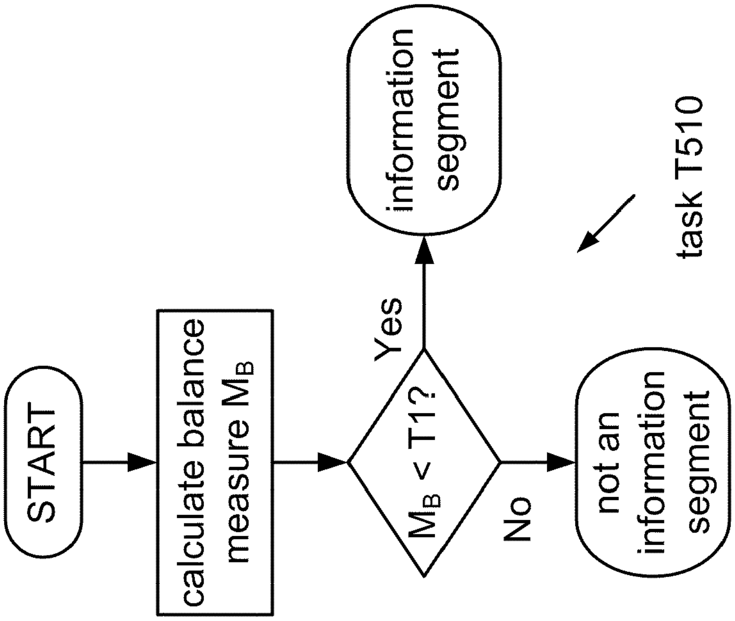
FIG. 16B shows a flowchart of an implementation T510 of task T500.

FIG. 16B shows a flowchart of an implementation T510 of task T500. Task T510 is configured to indicate whether a segment is an information segment based on the value of a balance measure of the segment, where the balance measure is based on corresponding values of the levels of the first and second channels and an estimated imbalance between the channel levels due to different response characteristics of the channels of array R100 (an "array imbalance estimate"). Task T510 may be configured to calculate the balance measure by using the array imbalance estimate to weight a relation between the level values. For example, task T510 may be configured to calculate the balance measure $M_B$ for segment n according to an expression such as $M_B = I_A(L_{2n}/L_{1n})$, where $L_{1n}$ and $L_{2n}$ denote the values of the levels of the first and second channels, respectively, for the segment (i.e., as calculated by tasks T100*a* and T100*b*); and $I_A$ denotes the array imbalance estimate.

The array imbalance estimate $I_A$ may be based on at least one value of the gain factor (i.e., as calculated by task T220). In one particular example, the array imbalance estimate $I_A$ is the previous value $G_{(n-1)}$ of the gain factor. In other examples, the array imbalance estimate $I_A$ is an average of two or more previous values of the gain factor (e.g., an average of the two most recent values of the gain factor).

Task T510 may be configured to indicate that a segment is an information segment when the corresponding balance measure $M_B$ is less than (alternatively, not greater than) a threshold value $T_1$. For example, task T510 may be configured to produce a binary indication for each segment according to an expression such as $$\begin{cases} 1, & I_A(L_{2n}/L_{1n}) < T_1 \\ 0, & \text{otherwise,} \end{cases} \quad (13)$$

where a result of one indicates an information segment and a result of zero indicates a non-information segment. Other expressions of the same relation that may be used to implement such a configuration of task T510 include (without limitation) the following:

$$\begin{cases} 1, & (L_{2n}/L_{1n}) < T_1/I_A \\ 0, & \text{otherwise} \end{cases}; \quad (14)$$

$$\begin{cases} 1, & (L_{1n}/L_{2n}) > I_A/T_1 \\ 0, & \text{otherwise} \end{cases}; \quad (15)$$

$$\begin{cases} 1, & L_{1n}/(I_A L_{2n}) > 1/T_1 \\ 0, & \text{otherwise} \end{cases}. \quad (16)$$

Of course, other implementations of such expressions may use different values to indicate a corresponding result (e.g., a value of zero to indicate an information segment and a value of one to indicate a non-information segment). Task T510 may be configured to use a threshold value T1 that has an assigned numeric value, such as one, 1.2, 1.5, or two or a logarithmic equivalent of such a value. Alternatively, it may be desirable for threshold value T1 to be based on a bias factor as described below with reference to task T220. It may be desirable to select threshold value T1 to support appropriate operation of gain factor calculation task T220. For example, it may be desirable to select threshold value T1 to provide an appropriate balance in task T510 between false positives (indication of non-information segments as information segments) and false negatives (failure to indicate information segments).

Task T220 is configured to calculate the series of values of the gain factor based on the indications of task T500. For information segments, task T220 is configured to calculate corresponding values of the gain factor value based on channel level values and a bias factor $I_S$. The bias factor is based on a standard orientation of an audio sensing device relative to a directional information source, is typically independent of a ratio between the levels of the first and second channels of the segment, and may be calculated or evaluated as described below. Task T220 may be configured to calculate a value of the gain factor for an information segment by using the bias factor as a weight in a relation between the corresponding values of the levels of the first and second channels. Such an implementation of task T220 may be configured to calculate a value of the gain factor as a function of linear values (e.g., according to an expression such as $G_n = L_{1n}/(I_S L_{2n})$, where the bias factor $I_S$ is used to weight the value of the level of the second channel). Alternatively, such an implementation of task T220 may be configured to calculate a value of the gain factor as a function of values in a logarithmic domain (e.g., according to an expression such as $G_n = L_{1n} - (I_S + L_{2n})$).

It may be desirable to configure task T220 to update the value of the gain factor only for information segments. Such an implementation of task T220 may be configured to calculate the current value of the gain factor $G_n$ according to an expression such as one of the following:

$$G_n = \begin{cases} L_{1n}/(I_S L_{2n}), & \text{segment } n \text{ is information} \\ G_{n-1}, & \text{segment } n \text{ is not information} \end{cases} \quad (17)$$

$$G_n = \begin{cases} (\beta)L_{1n}/(I_S L_{2n}) + (1-\beta)G_{n-1}, & \text{segment } n \text{ is information} \\ G_{n-1}, & \text{segment } n \text{ is not information} \end{cases} \quad (18)$$

where β is a smoothing factor value as discussed above.

The bias factor $I_S$ may be calculated as an approximation of a ratio between the sound pressure levels at different microphones of the array due to an acoustic signal from the directional sound source. Such a calculation may be performed offline (e.g., during design or manufacture of the device) based on factors such as the locations and orientations of the microphones within the device, and an expected distance between the device and the source when the device is in a standard orientation relative to the source. Such a calculation may also take into account acoustic factors that may affect the sound field sensed by the microphone array, such as reflection characteristics of the surface of the device and/or of the user's head.

Additionally or in the alternative, bias factor $I_S$ may be evaluated offline based on the actual response of an instance of the device to a directional acoustic signal. In this approach, a reference instance of the device (also called a "reference device") is placed in a standard orientation relative to a directional information source, and an acoustic signal is produced by the source. A multichannel signal is obtained from the device array in response to the acoustic signal, and the bias factor is calculated based on a relation between the channel levels of the multichannel signal (e.g., as a ratio between the channel levels, such as a ratio of the level of the channel of the primary microphone to the level of the channel of the secondary microphone).

Such an evaluation operation may include mounting the reference device on a suitable test stand (e.g., a HATS) in a standard orientation relative to the directional sound source (e.g., the mouth loudspeaker of the HATS). In another example, the reference device is worn by a person or otherwise mounted in a standard orientation relative to the person's mouth. It may be desirable for the source to produce the acoustic signal as a speech signal or artificial speech signal at a sound pressure level (SPL) of from 75 to 78 dB (e.g., as measured at an ear reference point (ERP) or mouth reference point (MRP)). The reference device and source may be located within an anechoic chamber while the multichannel signal is obtained (in an arrangement as shown in FIG. 6B, for example). It may also be desirable for the reference device to be within a diffuse noise field (e.g., a field produced by four loudspeakers arranged as shown in FIG. 6B and driven by white or pink noise) while the multichannel signal is obtained. A processor of the reference device, or an external processing device, processes the multichannel signal to calculate the bias factor (e.g., as a ratio of the channel levels, such as a ratio of the level of the channel of the primary microphone to the level of the channel of the secondary microphone).

It may be desirable for bias factor $I_S$ to describe the channel imbalance that may be expected, due to directionality of an information source, for any instance of a device of the same type as the reference instance (e.g., any device of the same model) in a standard orientation relative to the source. Such a bias factor would typically be copied to other instances of the device during mass production. Typical values of bias factor $I_S$ for headset and handset applications include one, 1.5, two, 2.5, three, four, and six decibels and the linear equivalents of such values.

In order to obtain a bias factor that is reliably applicable to other instances of the device, it may be desirable to calibrate the reference instance of the device before performing the bias factor evaluation. Such calibration may be desirable to ensure that the bias factor is independent of an imbalance among the response characteristics of the channels of the array of the reference device. The reference device may be calibrated, for example, according to a pre-delivery calibration operation as described earlier with reference to FIG. 6B.

Alternatively, it may be desirable to calibrate the reference instance after the bias factor evaluation operation and then to adjust bias factor $I_S$ according to the calibration results (e.g., according to a resulting compensation factor). In a further alternative, the bias factor is adjusted during execution of method M100 within each production device, based on values of the gain factor as calculated by task T200 for background segments.

It may be desirable to reduce the effect of error in bias factor $I_S$ due to any one reference instance. For example, it may be desirable to perform bias factor evaluation operations on several reference instances of the device and to average the results to obtain bias factor $I_S$.

As mentioned above, it may be desirable for threshold value T1 of task T510 to be based on bias factor $I_S$. In this case, threshold value T1 may have a value such as $1/(1+\delta\epsilon)$, where $\epsilon=(I_S-1)$ and $\delta$ has a value in the range of from 0.5 to two (e.g., 0.8, 0.9, or one).

It may be desirable to implement task T500 to tune bias factor $I_S$ over time. For example, an optimum value of the bias factor may vary slightly from one user to another for the same device. Such variation may occur due to factors such as, for example, differences among standard orientations adopted by the various users and/or differences in the distance between the device and the user's mouth. In one example, task T500 is implemented to tune bias factor $I_S$ to minimize a change in the series of values of the gain factor over transitions between background and information segments. Such an implementation of task T500 may also be configured to store the updated bias factor $I_S$ in nonvolatile memory for use as an initial value for the respective parameter in a subsequent execution of method M300 (for example, in a subsequent audio sensing session and/or after a power cycle). Such an implementation of task T500 may be configured to perform such storage periodically (e.g., once every ten, twenty, thirty, or sixty seconds), at the end of an audio sensing session (e.g., a telephone call), and/or during a power-down routine.

Figure 17:
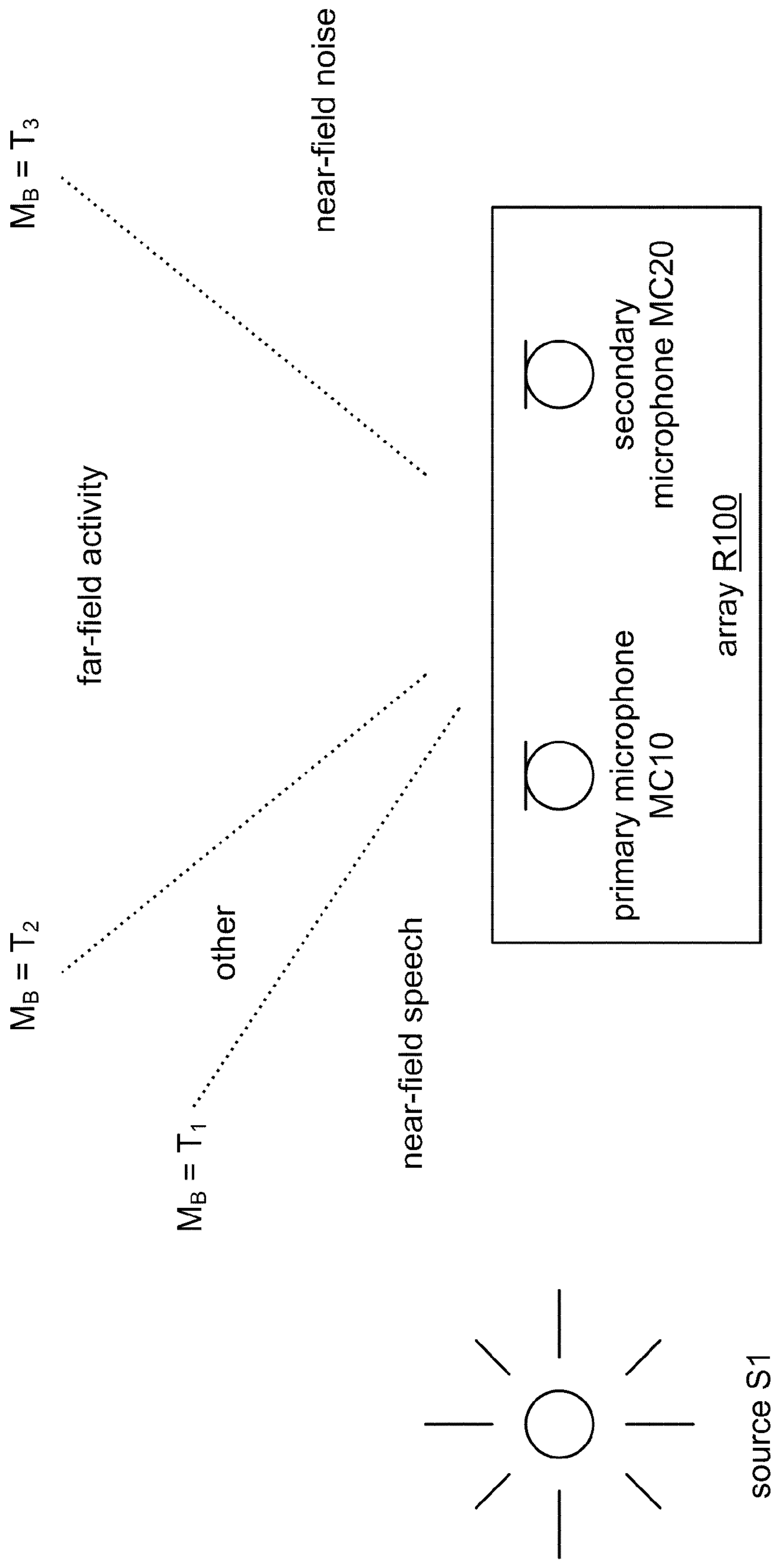
FIG. 17 shows an idealized visual depiction of approximate angles of arrival for various types of information and noise source activity.

FIG. 17 shows an idealized visual depiction of how the value of balance measure $M_B$ may be used to determine an approximate angle of arrival of a directional component of a corresponding segment of the multichannel audio signal. In these terms, task T510 may be described as associating a segment with information source S1 if the corresponding value of balance measure $M_B$ is less than threshold value T1.

Sound from distant directional sources tends to diffuse. During periods of far-field activity, therefore, it may be assumed that the SPLs at the microphones of array R100 will be relatively equal, as during periods of silence or background noise. As the SPLs during periods of far-field activity are higher than those during periods of silence or background noise, however, channel imbalance information derived from corresponding segments may be less influenced by non-acoustic noise components, such as circuit noise, than similar information derived from background segments.

It may be desirable to configure task T500 to distinguish among more than two types of segments. For example, it may be desirable to configure task T500 to indicate segments corresponding to periods of far-field activity (also called "balanced noise" segments) as well as information segments. Such an implementation of task T500 may be configured to indicate that a segment is a balanced noise segment when the corresponding balance measure $M_B$ is greater than (alternatively, not less than) a threshold value $T_2$ and less than (alternatively, not greater than) a threshold value $T_3$. For example, an implementation of task T510 may be configured to produce an indication for each segment according to an expression such as $$\begin{cases} 1, & I_A(L_{2n}/L_{1n}) < T_1 \\ -1, & I_A(L_{2n}/L_{1n}) > T_2 \text{ and } I_A(L_{2n}/L_{1n}) < T_3 \\ 0, & \text{otherwise} \end{cases}, \quad (19)$$

where a result of one indicates an information segment, a result of negative one indicates a balanced noise segment, and a result of zero indicates a segment that is neither.

Such an implementation of task T510 may be configured to use threshold values that have assigned numeric values, such as one, 1.2, 1.5, or two or a logarithmic equivalent of such a value for threshold value T2, and 1.2, 1.5, two, or three or a logarithmic equivalent of such a value for threshold value T2. Alternatively, it may be desirable for threshold value T2 and/or threshold value T3 to be based on bias factor $I_S$. For example, threshold value T2 may have a value such as $1/(1+\gamma\epsilon)$ and/or threshold value T3 may have a value such as $1+\gamma\epsilon$, where $\epsilon=(I_S-1)$ and $\gamma$ has a value in the range of from 0.03 to 0.5 (e.g., 0.05, 0.1, or 0.2). It may be desirable to select threshold values T2 and T3 to support appropriate operation of gain factor calculation task T220. For example, it may be desirable to select threshold value T2 to provide sufficient rejection of information segments and to select threshold value T3 to provide sufficient rejection of near-field noise.

For a case in which task T500 is configured to indicate information segments and balanced noise segments, task T220 may be configured to calculate the current value of the gain factor $G_n$ according to an expression such as one of the following:

$$G_n = \begin{cases} L_{1n}/(I_S L_{2n}), & \text{segment } n \text{ is information} \\ L_{1n}/L_{2n}, & \text{segment } n \text{ is balanced noise}; \\ G_{n-1}, & \text{otherwise} \end{cases} \quad (20)$$

$$G_n = \begin{cases} (\beta)L_{1n}/(I_S L_{2n}) + (1-\beta)G_{n-1}, & \text{segment } n \text{ is information} \\ (\beta)L_{1n}/L_{2n} + (1-\beta)G_{n-1}, & \text{segment } n \text{ is balanced noise}, \\ G_{n-1}, & \text{otherwise} \end{cases} \quad (21)$$

where $\beta$ is a smoothing factor value as discussed above.

Figure 18A:
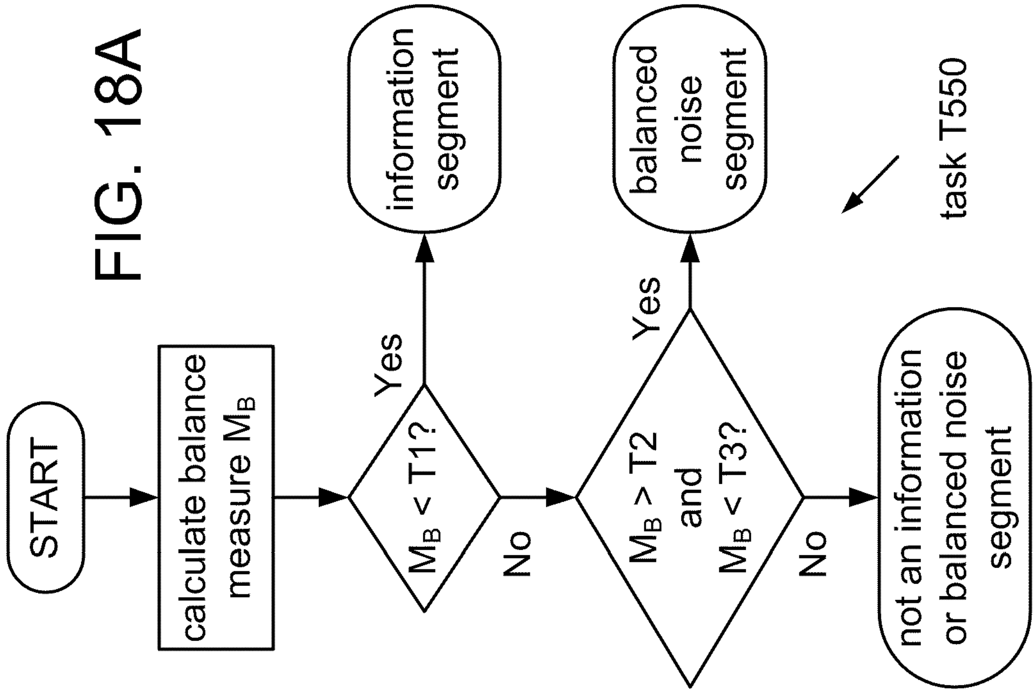
FIG. 18A shows a flowchart for an implementation T550 of task T510.
Figure 18B:
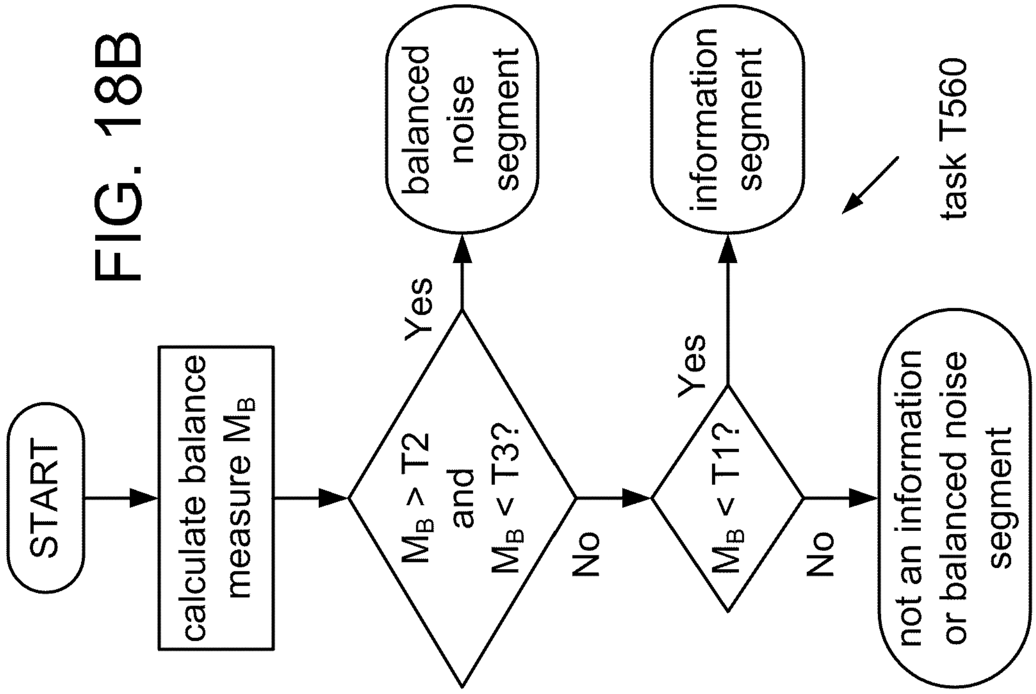
FIG. 18B shows a flowchart for an implementation T560 of task T510.

FIG. 18A shows a flowchart for an implementation T550 of task T510 that indicates information segments and balanced noise segments according to a procedure as described, for example, by expression (19). FIG. 18B shows a flowchart for a similar implementation T560 of task T510 in which the test for a balanced noise segment is performed upstream of the test for an information segment. One of ordinary skill in the art will now recognize various other expressions of the same relations which may be used to implement such a configuration of task T510 and will also appreciate that such expressions may use different values to indicate a corresponding result.

Figure 19:
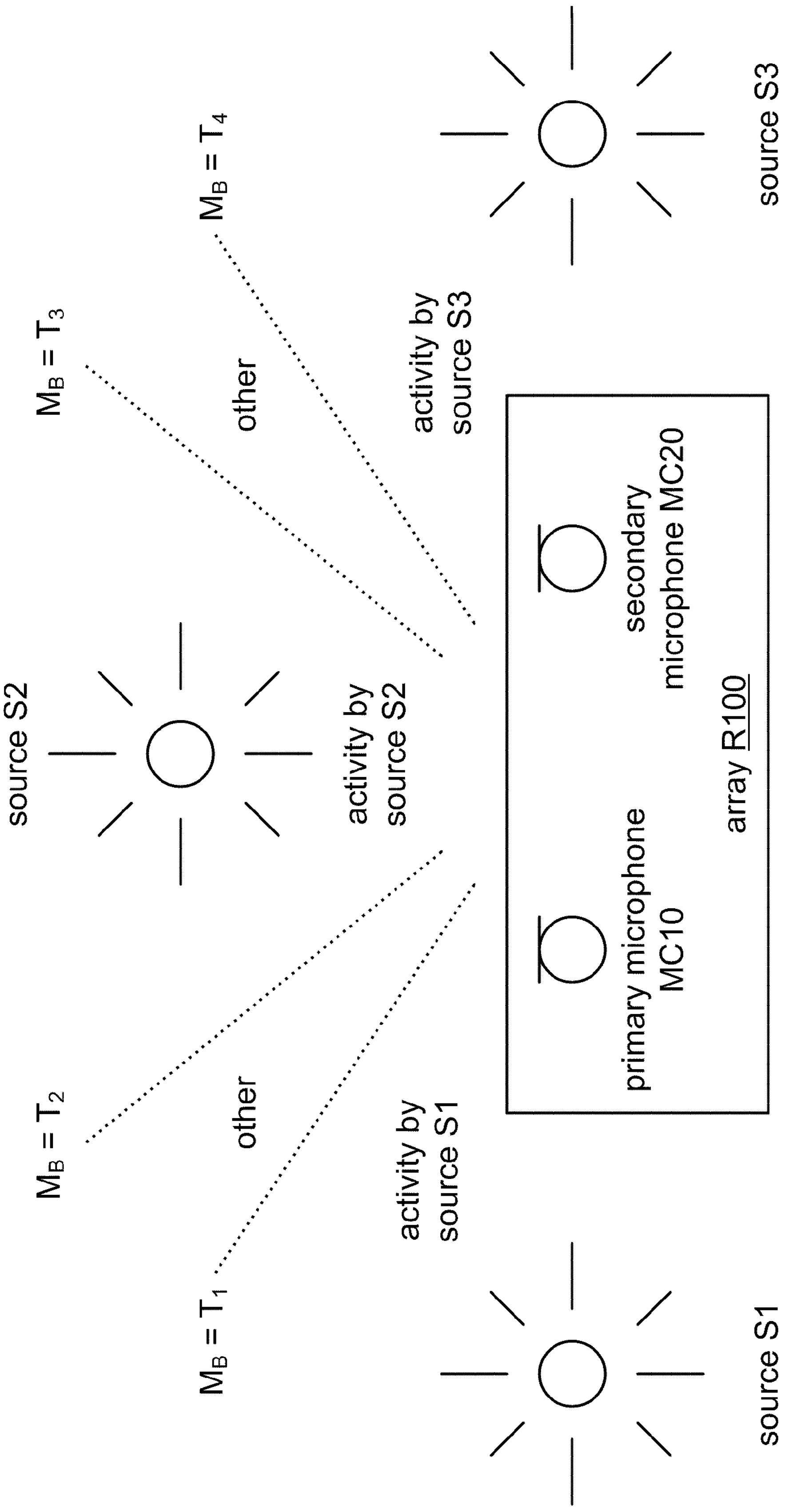
FIG. 19 shows an idealized visual depiction of approximate angles of arrival for activity by three different information sources.

In a typical use of a portable communications device such as a headset or handset, only one information source is expected (i.e., the user's mouth). For other audio sensing applications, however, it may be desirable to configure task T500 to distinguish among two or more different types of information segments. Such capability may be useful, for example, in conferencing or speakerphone applications. FIG. 19 shows an idealized visual depiction of how the value of balance measure $M_B$ may be used to distinguish among information segments that correspond to activity from three different respective information sources (e.g., three persons using a telephone conferencing device). A corresponding implementation of task T510 may be configured to indicate the particular type of information segment according to an expression such as $$\begin{cases} 1, & I_A(L_{2n}/L_{1n}) < T_1 \\ 2, & I_A(L_{2n}/L_{1n}) > T_2 \text{ and } I_A(L_{2n}/L_{1n}) < T_3 \\ 3, & I_A(L_{2n}/L_{1n}) > T_4 \\ 0, & \text{otherwise} \end{cases}, \quad (22)$$

where results of 1, 2, and 3 indicate information segments corresponding to source S1, S2, and S3, respectively, and threshold values T1 to T4 are selected to support appropriate operation of gain factor calculation task T220.

For a case in which method M300 is configured to distinguish among information segments that correspond to activity from different respective information sources, task T220 may be configured to use a different respective bias factor for each of the different types of information segment. For such an implementation of method M300, it may be desirable to perform a corresponding instance of a bias factor evaluation operation as described above to obtain each of the different bias factors, with the reference device being in a standard orientation relative to the respective information source in each case.

Figure 20B:
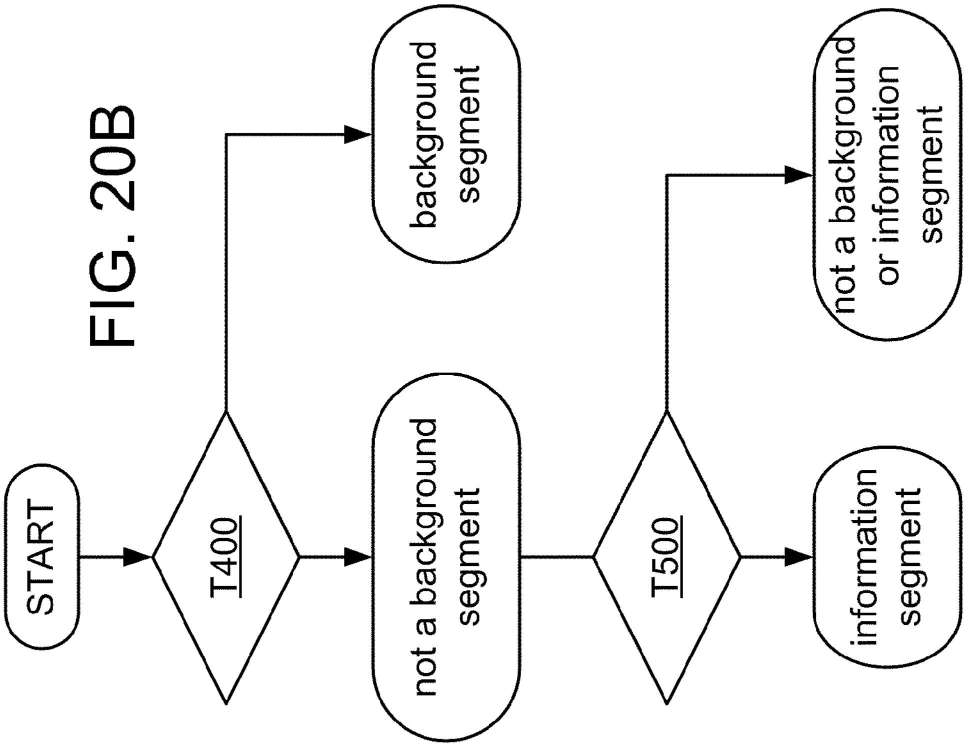
FIG. 20B shows a flowchart of an example in which execution of task T500 is conditional on the outcome of task T400.
Figure 20A:
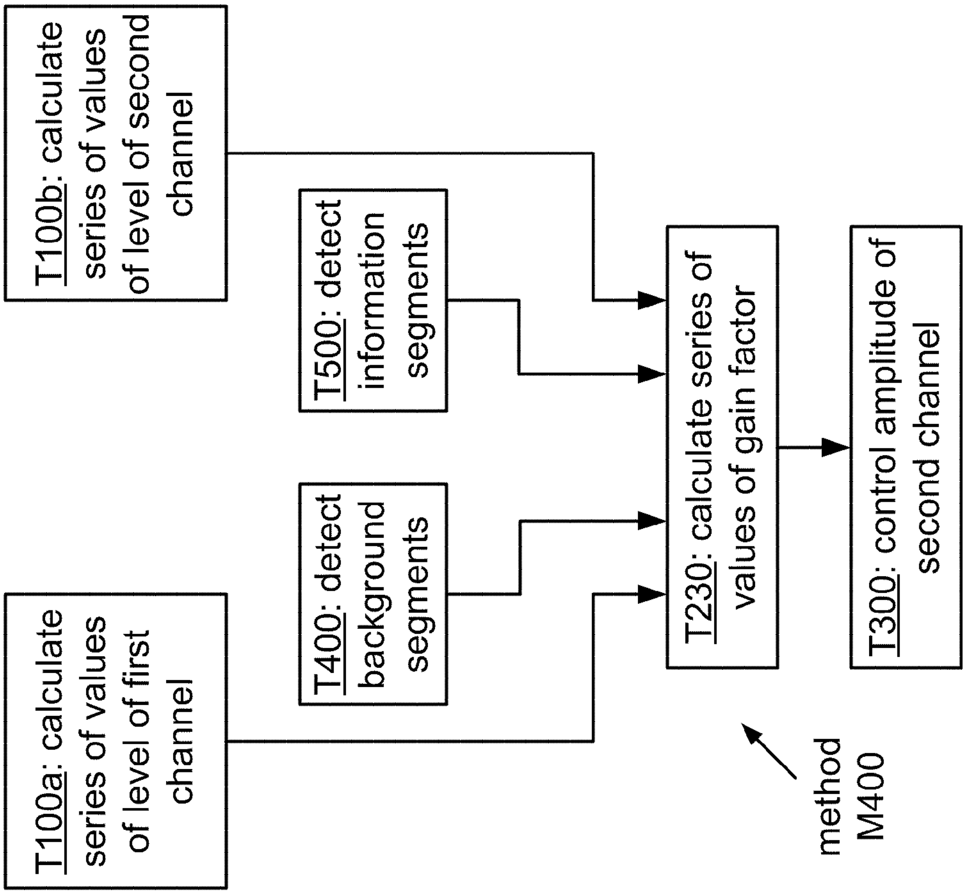
FIG. 20A shows a flowchart of an implementation M400 of method M100.

An audio sensing device may be configured to perform one of methods M200 and M300. Alternatively, an audio sensing device may be configured to select among methods M200 and M300. For example, it may be desirable to configure an audio sensing device to use method M300 in an environment that has insufficient background acoustic noise to support reliable use of method M200. In a further alternative, an audio sensing device is configured to perform an implementation M400 of method M100 as shown in the flowchart of FIG. 20A. Method M400, which is also an implementation of methods M200 and M300, includes an instance of any of the implementations of task T400 described herein and an instance of any of the implementations of task T500 described herein. Method M400 also includes an implementation T230 of task T200 that is configured to calculate the series of values of the gain factor based on the indications of tasks T400 and T500.

Figure 21B:
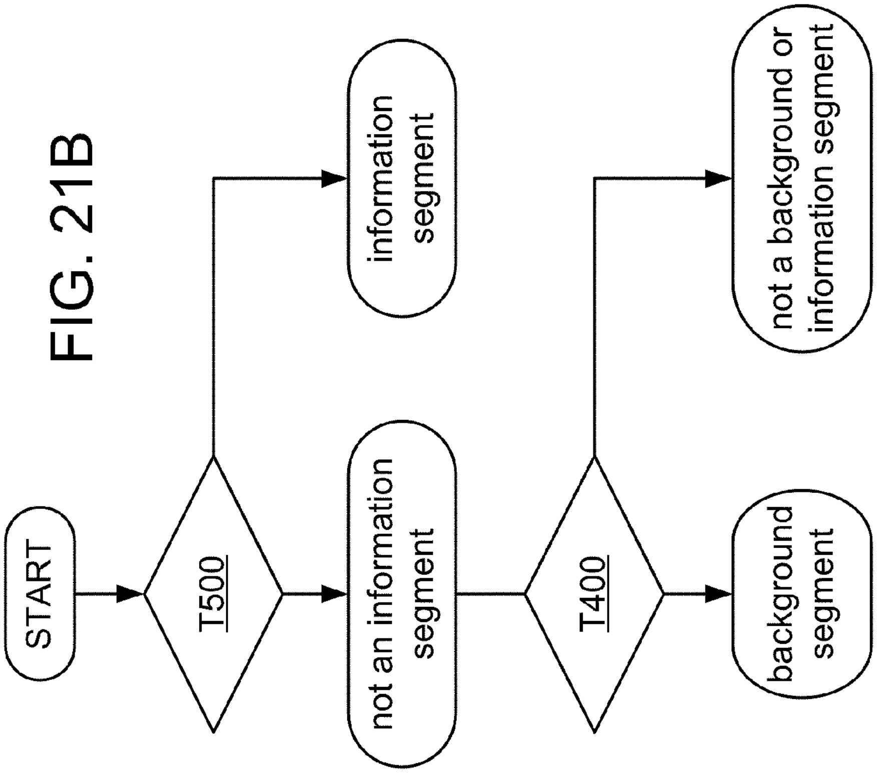
FIG. 21B shows a flowchart of an example in which execution of task T400 is conditional on the outcome of task T500.
Figure 21A:
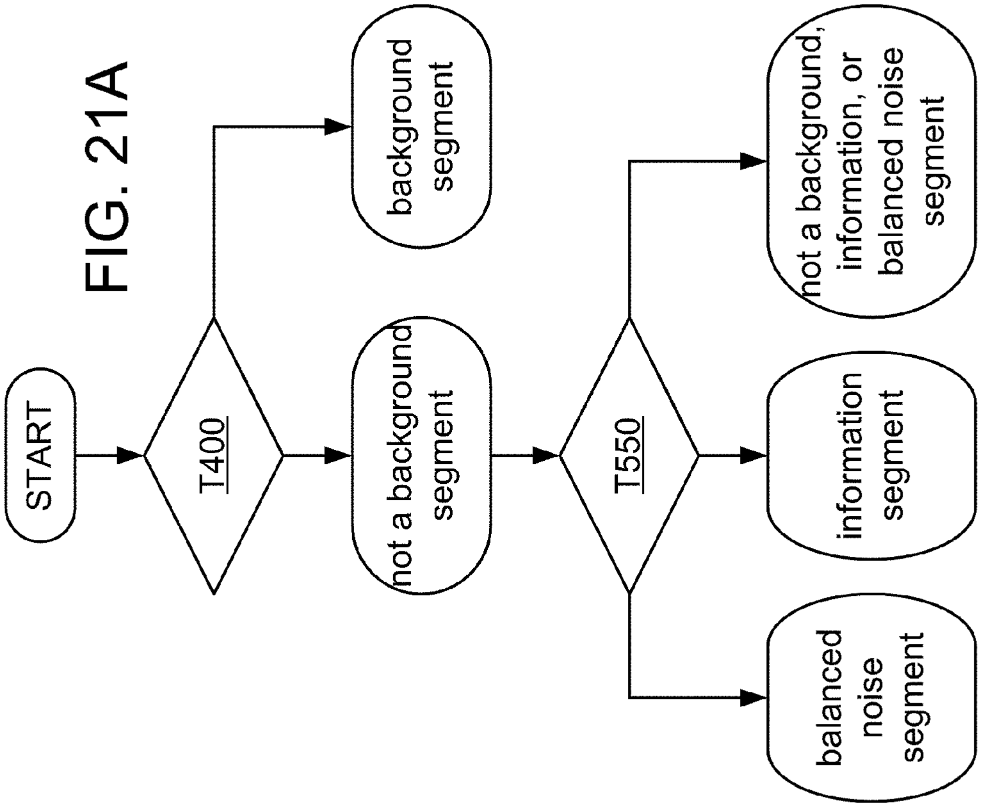
FIG. 21A shows a flowchart of an example in which execution of task T550 is conditional on the outcome of task T400.

It may be desirable to configure method M400 such that tasks T400 and T500 execute in parallel. Alternatively, it may be desirable to configure method M400 such that tasks T400 and T500 execute in a serial (e.g., cascade) fashion. FIG. 20B shows a flowchart of such an example in which execution of task T500 is conditional on the outcome of task T400 for each segment. FIG. 21A shows a flowchart of such an example in which execution of task T550 is conditional on the outcome of task T400 for each segment. FIG. 21B shows a flowchart of such an example in which execution of task T400 is conditional on the outcome of task T500 for each segment.

Task T500 may be configured to indicate that a segment is an information segment based on a relation between a level value that corresponds to the segment (e.g., level value $sl_n$ as described herein with reference to task T410) and a background level value (e.g., background level value bg as described herein with reference to task T410). FIG. 22A shows a flowchart of such an implementation T520 of task T510 whose execution is conditional on the outcome of task T400. Task T520 includes a test that compares level value $sl_n$ to the product of background level value bg and a weight $w_3$. In another example, weight $w_3$ is implemented as an offset to background level value bg rather than as a factor. The value of weight $w_3$ may be selected from a range such as from one to 1.5, two, or five and may be fixed or adaptable. In one particular example, the value of $w_3$ is equal to 1.3.

Figure 22B:
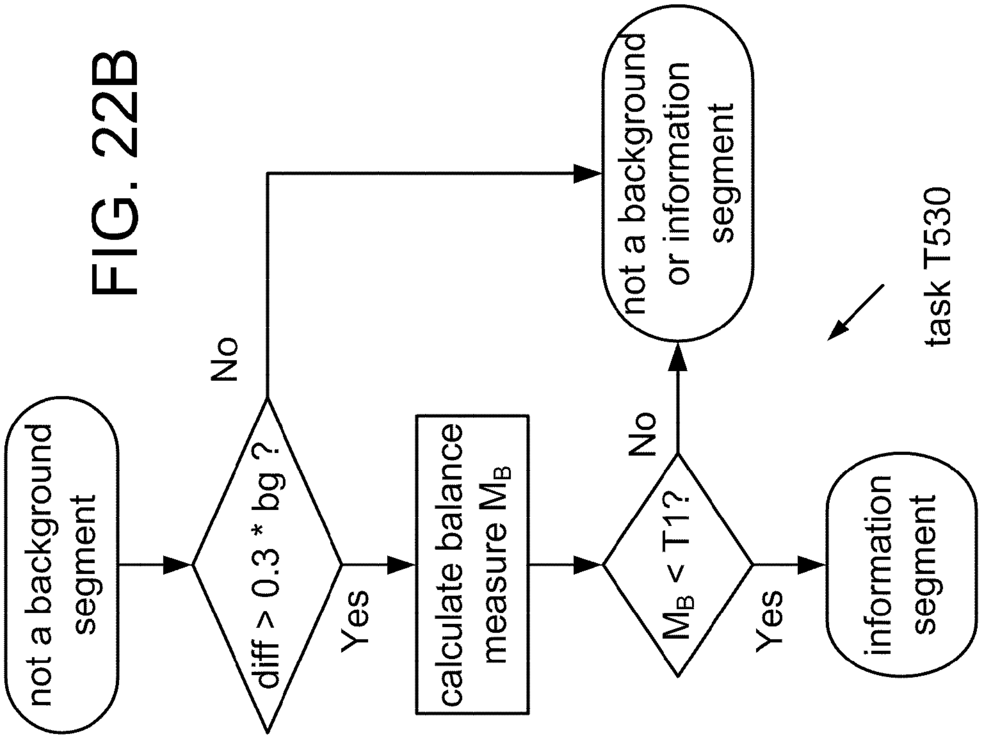
FIG. 22B shows a flowchart of an implementation T530 of task T510.
Figure 22A:
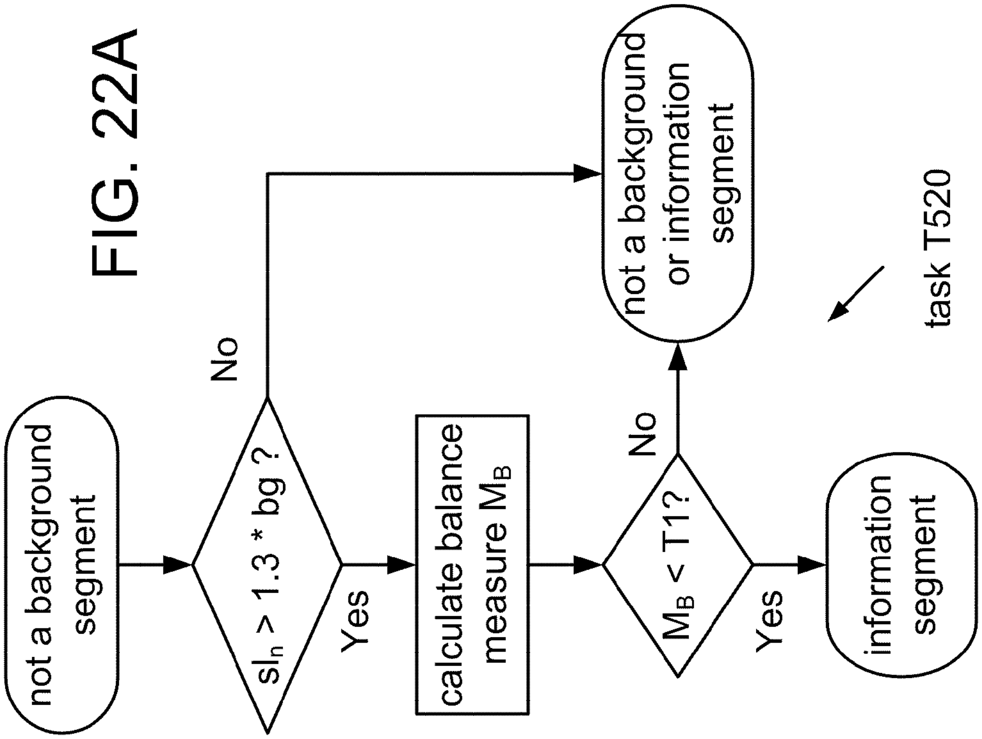
FIG. 22A shows a flowchart of an implementation T520 of task T510.
Figure 23A:
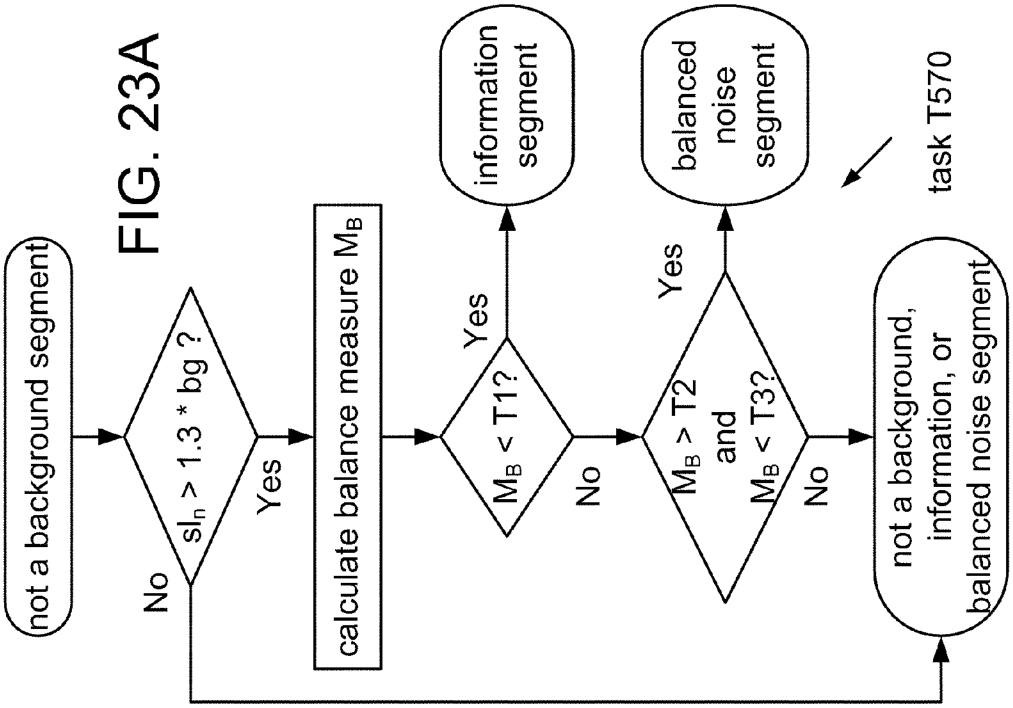
FIG. 23A shows a flowchart of an implementation T570 of task T550.
Figure 23B:
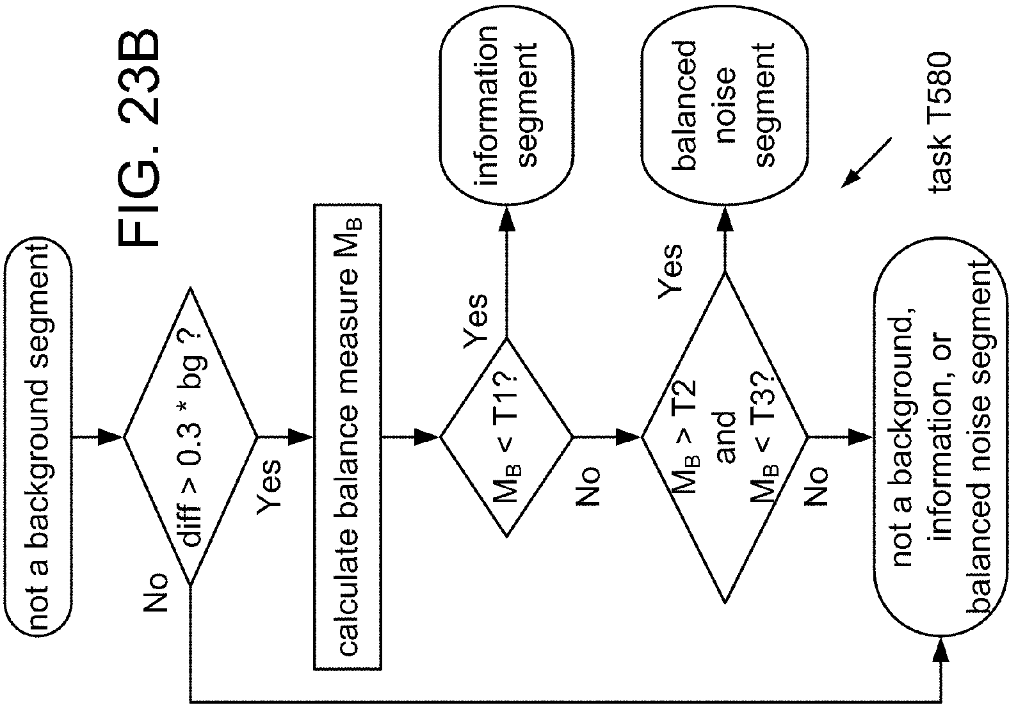
FIG. 23B shows a flowchart of an implementation T580 of task T550.

FIG. 22B shows a flowchart of a similar implementation T530 of task T510 which includes a test that compares a difference diff between the level value sl and the background level value bg to the product of background level value bg and a weight $w_4$. In another example, weight $w_4$ is implemented as an offset to background level value bg rather than as a factor. The value of weight $w_4$ may be selected from a range such as from zero to 0.4, one, or two and may be fixed or adaptable. In one particular example, the value of $w_4$ is equal to 0.3. FIGS. 23A and 23B show flowcharts of similar implementations T570 and T580, respectively, of task T550.

It is expressly noted that comparisons (also called "tests") and other operations of the various tasks of method M100, as well as tests and other operations within the same task, may be implemented to execute in parallel, even for cases in which the outcome of another operation may render an operation unnecessary. For example, it may be desirable to execute the tests of task T520 (or of task T530, or to execute two or more of the tests of tasks T570 or T580) in parallel, even though a negative outcome in the first test may make the second test unnecessary.

Task T230 may be configured to calculate the current value of the gain factor $G_n$ according to an expression such as one of the following:

$$G_n = \begin{cases} L_{1n}/(I_S L_{2n}), & \text{segment } n \text{ is information} \\ L_{1n}/L_{2n}, & \text{segment } n \text{ is background}; \\ G_{n-1}, & \text{otherwise} \end{cases} \quad (23)$$

$$G_n = \begin{cases} (\beta)L_{1n}/(I_S L_{2n}) + (1-\beta)G_{n-1}, & \text{segment } n \text{ is information} \\ (\beta)L_{1n}/L_{2n} + (1-\beta)G_{n-1}, & \text{segment } n \text{ is background}, \\ G_{n-1}, & \text{otherwise} \end{cases} \quad (24)$$

where β is a smoothing factor value as discussed above. It may be desirable to configure task T230 to vary the degree of temporal smoothing of the gain factor value according to the indications of task T400 and/or task T500. For example, it may be desirable to configure task T230 to perform less smoothing (e.g., to use a higher smoothing factor value, such as β*2 or β*3) for background segments, at least during the initial segments of an audio sensing session (e.g., during the first fifty, one hundred, two hundred, four hundred, or eight hundred segments, or the first five, ten, twenty, or thirty seconds, of the session). Additionally or in the alternative, it may be desirable to configure task T230 to perform more smoothing (e.g., to use a lower smoothing factor value, such as β/2, β/3, or β/4) during information and/or balanced noise segments.

For an implementation of method M400 in which task T500 is configured to indicate information segments and balanced noise segments, task T230 may be configured to calculate the current value of the gain factor $G_n$ according to an expression such as one of the following:

$$G_n = \begin{cases} L_{1n}/(I_S L_{2n}), & \text{segment } n \text{ is information} \\ L_{1n}/L_{2n}, & \text{segment } n \text{ is balanced noise or background;} \\ G_{n-1} & \text{otherwise} \end{cases} \quad (25)$$

$$G_n = \begin{cases} (\beta)L_{1n}/(I_S L_{2n}) + (1-\beta)G_{n-1}, & \text{segment } n \text{ is information} \\ (\beta)L_{1n}/L_{2n} + (1-\beta)G_{n-1}, & \text{seg. } n \text{ is balanced noise or } bkgd. \\ G_{n-1}, & \text{otherwise} \end{cases}, \quad (26)$$

where β is a smoothing factor value as discussed above. Again, it may be desirable to configure task T230 to vary the degree of temporal smoothing of the gain factor value for background segments and/or for information and/or balanced noise segments as described above.

It may be desirable to configure method M100 to perform one or more of level value calculation task T100*a*, level value calculation task T100*b*, and gain factor calculation task T200 on a different time scale than the other tasks. For example, method M100 may be configured such that tasks T100*a* and T100*b* produce a level value for each segment but that task T200 calculates a gain factor value only for every other segment, or for every fourth segment. Similarly, method M200 (or method M300) may be configured such that tasks T100*a* and T100*b* produce a level value for each segment but that task T400 (and/or task T500) updates its result only for every other segment, or for every fourth segment. In such cases, the result from the less frequent task may be based on an average of results from the more frequent task.

It may be desirable to configure method M100 such that a gain factor value that corresponds to one segment, such as a gain factor value that is based on level values from segment n, is applied by task T300 to a different segment, such as segment (n+1) or segment (n+2). Likewise, it may be desirable to configure method M200 (or M300) such that a background segment indication (or an information or balanced noise segment indication) that corresponds to one segment is used to calculate a gain factor value that is applied by task T300 to a different segment (e.g., to the next segment). Such a configuration may be desirable, for example, if it reduces a computational budget without creating an audible artifact.

It may be desirable to perform separate instances of method M100 on respective frequency subbands of a multichannel audio signal. In one such example, a set of analysis filters or a transform operation (e.g., a fast Fourier transform or FFT) is used to decompose each channel of the signal into a set of subbands, an instance of method M100 is performed separately on each subband, and a set of synthesis filters or an inverse transform operation is used to recompose each of the first channel and the processed second channel. The various subbands may be overlapping or nonoverlapping and of uniform width or of nonuniform width. Examples of nonuniform subband division schemes that may be used include transcendental schemes, such as a scheme based on the Bark scale, or logarithmic schemes, such as a scheme based on the Mel scale.

It may be desirable to extend method M100 to a multichannel audio signal that has more than two channels. For example, one instance of method M100 may be executed to control the amplitude of the second channel relative to the first channel, based on the levels of the first and second channels, while another instance of method M100 is executed to control the amplitude of the third channel relative to the first channel. In such case, different instances of method M300 may be configured to use different respective bias factors, where each of the bias factors may be obtained by performing a respective bias factor evaluation operation on corresponding channels of the reference device.

A portable multi-microphone audio sensing device may be configured to perform an implementation of method M100 as described herein for in-service matching of the channels of the microphone array. Such a device may be configured to perform an implementation of method M100 during every use of the device. Alternatively, such a device may be configured to perform an implementation of method M100 during an interval that is less than the entire usage period. For example, such a device may be configured to perform an implementation of method M100 less frequently than every use, such as not more than once every day, every week, or every month. Alternatively, such a device may be configured to perform an implementation of method M100 upon some event, such as every battery charge cycle. At other times, the device may be configured to perform amplitude control of the second channel relative to the first channel according to a stored gain factor value (e.g., the most recently calculated gain factor value).

Figure 24A:
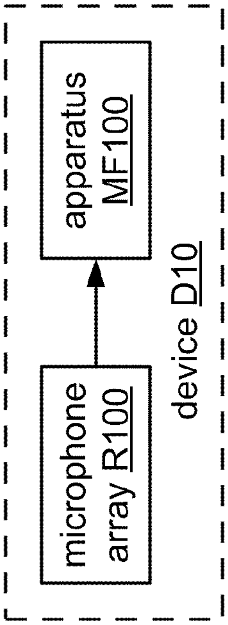
FIG. 24A shows a block diagram of a device D10 according to a general configuration.

FIG. 24A shows a block diagram of a device D10 according to a general configuration. Device D10 includes an instance of any of the implementations of microphone array R100 disclosed herein, and any of the audio sensing devices disclosed herein (e.g., devices D100, D200, D300, D400, D500, and D600) may be implemented as an instance of device D10. Device D10 also includes an apparatus MF100 that is configured to process a multichannel audio signal, as produced by array R100, to control the amplitude of the second channel relative to the amplitude of the first channel. For example, apparatus MF100 may be configured to process the multichannel audio signal according to an instance of any of the implementations of method M100 disclosed herein. Apparatus MF100 may be implemented in hardware and/or in software (e.g., firmware). For example, apparatus MF100 may be implemented on a processor of device D10 that is also configured to perform a spatial processing operation as described above on the processed multichannel signal (e.g., one or more operations that determine the distance between the audio sensing device and a particular sound source, reduce noise, enhance signal components that arrive from a particular direction, and/or separate one or more sound components from other environmental sounds).

Figure 24B:
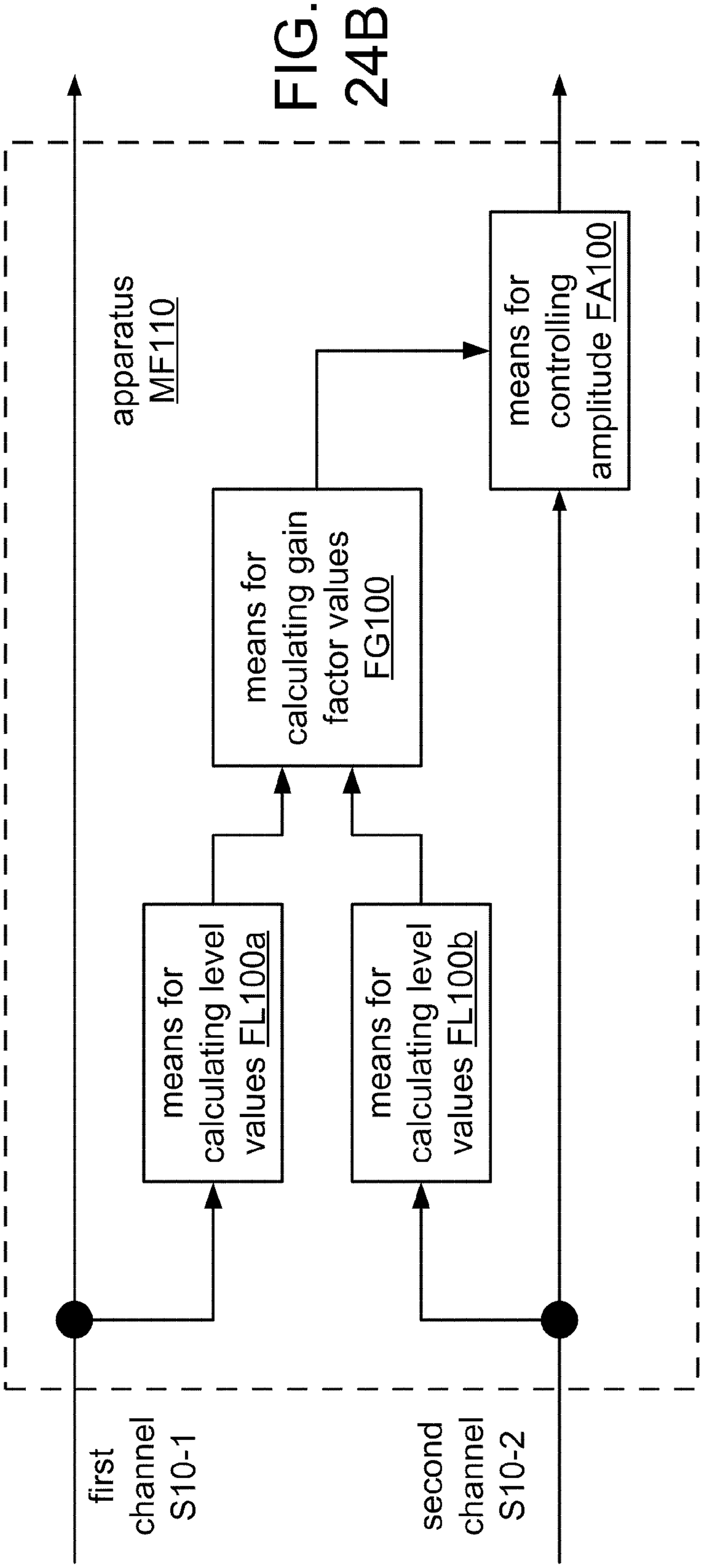
FIG. 24B shows a block diagram of an implementation MF110 of apparatus MF100.

FIG. 24B shows a block diagram of an implementation MF10 of apparatus MF100. Apparatus MF110 includes means FL100*a* for calculating a series of values of a level of a first channel of the audio signal over time (e.g., as described above with reference to task T100*a*). Apparatus MF110 also includes means FL100*b* for calculating a series of values of a level of a second channel of the audio signal over time (e.g., as described above with reference to task T100*b*). Means FL100*a* and FL100*b* may be implemented as different structures (e.g., different circuits or software modules), as different parts of the same structure (e.g., different areas of an array of logic elements, or parallel threads of a computing process), and/or as the same structure at different times (e.g., a calculating circuit or processor configured to perform a sequence of different tasks over time).

Apparatus MF110 also includes means FG100 for calculating a series of values of a gain factor over time (e.g., as described above with reference to task T200) and means FA100 for controlling the amplitude of the second channel relative to the amplitude of the first channel (e.g., as described above with reference to task T300). With respect to either of means FL100*a* and FL100*b*, calculating means FG100 may be implemented as a different structure, as a different part of the same structure, and/or as the same structure at a different time. With respect to any of means FL100*a*, FL100*b*, and FG100, means FA100 may be implemented as a different structure, as a different part of the same structure, and/or as the same structure at a different time. In one example, means FA100 is implemented as a calculating circuit or process that is configured to multiply samples of the second channel by a corresponding value of the gain factor. In another example, means FA100 is implemented as an amplifier or other adjustable gain control element.

Figure 25:
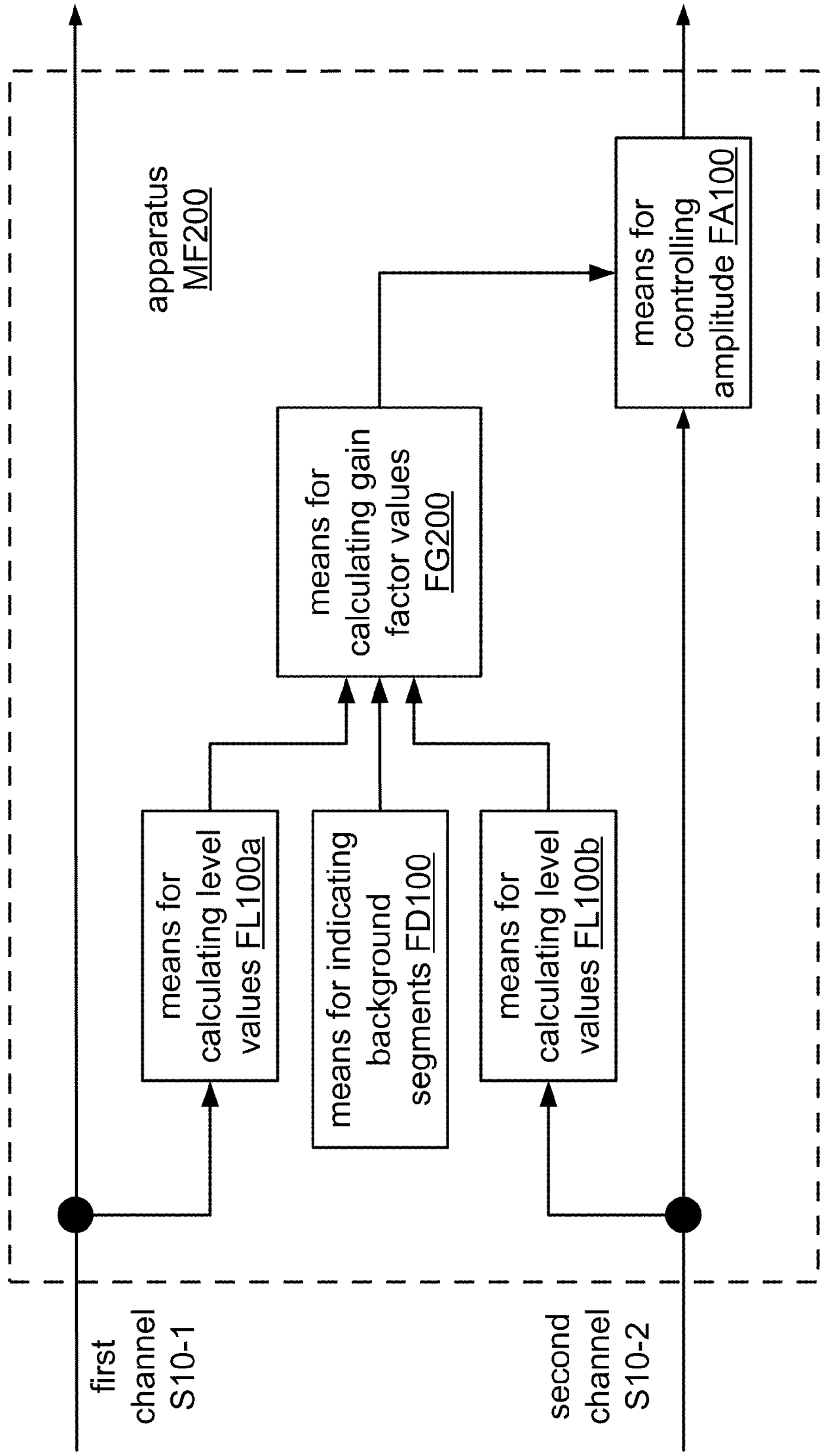
FIG. 25 shows a block diagram of an implementation MF200 of apparatus MF110.

FIG. 25 shows a block diagram of an implementation MF200 of apparatus MF110. Apparatus MF200 includes means FD100 for indicating that a segment is a background segment (e.g., as described above with reference to task T400). Means FD100 may be implemented, for example, as a logical circuit (e.g., an array of logic elements) and/or as a task executable by a processor. In one example, means FD100 is implemented as a voice activity detector. Apparatus MF200 also includes an implementation FG200 of means FG100 that is configured to calculate the series of values of the gain factor based on the indications of means FD100 (e.g., as described above with reference to task T210).

Figure 26:
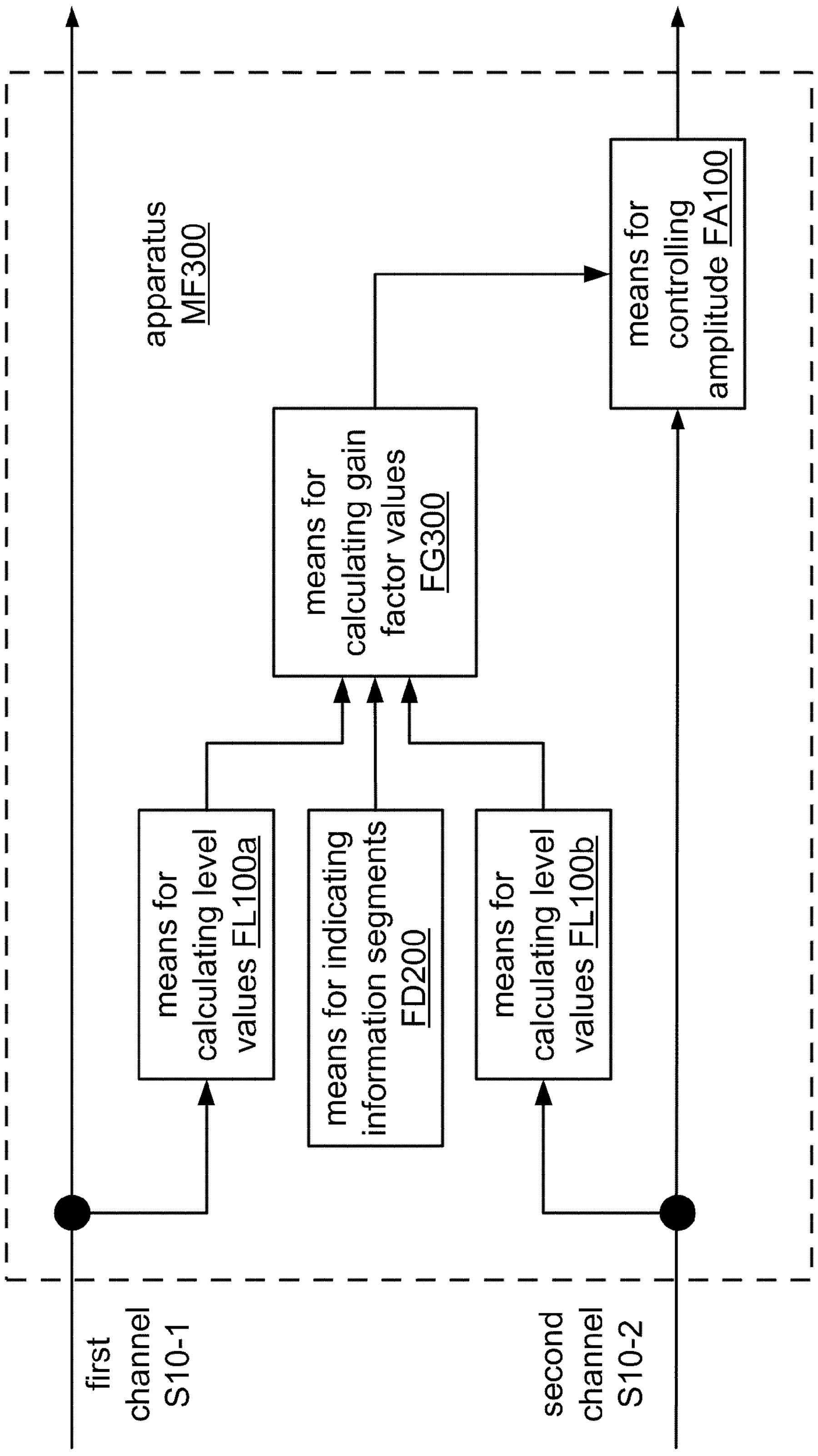
FIG. 26 shows a block diagram of an implementation MF300 of apparatus MF110.

FIG. 26 shows a block diagram of an implementation MF300 of apparatus MF110. Apparatus MF300 includes means FD200 for indicating that a segment is an information segment (e.g., as described above with reference to task T500). Means FD200 may be implemented, for example, as a logical circuit (e.g., an array of logic elements) and/or as a task executable by a processor. Apparatus MF300 also includes an implementation FG300 of means FG100 that is configured to calculate the series of values of the gain factor based on the indications of means FD200 (e.g., as described above with reference to task T220).

Figure 27:
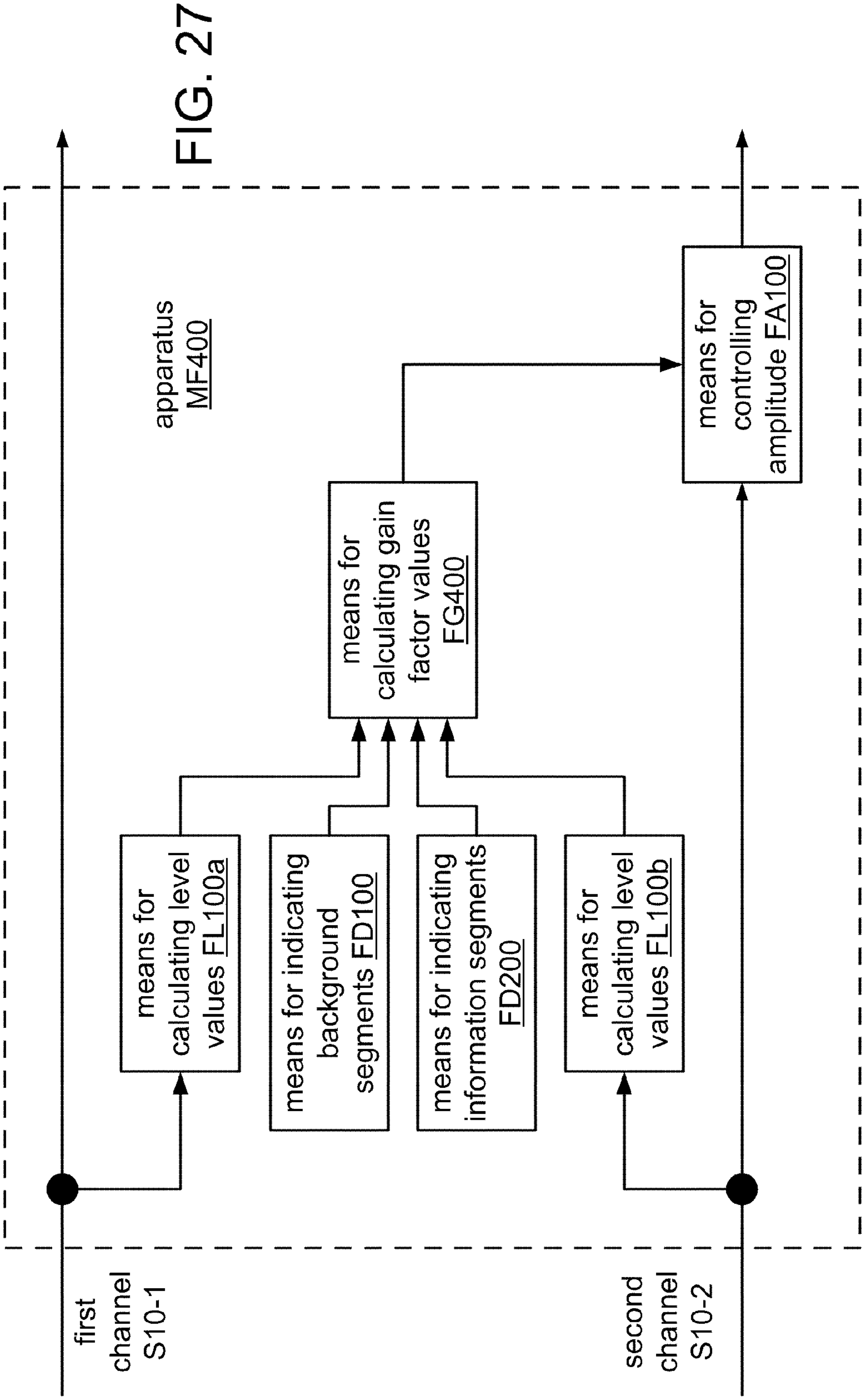
FIG. 27 shows a block diagram of an implementation MF400 of apparatus MF110.

FIG. 27 shows a block diagram of an implementation MF400 of apparatus MF110 that includes means FD100 for indicating that a segment is a background segment and means FD200 for indicating that a segment is an information segment. Apparatus MF400 also includes an implementation FG400 of means FG100 that is configured to calculate the series of values of the gain factor based on the indications of means FD100 and FD200 (e.g., as described above with reference to task T230).

Figure 28A:
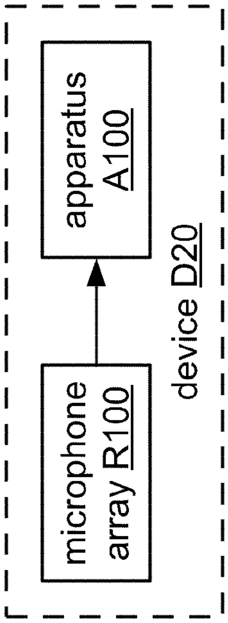
FIG. 28A shows a block diagram of a device D20 according to a general configuration.

FIG. 28A shows a block diagram of a device D20 according to a general configuration. Device D20 includes an instance of any of the implementations of microphone array R100 disclosed herein, and any of the audio sensing devices disclosed herein (e.g., devices D100, D200, D300, D400, D500, and D600) may be implemented as an instance of device D20. Device D20 also includes an apparatus A100 that is configured to process a multichannel audio signal, as produced by array R100, to control the amplitude of the second channel relative to the amplitude of the first channel. For example, apparatus A100 may be configured to process the multichannel audio signal according to an instance of any of the implementations of method M100 disclosed herein. Apparatus A100 may be implemented in hardware and/or in software (e.g., firmware). For example, apparatus A100 may be implemented on a processor of device D20 that is also configured to perform a spatial processing operation as described above on the processed multichannel signal (e.g., one or more operations that determine the distance between the audio sensing device and a particular sound source, reduce noise, enhance signal components that arrive from a particular direction, and/or separate one or more sound components from other environmental sounds).

Figure 28B:
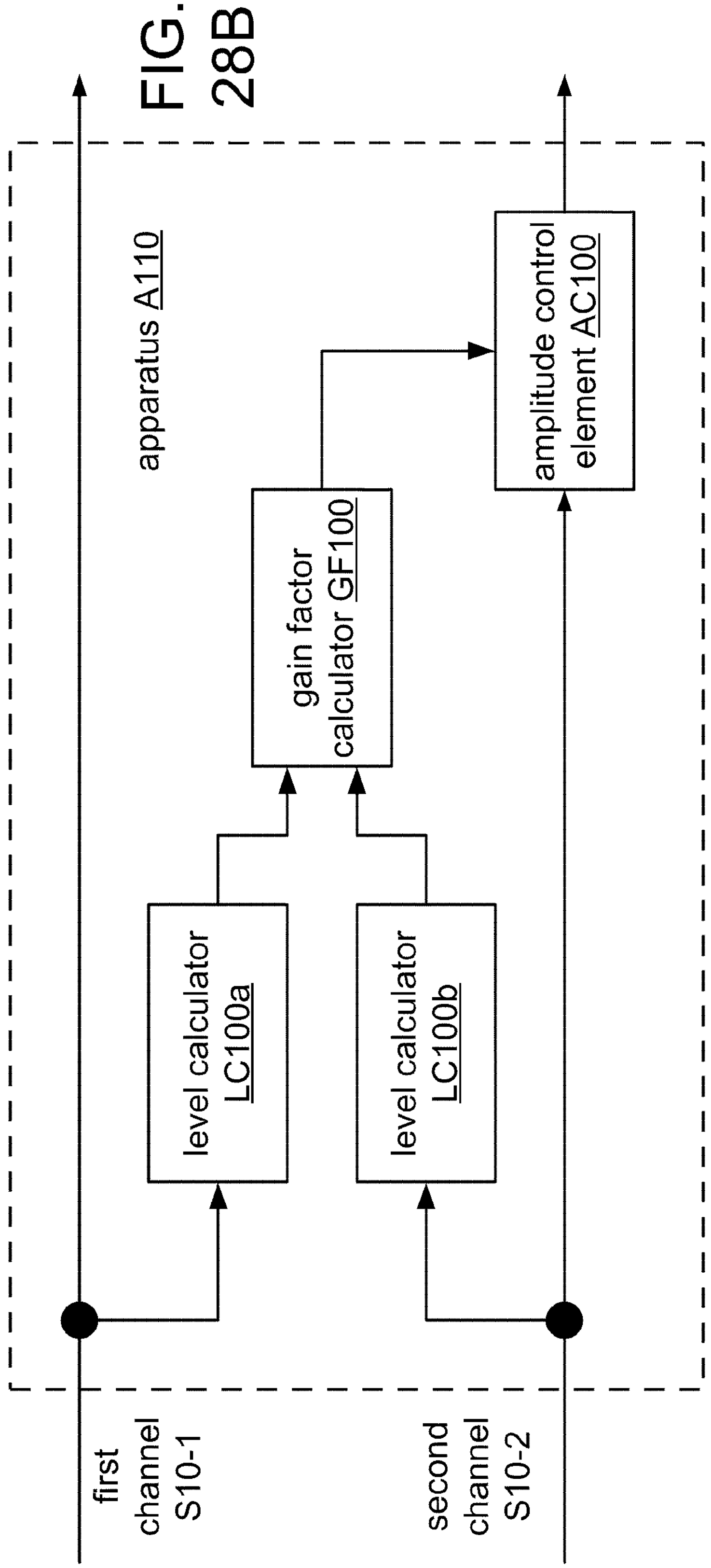
FIG. 28B shows a block diagram of an implementation A110 of apparatus A100.

FIG. 28B shows a block diagram of an implementation A110 of apparatus A100. Apparatus A110 includes a first level calculator LC100*a* that is configured to calculate a series of values of a level of a first channel of the audio signal over time (e.g., as described above with reference to task T100*a*). Apparatus A110 also includes a second level calculator LC100*b* that is configured to calculate a series of values of a level of a second channel of the audio signal over time (e.g., as described above with reference to task T100*b*). Level calculators LC100*a* and LC100*b* may be implemented as different structures (e.g., different circuits or software modules), as different parts of the same structure (e.g., different areas of an array of logic elements, or parallel threads of a computing process), and/or as the same structure at different times (e.g., a calculating circuit or processor configured to perform a sequence of different tasks over time).

Apparatus A110 also includes a gain factor calculator GF100 that is configured to calculate a series of values of a gain factor over time (e.g., as described above with reference to task T200) and an amplitude control element AC100 that is configured to control the amplitude of the second channel relative to the amplitude of the first channel (e.g., as described above with reference to task T300). With respect to either of level calculators LC100*a* and LC100*b*, gain factor calculator GF100 may be implemented as a different structure, as a different part of the same structure, and/or as the same structure at a different time. With respect to any of calculators LC100*a*, LC100*b*, and GF100, amplitude control element AC100 may be implemented as a different structure, as a different part of the same structure, and/or as the same structure at a different time. In one example, amplitude control element AC100 is implemented as a calculating circuit or process that is configured to multiply samples of the second channel by a corresponding value of the gain factor. In another example, amplitude control element AC100 is implemented as an amplifier or other adjustable gain control element.

Figure 29:
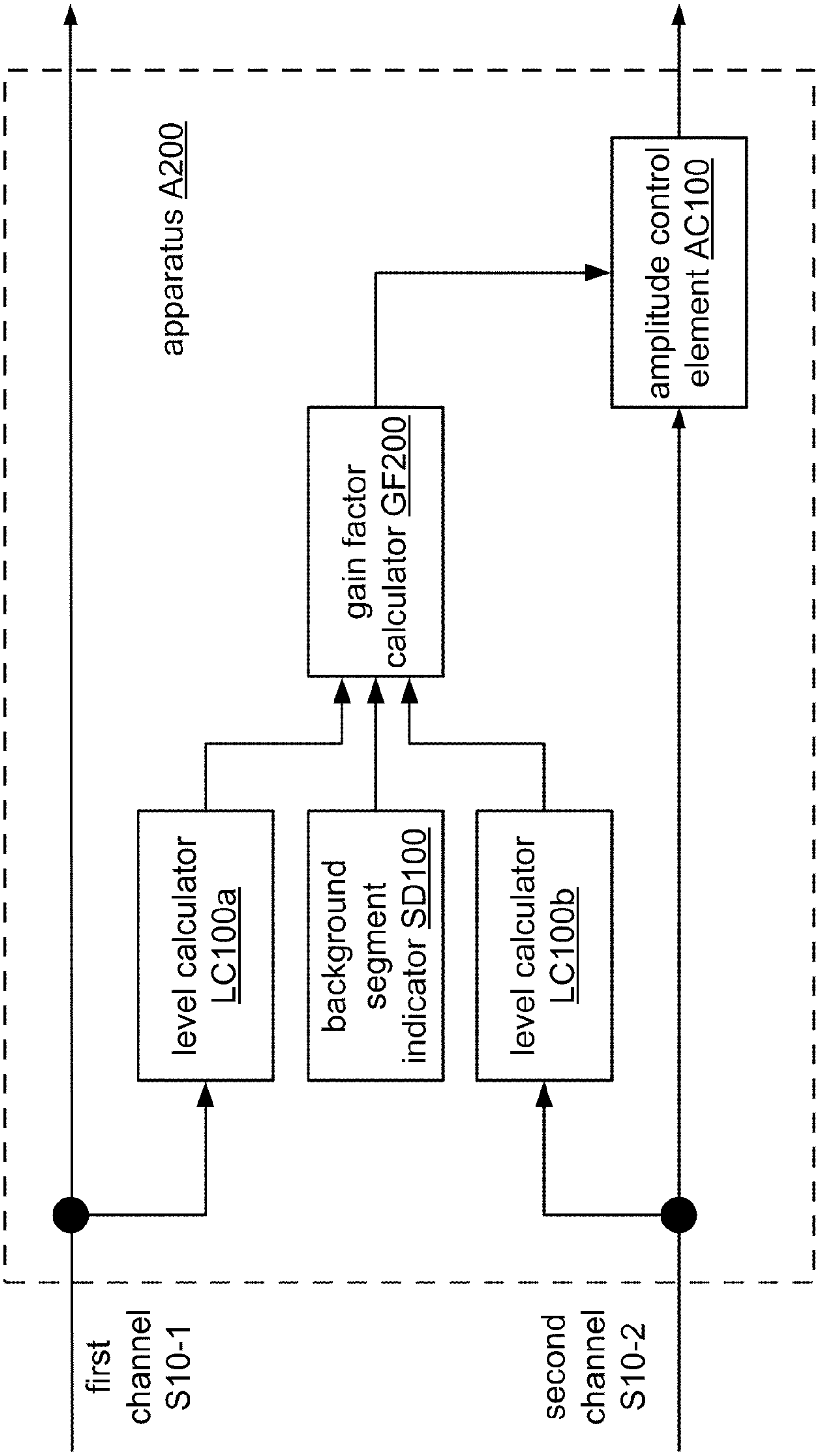
FIG. 29 shows a block diagram of an implementation A200 of apparatus A110.

FIG. 29 shows a block diagram of an implementation A200 of apparatus A 10. Apparatus A200 includes a background segment indicator SD100 that is configured to indicate that a segment is a background segment (e.g., as described above with reference to task T400). Indicator SD100 may be implemented, for example, as a logical circuit (e.g., an array of logic elements) and/or as a task executable by a processor. In one example, indicator SD100 is implemented as a voice activity detector. Apparatus A200 also includes an implementation GF200 of gain factor calculator GF100 that is configured to calculate the series of values of the gain factor based on the indications of indicator SD100 (e.g., as described above with reference to task T210).

Figure 30:
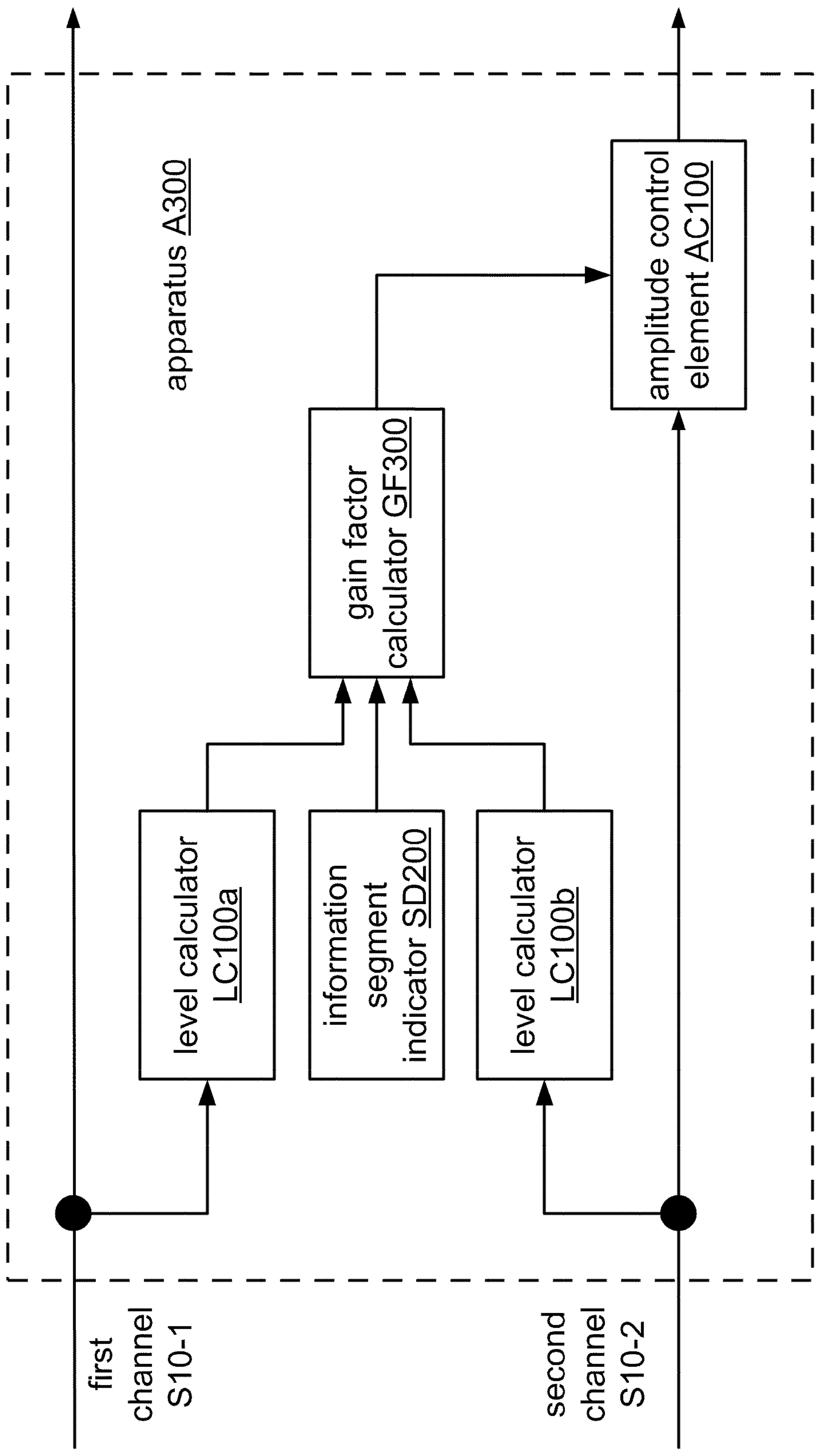
FIG. 30 shows a block diagram of an implementation A300 of apparatus A110.

FIG. 30 shows a block diagram of an implementation A300 of apparatus A110. Apparatus A300 includes an information segment indicator SD200 that is configured to indicate that a segment is an information segment (e.g., as described above with reference to task T500). Indicator SD200 may be implemented, for example, as a logical circuit (e.g., an array of logic elements) and/or as a task executable by a processor. Apparatus A300 also includes an implementation GF300 of gain factor calculator GF100 that is configured to calculate the series of values of the gain factor based on the indications of indicator SD200 (e.g., as described above with reference to task T220).

Figure 31:
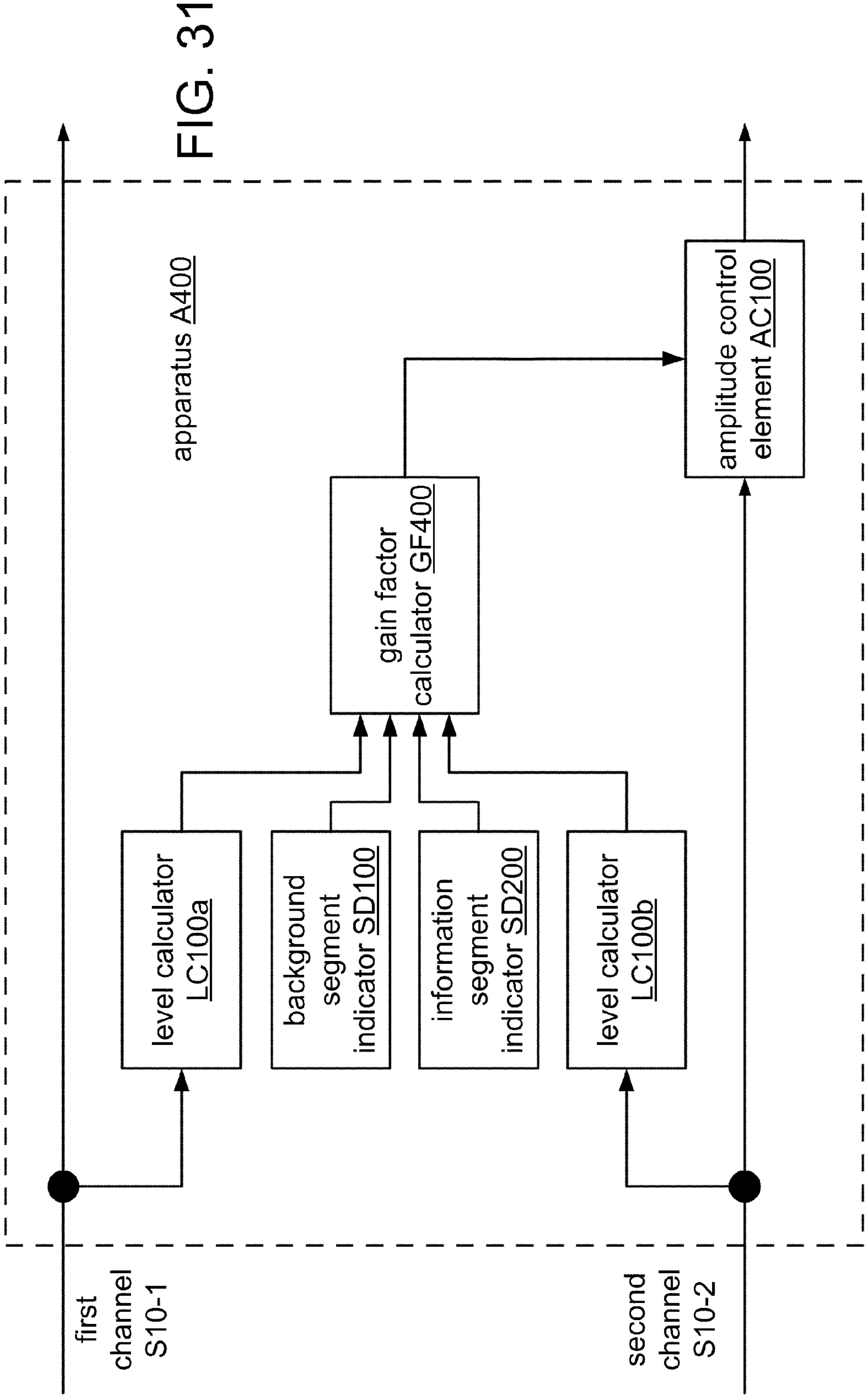
FIG. 31 shows a block diagram of an implementation A400 of apparatus A110.

FIG. 31 shows a block diagram of an implementation A400 of apparatus A110 that includes background segment indicator SD100 and information segment indicator SD200. Apparatus A400 also includes an implementation GF400 of gain factor calculator GF100 that is configured to calculate the series of values of the gain factor based on the indications of indicators SD100 and SD200 (e.g., as described above with reference to task T230).

Method M100 may be implemented in a feedback configuration such that the series of values of the level of the second channel is calculated downstream of amplitude control task T300. In a feedback implementation of method M200, task T210 may be configured to calculate the current value of the gain factor $G_n$ according to an expression such as one of the following:

$$G_n = \begin{cases} G_{n-1}(L_{1n}/\lambda_{2n}), & \text{segment } n \text{ is background} \\ G_{n-1}, & \text{segment } n \text{ is not background} \end{cases}; \quad (27)$$

$$G_n = \begin{cases} (\beta G_{n-1})L_{1n}/\lambda_{2n} + (1-\beta)G_{n-1}, & \text{segment } n \text{ is background} \\ G_{n-1}, & \text{segment } n \text{ is not background} \end{cases}, \quad (28)$$

where $\lambda_{2n}$ denotes the value of the level of the second channel of the segment in this case.

Similarly, task T220 may be configured in a feedback implementation of method M300 to calculate the current value of the gain factor $G_n$ according to an expression such as one of the following:

$$G_n = \begin{cases} (G_{n-1}/I_S)L_{1n}/\lambda_{2n}, & \text{segment } n \text{ is information} \\ G_{n-1}, & \text{segment } n \text{ is not information} \end{cases}; \quad (29)$$

$$G_n = \begin{cases} (\beta)(G_{n-1}/I_S)L_{1n}/\lambda_{2n} + (1-\beta)G_{n-1}, & \text{segment } n \text{ is information} \\ G_{n-1}, & \text{segment } n \text{ is not information} \end{cases}, \quad (30)$$

where β is a smoothing factor value as discussed above. Similarly, task T510 may be configured in a feedback implementation of method M300 to calculate the balance measure $M_B$ for segment n according to an expression such as $M_B=(I_A/G_{n-1})(\lambda_{2n}/L_{1n})$.

Figure 32:
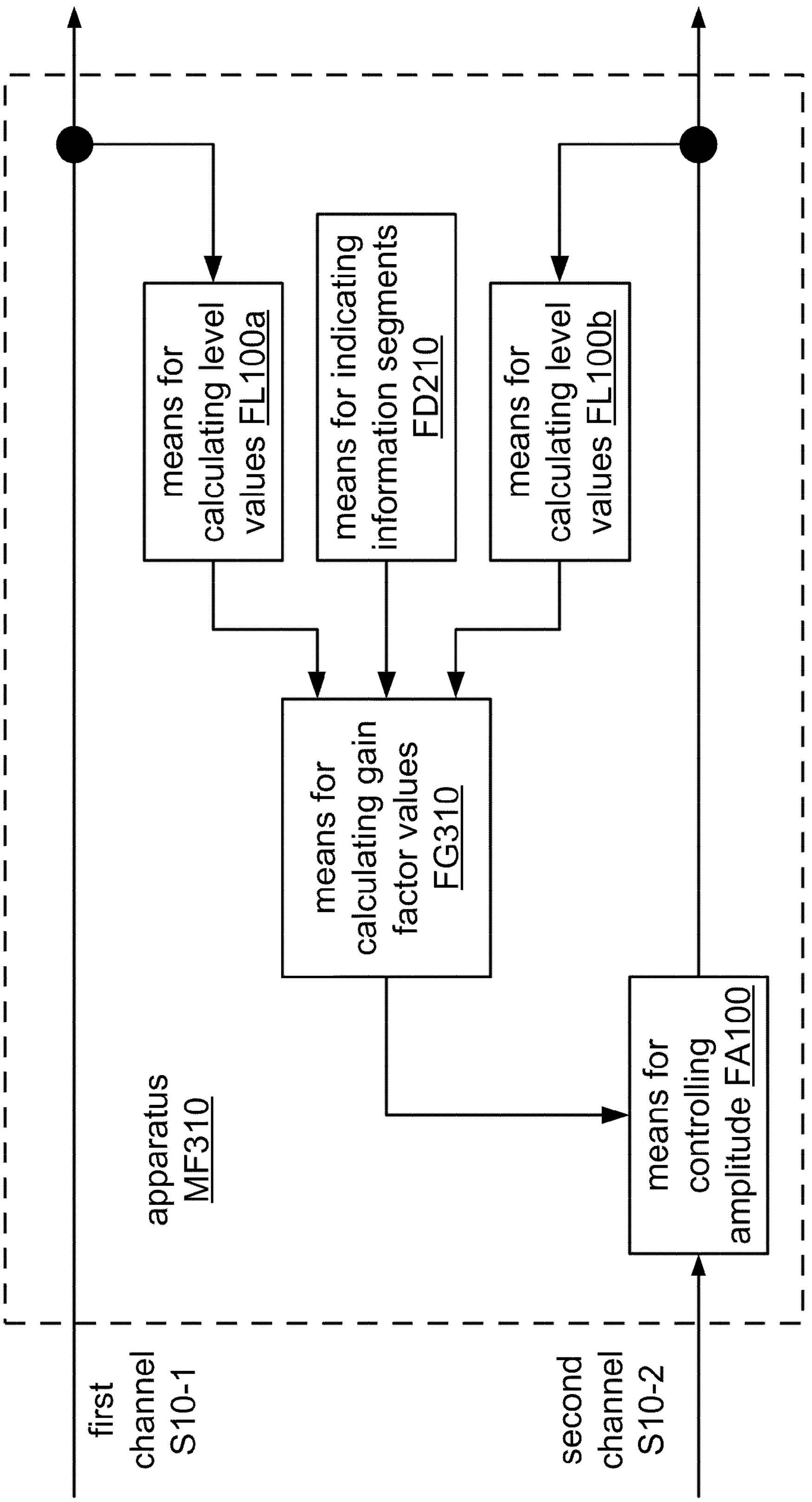
FIG. 32 shows a block diagram of an implementation MF310 of apparatus MF300.
Figure 33:
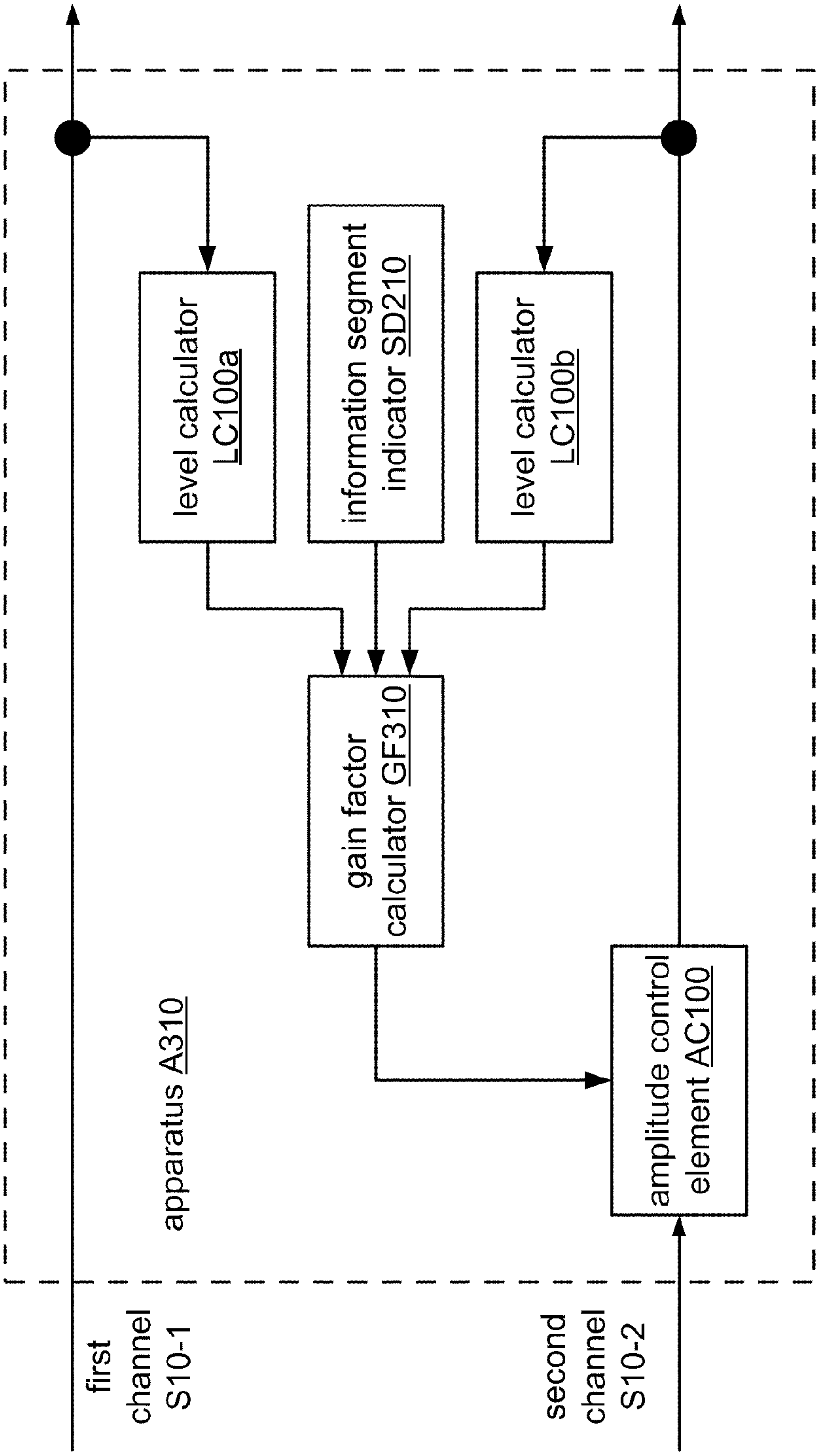
FIG. 33 shows a block diagram of an implementation A310 of apparatus A300.

Likewise, apparatus MF110 may be configured such that the series of values of the level of the second channel is calculated downstream of amplitude control means FA100, and apparatus A110 may be configured such that the series of values of the level of the second channel is calculated downstream of amplitude control element AC100. For example, FIG. 32 shows a block diagram of such an implementation MF310 of apparatus MF300 that includes an implementation FG310 of gain factor calculating means FG300, which may be configured to perform a feedback version of task T220 (e.g., according to expression (29) or (30)), and an implementation FD210 of information segment indicating means FD200, which may be configured to perform a feedback version of task T510 as described above. FIG. 33 shows a block diagram of such an implementation A310 of apparatus A300 that includes an implementation GF310 of gain factor calculator GF300, which may be configured to perform a feedback version of task T220 (e.g., according to expression (29) or (30)), and an implementation SD210 of information segment indicator SD200, which may be configured to perform a feedback version of task T510 as described above.

Figure 34:
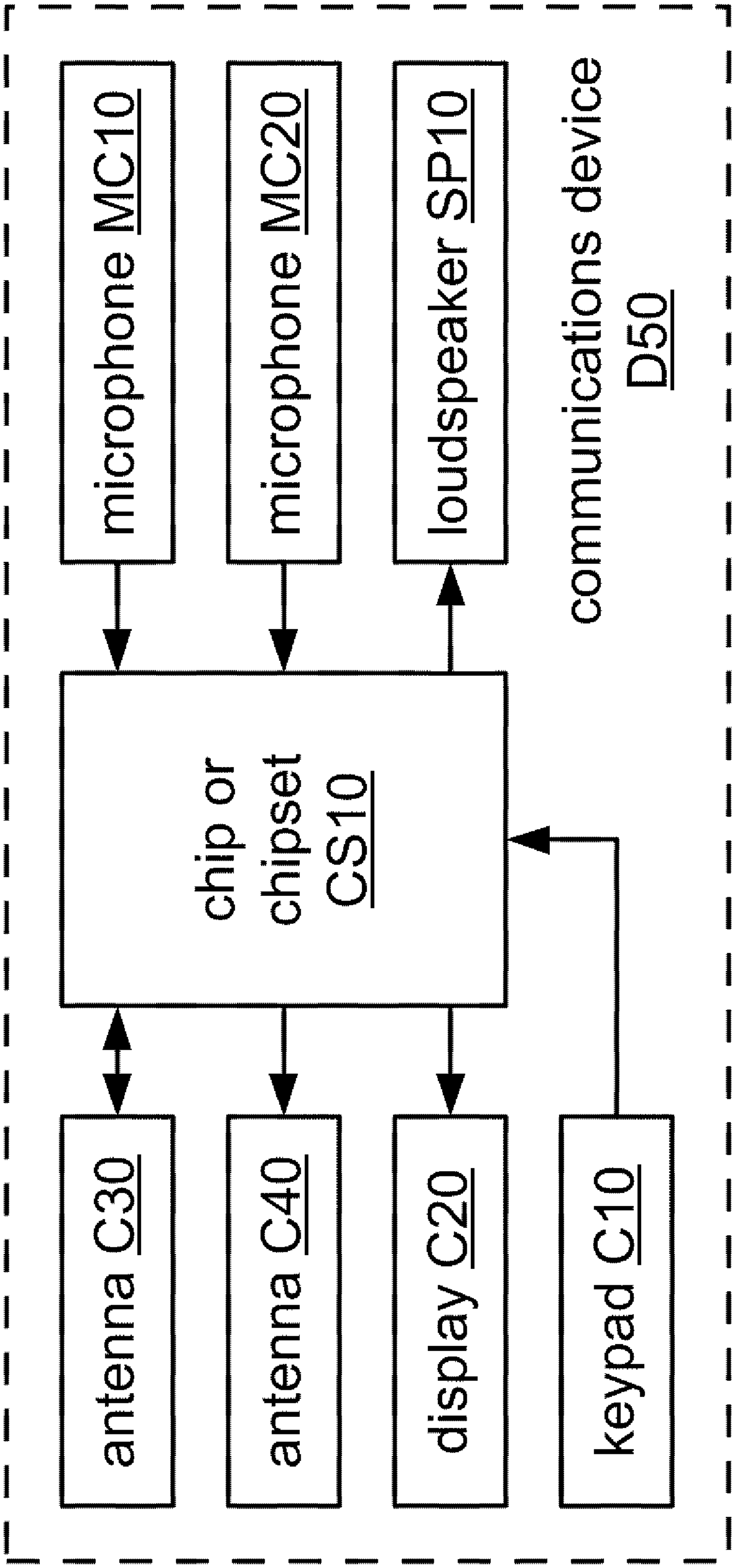
FIG. 34 shows a block diagram of a communications device D50.

FIG. 34 shows a block diagram of a communications device D50 that is an implementation of device D10. Device D50 includes a chip or chipset CS10 (e.g., a mobile station modem (MSM) chipset) that includes apparatus MF100. Chip/chipset CS10 may include one or more processors, which may be configured to execute all or part of apparatus MF100 (e.g., as instructions). Chip/chipset CS10 includes a receiver, which is configured to receive a radio-frequency (RF) communications signal and to decode and reproduce an audio signal encoded within the RF signal, and a transmitter, which is configured to encode an audio signal that is based on the processed multichannel signal produced by apparatus MF100 and to transmit an RF communications signal that describes the encoded audio signal. One or more processors of chip/chipset CS10 may be configured to perform a spatial processing operation as described above on the processed multichannel signal (e.g., one or more operations that determine the distance between the audio sensing device and a particular sound source, reduce noise, enhance signal components that arrive from a particular direction, and/or separate one or more sound components from other environmental sounds), such that the encoded audio signal is based on the spatially processed signal.

Device D50 is configured to receive and transmit the RF communications signals via an antenna C30. Device D50 may also include a diplexer and one or more power amplifiers in the path to antenna C30. Chip/chipset CS10 is also configured to receive user input via keypad C10 and to display information via display C20. In this example, device D50 also includes one or more antennas C40 to support Global Positioning System (GPS) location services and/or short-range communications with an external device such as a wireless (e.g., Bluetooth™) headset. In another example, such a communications device is itself a Bluetooth headset and lacks keypad C10, display C20, and antenna C30.

The methods and apparatus disclosed herein may be applied generally in any transceiving and/or audio reproduction application, especially mobile or otherwise portable instances of such applications. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

The foregoing presentation of the described configurations is provided to enable any person skilled in the art to make or use the methods and other structures disclosed herein. The flowcharts, block diagrams, state diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as applications for voice communications at higher sampling rates (e.g., for wideband communications).

The various elements of an implementation of an apparatus as disclosed herein may be embodied in any combination of hardware, software, and/or firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein (e.g., apparatus MF100, MF110, MF200, MF300, MF310, MF400, A100, A 110, A200, A300, A310, and A400) may also be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a signal balancing procedure, such as a task relating to another operation of a device or system in which the processor is embedded (e.g., an audio sensing device). It is also possible for part of a method as disclosed herein to be performed by a processor of the audio sensing device (e.g., level value calculation tasks T100*a* and T100*b* and gain factor calculation task T200) and for another part of the method to be performed under the control of one or more other processors (e.g., amplitude control task T300).

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein (e.g., methods M100, M200, M300, and M400) may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein may also be tangibly embodied (for example, in one or more computer-readable media as listed herein) as one or more sets of instructions readable and/or executable by a machine including an array of logic elements (e.g., a processor, microprocessor, microcontroller, or other finite state machine). The term "computer-readable medium" may include any medium that can store or transfer information, including volatile, nonvolatile, removable and non-removable media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk, a fiber optic medium, a radio frequency (RF) link, or any other medium which can be used to store the desired information and which can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a handset, headset, or portable digital assistant (PDA), and that the various apparatus described herein may be included with such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer storage media and communication media, including any medium that facilitates transfer of a computer program from one place to another. A storage media may be any available media that can be accessed by a computer. By way of example, and not limitation, such computer-readable media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times). For example, two of more of level calculators LC100*a* and LC100*b* may be implemented to include the same structure at different times.

What is claimed is:

1. A method of processing, on a processor, a multichannel audio signal, said method comprising:

calculating a series of values of a level of a first channel of the audio signal over time;

calculating a series of values of a level of a second channel of the audio signal over time;

based on the series of values of a level of the first channel and the series of values of a level of the second channel, calculating a series of values of a gain factor over time; and controlling the amplitude of the second channel relative to the amplitude of the first channel over time according to the series of values of the gain factor, wherein said method includes indicating that a segment of the audio signal is an information segment, and wherein calculating a series of values of a gain factor over time includes, for at least one of the series of values of the gain factor and in response to said indicating, calculating the gain factor value based on a corresponding value of the level of the first channel, a corresponding value of the level of the second channel, and a bias factor, and wherein the bias factor is based on a standard orientation of an audio sensing device relative to a directional information source.

2. The method of processing a multichannel audio signal according to claim 1, wherein said indicating that a segment is an information segment is based on a corresponding value of the level of the first channel and a corresponding value of the level of the second channel.

3. The method of processing a multichannel audio signal according to claim 1, wherein said indicating that a segment is an information segment is based on a relation that includes an array imbalance estimate, and wherein the array imbalance estimate is based on at least one of the series of values of the gain factor.

4. The method of processing a multichannel audio signal according to claim 1, wherein each of the series of values of a gain factor is based on a ratio of one of the series of values of a level of the first channel to one of the series of values of a level of the second channel.

5. The method of processing a multichannel audio signal according to claim 1, wherein the bias factor is independent of a ratio between the corresponding value of the level of the first channel and the corresponding value of the level of the second channel.

6. The method of processing a multichannel audio signal according to claim 1, wherein said calculating the gain factor value includes using the bias factor to weight the corresponding value of the level of the second channel, and wherein said gain factor value is based on a ratio of the corresponding value of the level of the first channel to the weighted corresponding value of the level of the second channel.

7. The method of processing a multichannel audio signal according to claim 1, wherein said method includes indicating that a segment of the audio signal is a background segment, based on a relation between a level of the segment and a background level value.

8. The method of processing a multichannel audio signal according to claim 1, wherein said method includes indicating that a segment of the audio signal which is not a background segment is a balanced noise segment.

9. The method of processing a multichannel audio signal according to claim 1, wherein said method includes indicating that a segment of the audio signal which is not a background segment is a balanced noise segment, based on a relation that includes an array imbalance estimate, and wherein the array imbalance estimate is based on at least one of the series of values of the gain factor.

10. A non-transitory computer-readable medium comprising instructions which when executed by at least one processor cause the at least one processor to perform a method of processing a multichannel audio signal, said instructions comprising:

instructions which when executed by a processor cause the processor to calculate a series of values of a level of a first channel of the audio signal over time;

instructions which when executed by a processor cause the processor to calculate a series of values of a level of a second channel of the audio signal over time;

instructions which when executed by a processor cause the processor to calculating a series of values of a gain factor over time, based on the series of values of a level of the first channel and the series of values of a level of the second channel; and instructions which when executed by a processor cause the processor to control the amplitude of the second channel relative to the amplitude of the first channel over time according to the series of values of the gain factor, wherein said medium includes instructions which when executed by a processor cause the processor to indicate that a segment of the audio signal is an information segment, and wherein said instructions which when executed by a processor cause the processor to calculate a series of values of a gain factor over time include instructions which when executed by a processor cause the processor to calculate at least one of the series of values of the gain factor, in response to the indication, based on a corresponding value of the level of the first channel, a corresponding value of the level of the second channel, and a bias factor, and wherein the bias factor is based on a standard orientation of an audio sensing device relative to a directional information source.

11. The computer-readable medium according to claim 10, wherein said instructions which when executed by a processor cause the processor to indicate that a segment is an information segment include instructions which when executed by a processor cause the processor to indicate that a segment is an information segment based on a corresponding value of the level of the first channel and a corresponding value of the level of the second channel.

12. The computer-readable medium according to claim 10, wherein said instructions which when executed by a processor cause the processor to indicate that a segment is an information segment include instructions which when executed by a processor cause the processor to indicate that a segment is an information segment based on a relation that includes an array imbalance estimate, and wherein the array imbalance estimate is based on at least one of the series of values of the gain factor.

13. The computer-readable medium according to claim 10, wherein each of the series of values of a gain factor is based on a ratio of one of the series of values of a level of the first channel to one of the series of values of a level of the second channel.

14. The computer-readable medium according to claim 10, wherein the bias factor is independent of a ratio between the corresponding value of the level of the first channel and the corresponding value of the level of the second channel.

15. The computer-readable medium according to claim 10, wherein said instructions which when executed by a processor cause the processor to calculate the gain factor value include instructions which when executed by a processor cause the processor to use the bias factor to weight the corresponding value of the level of the second channel, and wherein said gain factor value is based on a ratio of the corresponding value of the level of the first channel to the weighted corresponding value of the level of the second channel.

16. The computer-readable medium according to claim 10, wherein said medium includes instructions which when executed by a processor cause the processor to indicate that a segment of the audio signal is a background segment, based on a relation between a level of the segment and a background level value.

17. The computer-readable medium according to claim 10, wherein said medium includes instructions which when executed by a processor cause the processor to indicate that a segment of the audio signal which is not a background segment is a balanced noise segment.

18. The computer-readable medium according to claim 10, wherein said medium includes instructions which when executed by a processor cause the processor to indicate that a segment of the audio signal which is not a background segment is a balanced noise segment, based on a relation that includes an array imbalance estimate, and wherein the array imbalance estimate is based on at least one of the series of values of the gain factor.

19. An apparatus for processing a multichannel audio signal, said apparatus comprising:

means for calculating a series of values of a level of a first channel of the audio signal over time;

means for calculating a series of values of a level of a second channel of the audio signal over time;

means for calculating a series of values of a gain factor over time, based on the series of values of a level of the first channel and the series of values of a level of the second channel; and means for controlling the amplitude of the second channel relative to the amplitude of the first channel over time according to the series of values of the gain factor, wherein said apparatus includes means for indicating that a segment of the audio signal is an information segment, and wherein said means for calculating a series of values of a gain factor over time is configured to calculate at least one of the series of values of the gain factor, in response to the indication, based on a corresponding value of the level of the first channel, a corresponding value of the level of the second channel, and a bias factor, and wherein the bias factor is based on a standard orientation of an audio sensing device relative to a directional information source.

20. The apparatus for processing a multichannel audio signal according to claim 19, wherein said means for indicating that a segment is an information segment is configured to indicate that a segment is an information segment based on a corresponding value of the level of the first channel and a corresponding value of the level of the second channel.

21. The apparatus for processing a multichannel audio signal according to claim 19, wherein said means for indicating that a segment is an information segment is configured to indicate that a segment is an information segment based on a relation that includes an array imbalance estimate, and wherein the array imbalance estimate is based on at least one of the series of values of the gain factor.

22. The apparatus for processing a multichannel audio signal according to claim 19, wherein each of the series of values of a gain factor is based on a ratio of one of the series of values of a level of the first channel to one of the series of values of a level of the second channel.

23. The apparatus for processing a multichannel audio signal according to claim 19, wherein the bias factor is independent of a ratio between the corresponding value of the level of the first channel and the corresponding value of the level of the second channel.

24. The apparatus for processing a multichannel audio signal according to claim 19, wherein said means for calculating the gain factor value is configured to calculate each of the at least one of the series of values of the gain factor using the bias factor to weight the corresponding value of the level of the second channel, and wherein said gain factor value is based on a ratio of the corresponding value of the level of the first channel to the weighted corresponding value of the level of the second channel.

25. The apparatus for processing a multichannel audio signal according to claim 19, wherein said apparatus includes means for indicating that a segment of the audio signal is a background segment, based on a relation between a level of the segment and a background level value.

26. The apparatus for processing a multichannel audio signal according to claim 19, wherein said apparatus includes means for indicating that a segment of the audio signal which is not a background segment is a balanced noise segment.

27. The apparatus for processing a multichannel audio signal according to claim 19, wherein said apparatus includes means for indicating that a segment of the audio signal which is not a background segment is a balanced noise segment, based on a relation that includes an array imbalance estimate, and wherein the array imbalance estimate is based on at least one of the series of values of the gain factor.

28. The apparatus for processing a multichannel audio signal according to claim 19, wherein said apparatus comprises a communications device that includes said means for calculating a series of values of a level of a first channel, said means for calculating a series of values of a level of a second channel, said means for calculating a series of values of a gain factor, said means for controlling the amplitude of the second channel, and said means for indicating that a segment of the audio signal is an information segment, and wherein the communications device comprises a microphone array configured to produce the multichannel audio signal.

29. An apparatus for processing a multichannel audio signal, said apparatus comprising:

a first level calculator configured to calculate a series of values of a level of a first channel of the audio signal over time;

a second level calculator configured to calculate a series of values of a level of a second channel of the audio signal over time;

a gain factor calculator configured to calculate a series of values of a gain factor over time, based on the series of values of a level of the first channel and the series of values of a level of the second channel;

an amplitude control element configured to control the amplitude of the second channel relative to the amplitude of the first channel over time according to the series of values of the gain factor; and an information segment indicator configured to indicate that a segment of the audio signal is an information segment, wherein said gain factor calculator is configured to calculate at least one of the series of values of the gain factor, in response to the indication, based on a corresponding value of the level of the first channel, a corresponding value of the level of the second channel, and a bias factor, and wherein the bias factor is based on a standard orientation of an audio sensing device relative to a directional acoustic information source.

30. The apparatus for processing a multichannel audio signal according to claim 29, wherein said information segment indicator is configured to indicate that a segment is an information segment based on a corresponding value of the level of the first channel and a corresponding value of the level of the second channel.

31. The apparatus for processing a multichannel audio signal according to claim 29, wherein said information segment indicator is configured to indicate that a segment is an information segment based on a relation that includes an array imbalance estimate, and wherein the array imbalance estimate is based on at least one of the series of values of the gain factor.

32. The apparatus for processing a multichannel audio signal according to claim 29, wherein each of the series of values of a gain factor is based on a ratio of one of the series of values of a level of the first channel to one of the series of values of a level of the second channel.

33. The apparatus for processing a multichannel audio signal according to claim 29, wherein the bias factor is independent of a ratio between the corresponding value of the level of the first channel and the corresponding value of the level of the second channel.

34. The apparatus for processing a multichannel audio signal according to claim 29, wherein said gain factor calculator is configured to calculate each of the at least one of the series of values of the gain factor using the bias factor to weight the corresponding value of the level of the second channel, and wherein said gain factor value is based on a ratio of the corresponding value of the level of the first channel to the weighted corresponding value of the level of the second channel.

35. The apparatus for processing a multichannel audio signal according to claim 29, wherein said apparatus includes a background segment indicator configured to indicate that a segment of the audio signal is a background segment, based on a relation between a level of the segment and a background level value.

36. The apparatus for processing a multichannel audio signal according to claim 29, wherein said apparatus includes a balanced noise segment indicator configured to indicate that a segment of the audio signal which is not a background segment is a balanced noise segment.

37. The apparatus for processing a multichannel audio signal according to claim 29, wherein said apparatus includes a balanced noise segment indicator configured to indicate that a segment of the audio signal which is not a background segment is a balanced noise segment, based on a relation that includes an array imbalance estimate, and wherein the array imbalance estimate is based on at least one of the series of values of the gain factor.

38. The apparatus for processing a multichannel audio signal according to claim 29, wherein said apparatus comprises a communications device that includes said first level calculator, said second level calculator, said gain factor calculator, said amplitude control element, and said information segment indicator, and wherein the communications device comprises a microphone array configured to produce the multichannel audio signal.

* * * * *